United States Patent
Sawa et al.

(10) Patent No.: US 8,832,386 B2
(45) Date of Patent: Sep. 9, 2014

(54) MANAGEMENT SERVER AND DATA MIGRATION METHOD

(75) Inventors: Kenichi Sawa, Odawara (JP); Keishi Tamura, Fujisawa (JP); Satoru Ozaki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 402 days.

(21) Appl. No.: 13/265,111

(22) PCT Filed: Sep. 27, 2011

(86) PCT No.: PCT/JP2011/005411
§ 371 (c)(1),
(2), (4) Date: Oct. 18, 2011

(87) PCT Pub. No.: WO2013/046254
PCT Pub. Date: Apr. 4, 2013

(65) Prior Publication Data
US 2013/0080723 A1    Mar. 28, 2013

(51) Int. Cl.
*G06F 12/00* (2006.01)
*G06F 3/06* (2006.01)

(52) U.S. Cl.
CPC .............. *G06F 3/065* (2013.01); *G06F 3/0617* (2013.01); *G06F 3/0647* (2013.01); *G06F 3/0619* (2013.01); *G06F 3/0607* (2013.01); *G06F 3/067* (2013.01); *G06F 3/0689* (2013.01)
USPC ................... 711/141; 711/E12.069; 711/114; 711/113; 709/219

(58) Field of Classification Search
USPC ........................................................ 711/141
See application file for complete search history.

(56) References Cited

U.S. PATENT DOCUMENTS

2005/0138308 A1   6/2005   Morishita et al.
2005/0193180 A1   9/2005   Fujibayashi
(Continued)

FOREIGN PATENT DOCUMENTS

EP   1 764 678 B1   3/2007
EP   1 857 918 A2   11/2007
(Continued)

OTHER PUBLICATIONS

PCT International Search Report and Written Opinion on application PCT/JP2011/005411 mailed Mar. 19, 2012; 16 pages.

*Primary Examiner* — Reginald Bragdon
*Assistant Examiner* — Hamdy S Ahmed
(74) *Attorney, Agent, or Firm* — Foley & Lardner LLP

(57) ABSTRACT

A management server and a data migration method enabling a storage apparatus to be replaced while retaining data consistency and without halting access by a host apparatus are proposed.

In a computer system which comprises a first primary storage apparatus and a first secondary storage apparatus and a second primary storage apparatus and a second secondary storage apparatus, a first virtual volume of the second primary storage apparatus is externally connected to a first primary volume of the first primary storage apparatus, a total cache-through mode is configured as a cache mode in a case where a read command is supplied by the first host apparatus, unique information for the first primary volume is configured for the first virtual volume, a path to the first primary volume is switched from the first host apparatus to a path via the first virtual volume, and a second primary volume in the second primary storage apparatus is configured to form a copy pair with a second secondary volume in the second secondary storage apparatus.

8 Claims, 39 Drawing Sheets

(56) References Cited

U.S. PATENT DOCUMENTS

| | | | |
|---|---|---|---|
| 2008/0059744 A1* | 3/2008 | Ozaki et al. | 711/165 |
| 2009/0249012 A1 | 10/2009 | Umemura | |
| 2010/0199038 A1 | 8/2010 | Ito et al. | |
| 2011/0066801 A1* | 3/2011 | Sato | 711/114 |

FOREIGN PATENT DOCUMENTS

| | | |
|---|---|---|
| JP | 2005-018506 | 1/2005 |
| JP | 2006-065709 | 3/2006 |

* cited by examiner

FIG.6

| # | PRIMARY VOL | SECONDARY VOL | STATE | PRIMARY HOST IDENTIFICATION LUN | SECONDARY HOST IDENTIFICATION LUN |
|---|---|---|---|---|---|
| 1 | 101 | 201 | PAIR | 101 | 201(WRITE-DISABLED) |
| 2 | 102 | 202 | COPY | 102 | 202(WRITE-DISABLED) |
| ... | ... | ... | ... | ... | ... |
| 43A | 43B | 43C | 43D | 43E | 43F |

| # | VIRTUAL VOL | REAL VOL | ACCESS PATH | CACHE MODE | ... |
|---|---|---|---|---|---|
| 1 | 101 | 301 | PORT#, LUN AND THE LIKE | READ, WRITE CACHE-THROUGH | ... |
| 2 | 102 | 302 | PORT#, LUN AND THE LIKE | WRITE-ONLY CACHE-THROUGH | ... |
| 3 | 103 | 303 | PORT#, LUN AND THE LIKE | CACHE USAGE | ... |
| ... | ... | ... | ... | ... | ... |
| 44A | 44B | 44C | 44D | 44E | |

| # | VOL | RAID GROUP | RAID LEVEL | ... |
|---|-----|------------|------------|-----|
| 1 | 101 | 1-1 | RAID5(7D+1P) | ... |
| 2 | 102 | 1-1 | RAID5(7D+1P) | ... |
| 3 | 103 | 1-2 | RAID6(6D+2P) | ... |
| ... | ... | ... | ... | ... |
| 45A | 45B | 45C | 45D | |

| # | RAID GROUP | RAID LEVEL | DRIVE(C/R#) | DRIVE TYPE | CAPACITY | ... |
|---|---|---|---|---|---|---|
| 1 | 1-1 | RAID5(7D+1P) | 1/0~1/7 | SSD | 500GB | ... |
| 2 | 1-1 | RAID5(7D+1P) | 1/0~1/7 | SSD | 500GB | ... |
| 3 | 1-2 | RAID6(6D+2P) | 2/8~2/F | SAS | 900GB | ... |
| ... | ... | ... | ... | ... | ... | ... |
| 46A | 46B | 46C | 46D | 46E | 46F | |

|   | ITEM | INFORMATION TYPE |
|---|---|---|
| 1 | APPARATUS NAME | APPARATUS INFORMATION |
| 2 | WWN | |
| 3 | LOGICAL DKC NUMBER | |
| 4 | S/N | |
| 5 | PORT NAME | |
| 6 | PORT NUMBER/ ADAPTER NUMBER | |
| 7 | SSID | DEVICE INFORMATION |
| 8 | EMULATION TYPE | |
| 9 | HDEV NUMBER | |
| 10 | CU NUMBER | |

FIG. 14

| # | FAULT OCCURRENCE POINT | OPERATION |
|---|---|---|
| 1 | MIGRATION SOURCE: PRIMARY STORAGE | FAILOVER TO SECONDARY AND CONTINUATION OF SYSTEM. DR CONFIGURATION IS CANCELED. |
| 2 | MIGRATION SOURCE: SECONDARY STORAGE | SYSTEM CONTINUATION. DR CONFIGURATION IS CANCELED. |
| 3 | MIGRATION DESTINATION: PRIMARY STORAGE | NO PROBLEM |
| 4 | MIGRATION DESTINATION: SECONDARY STORAGE | NO PROBLEM |
| 5 | MIGRATION SOURCE: TC PATH | SYSTEM CONTINUATION. DR CONFIGURATION IS CANCELED. |

FIG.20

| # | FAULT OCCURRENCE POINT | OPERATION |
|---|---|---|
| 1 | MIGRATION SOURCE: PRIMARY STORAGE | FAILOVER TO SECONDARY AND CONTINUATION OF SYSTEM. DR CONFIGURATION IS CANCELED. |
| 2 | MIGRATION SOURCE: SECONDARY STORAGE | SYSTEM CONTINUATION. DR CONFIGURATION IS CANCELED. |
| 3 | MIGRATION DESTINATION: PRIMARY STORAGE | RETRY HOST I/O DURING OPERATION AT MIGRATION DESTINATION AT MIGRATION SOURCE AND SYSTEM CONTINUATION. |
| 4 | MIGRATION DESTINATION: SECONDARY STORAGE | NO PROBLEM |
| 5 | MIGRATION SOURCE: TC PATH | SYSTEM CONTINUATION. DR CONFIGURATION IS CANCELED. |
| 6 | PRIMARY UVM PATH | RETRY HOST I/O DURING OPERATION AT MIGRATION DESTINATION AT MIGRATION SOURCE AND SYSTEM CONTINUATION. |

FIG.25

| # | FAULT OCCURRENCE POINT | OPERATION |
|---|---|---|
| 1 | MIGRATION SOURCE: PRIMARY STORAGE | FAILOVER TO MIGRATION-SOURCE SECONDARY AND CONTINUATION OF SYSTEM. DR CONFIGURATION IS CANCELED. |
| 2 | MIGRATION SOURCE: SECONDARY STORAGE | SYSTEM CONTINUATION. DR CONFIGURATION IS CANCELED. |
| 3 | MIGRATION DESTINATION: PRIMARY STORAGE | FAILOVER TO MIGRATION-SOURCE SECONDARY AND CONTINUATION OF SYSTEM. |
| 4 | MIGRATION DESTINATION: SECONDARY STORAGE | TC PAIR IS SUSPENDED DURING COPY FORMATION. NO EFFECT ON SYSTEM. |
| 5 | MIGRATION SOURCE: TC PATH | SYSTEM CONTINUATION. DR CONFIGURATION IS CANCELED. |
| 6 | MIGRATION DESTINATION: TC PATH | TC PAIR IS SUSPENDED DURING COPY FORMATION. NO EFFECT ON SYSTEM. |
| 7 | PRIMARY UVM PATH | FAILOVER TO MIGRATION-SOURCE SECONDARY AND CONTINUATION OF SYSTEM. DR CONFIGURATION IS CANCELED. |

FIG.28

| # | FAULT OCCURRENCE POINT | OPERATION |
|---|---|---|
| 1 | MIGRATION SOURCE: PRIMARY STORAGE | FAILOVER TO SECONDARY AND CONTINUATION OF SYSTEM. DR CONFIGURATION IS CANCELED. |
| 2 | MIGRATION SOURCE: SECONDARY STORAGE | NO PROBLEM |
| 3 | MIGRATION DESTINATION: PRIMARY STORAGE | FAILOVER TO SECONDARY AND CONTINUATION OF SYSTEM. DR CONFIGURATION IS CANCELED. |
| 4 | MIGRATION DESTINATION: SECONDARY STORAGE | MIGRATION-DESTINATION TC PAIR IS SUSPENDED. SYSTEM CONTINUATION. DR CONFIGURATION IS CANCELED. |
| 5 | MIGRATION DESTINATION: TC PATH | MIGRATION-DESTINATION TC PAIR IS SUSPENDED. SYSTEM CONTINUATION. DR CONFIGURATION IS CANCELED. |
| 6 | PRIMARY UVM PATH | FAILOVER TO SECONDARY AND CONTINUATION OF SYSTEM. DR CONFIGURATION IS CANCELED. |

FIG.30

| # | FAULT OCCURRENCE POINT | OPERATION |
|---|---|---|
| 1 | MIGRATION SOURCE: PRIMARY STORAGE | NO PROBLEM |
| 2 | MIGRATION SOURCE: SECONDARY STORAGE | NO PROBLEM |
| 3 | MIGRATION DESTINATION: PRIMARY STORAGE | FAILOVER TO SECONDARY AND CONTINUATION OF SYSTEM. DR CONFIGURATION IS CANCELED. |
| 4 | MIGRATION DESTINATION: SECONDARY STORAGE | SYSTEM CONTINUATION. DR CONFIGURATION IS CANCELED. |
| 5 | MIGRATION DESTINATION: TC PATH | SYSTEM CONTINUATION. DR CONFIGURATION IS CANCELED. |

FIG.35

| # | FAULT OCCURRENCE POINT | OPERATION |
|---|---|---|
| 1 | MIGRATION SOURCE: PRIMARY STORAGE | FAILOVER TO SECONDARY AND CONTINUATION OF SYSTEM. DR CONFIGURATION IS CANCELED. ALTERNATE PATH OPERATION IN SECONDARY. |
| 2 | MIGRATION SOURCE: SECONDARY STORAGE | SYSTEM CONTINUATION. DR CONFIGURATION IS CANCELED. |
| 3 | MIGRATION DESTINATION: PRIMARY STORAGE | RETRY HOST I/O DURING OPERATION AT MIGRATION DESTINATION, AT MIGRATION SOURCE, SYSTEM CONTINUATION. |
| 4 | MIGRATION DESTINATION: SECONDARY STORAGE | NO PROBLEM |
| 5 | MIGRATION SOURCE: TC PATH | SYSTEM CONTINUATION. DR CONFIGURATION IS CANCELED. |
| 6 | PRIMARY UVM PATH | RETRY HOST I/O DURING OPERATION AT MIGRATION DESTINATION, AT MIGRATION SOURCE, SYSTEM CONTINUATION. |
| 7 | SECONDARY UVM PATH | NO PROBLEM |

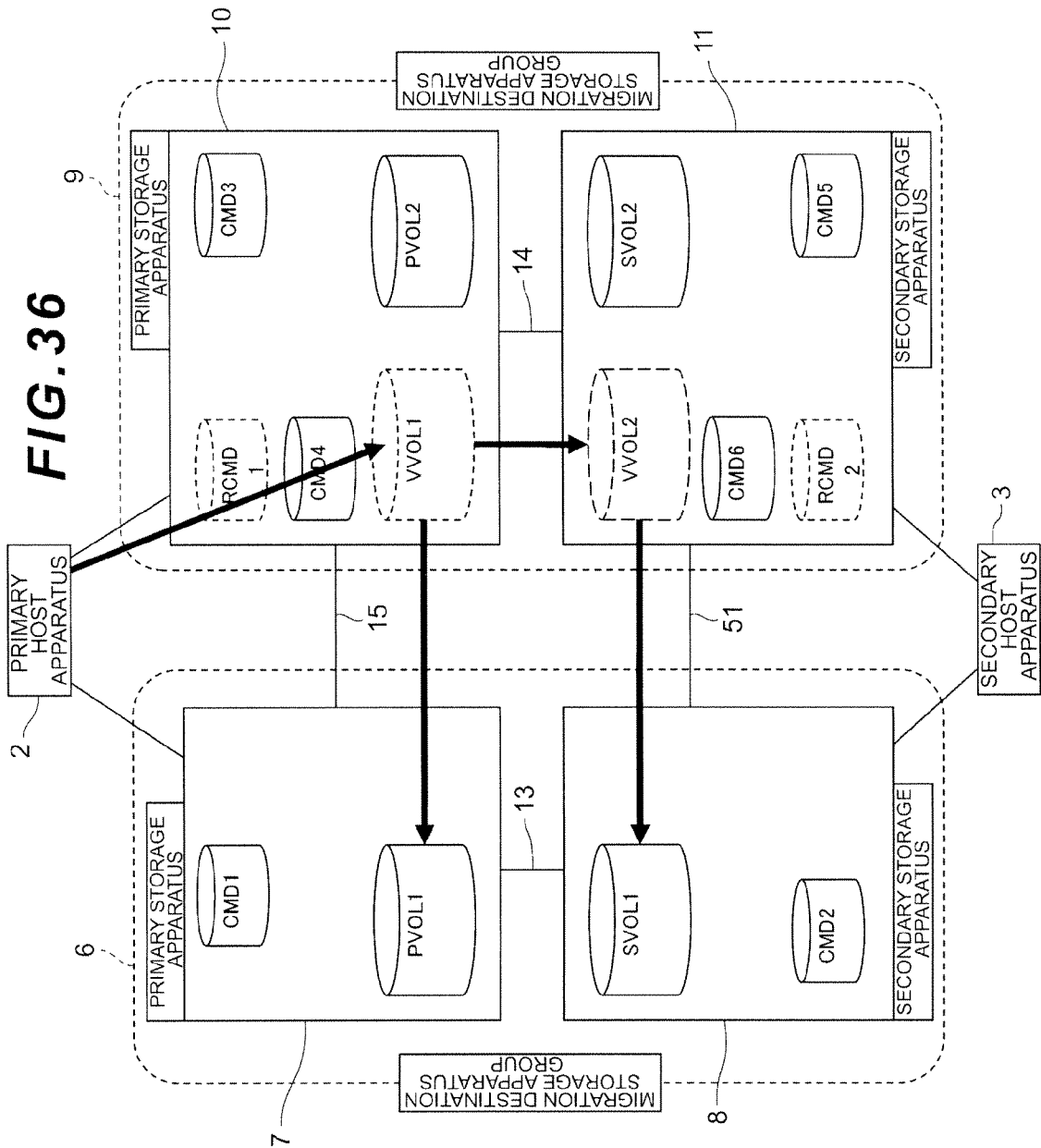

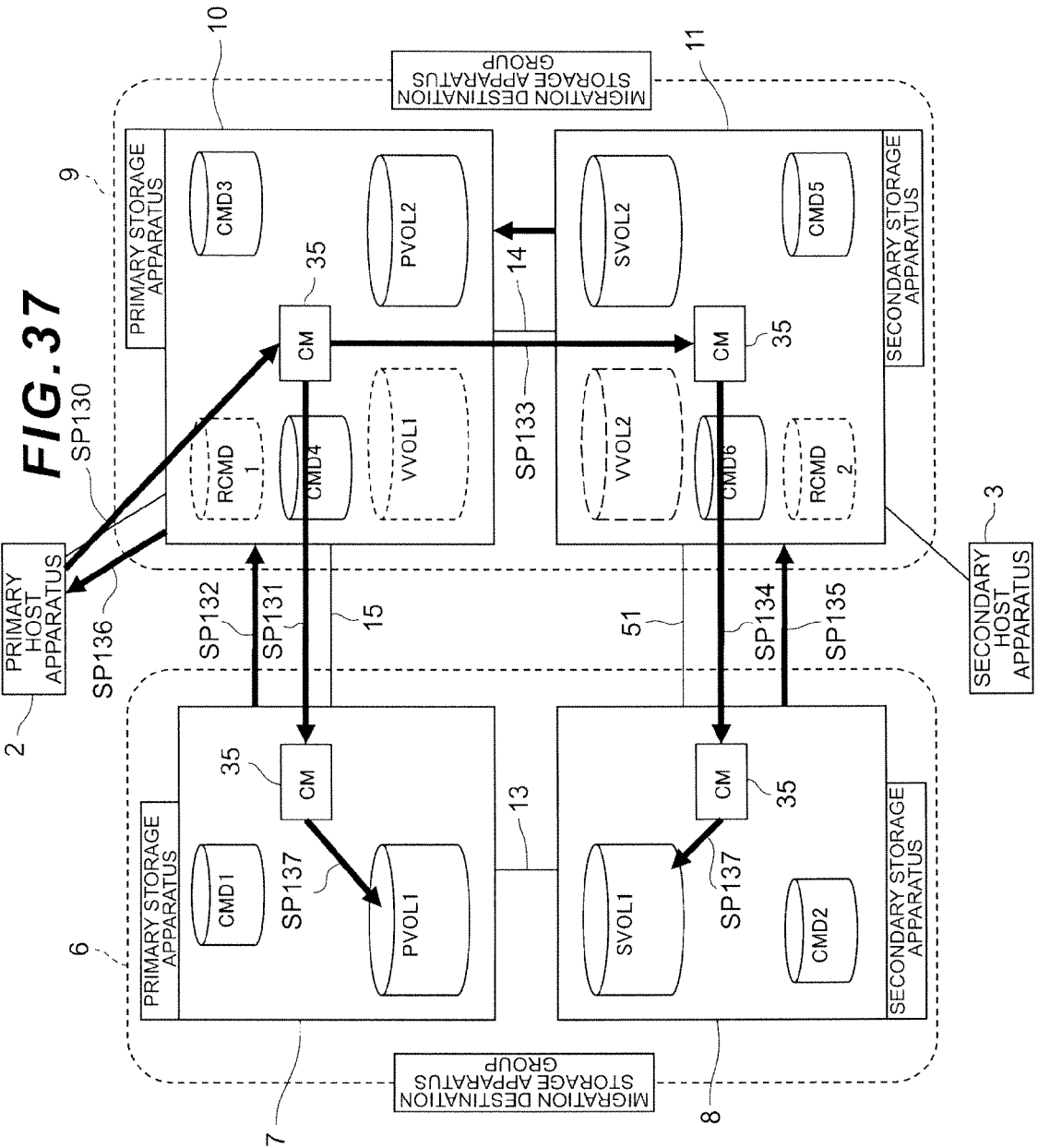

FIG.38

| # | FAULT OCCURRENCE POINT | OPERATION |
|---|---|---|
| 1 | MIGRATION SOURCE: PRIMARY STORAGE | FAILOVER TO SECONDARY AND CONTINUATION OF SYSTEM. DR CONFIGURATION IS CANCELED. |
| 2 | MIGRATION SOURCE: SECONDARY STORAGE | SYSTEM CONTINUATION. DR CONFIGURATION IS CANCELED. |
| 3 | MIGRATION DESTINATION: PRIMARY STORAGE | FAILOVER TO SECONDARY AND CONTINUATION OF SYSTEM. DR CONFIGURATION IS MAINTAINED USING MIGRATION-SOURCE TC. |
| 4 | MIGRATION DESTINATION: SECONDARY STORAGE | SYSTEM CONTINUATION. DR CONFIGURATION IS MAINTAINED USING MIGRATION-SOURCE TC. |
| 5 | MIGRATION SOURCE: TC PATH | NO PROBLEM |
| 6 | MIGRATION DESTINATION: TC PATH | SYSTEM CONTINUATION. DR CONFIGURATION IS MAINTAINED USING MIGRATION-SOURCE TC. |
| 7 | PRIMARY UVM PATH | FAILOVER TO SECONDARY AND CONTINUATION OF SYSTEM. DR CONFIGURATION IS MAINTAINED USING MIGRATION-SOURCE TC. |
| 8 | SECONDARY UVM PATH | SYSTEM CONTINUATION. DR CONFIGURATION IS MAINTAINED USING MIGRATION-SOURCE TC. |

FIG.40

| # | FAULT OCCURRENCE POINT | OPERATION |
|---|---|---|
| 1 | MIGRATION SOURCE: PRIMARY STORAGE | FAILOVER TO SECONDARY AND CONTINUATION OF SYSTEM. DR CONFIGURATION IS CANCELED. |
| 2 | MIGRATION SOURCE: SECONDARY STORAGE | SYSTEM CONTINUATION. DR CONFIGURATION IS CANCELED. |
| 3 | MIGRATION DESTINATION: PRIMARY STORAGE | FAILOVER TO SECONDARY AND CONTINUATION OF SYSTEM. DR CONFIGURATION IS MAINTAINED USING MIGRATION-SOURCE TC. |
| 4 | MIGRATION DESTINATION: SECONDARY STORAGE | SYSTEM CONTINUATION. DR CONFIGURATION IS MAINTAINED USING MIGRATION-SOURCE TC. |
| 5 | MIGRATION SOURCE: TC PATH | NO PROBLEM |
| 6 | MIGRATION DESTINATION: TC PATH | SYSTEM CONTINUATION. DR CONFIGURATION IS MAINTAINED USING MIGRATION-SOURCE TC. |
| 7 | PRIMARY UVM PATH | FAILOVER TO SECONDARY AND CONTINUATION OF SYSTEM. DR CONFIGURATION IS MAINTAINED USING MIGRATION-SOURCE TC. |
| 8 | SECONDARY UVM PATH | SYSTEM CONTINUATION. DR CONFIGURATION IS MAINTAINED USING MIGRATION-SOURCE TC. |

MANAGEMENT SERVER AND DATA MIGRATION METHOD

TECHNICAL FIELD

The present invention relates to a management server and a data migration method and, more particularly, to a management server and data migration method which are suitably applied to a computer system which comprises a primary storage apparatus and a secondary storage apparatus and which executes remote copying between the primary storage apparatus and secondary storage apparatus.

BACKGROUND ART

Conventionally, one example of a function installed in a computer system is a remote copy function which copies data that has been written to a logical volume (hereinafter called the primary volume) in a certain storage apparatus (hereinafter called the primary storage apparatus) to a predetermined logical volume (hereinafter called a secondary volume) in another storage apparatus (hereinafter called the secondary storage apparatus) which is installed in a site separate from the primary storage apparatus (see PTL1).

In reality, in a computer system with this kind of remote copy function installed, a primary volume in a primary storage apparatus and a secondary volume in a secondary storage apparatus are configured as one pair (hereinafter termed a copy pair). Further, if data is written to the primary volume, the primary storage apparatus transfers this data to the secondary storage apparatus together with a write command, synchronously or asynchronously with the writing. In addition, upon receiving this write command and this data, the secondary storage apparatus writes the command and data to an address, designated in the write command, in the secondary volume.

With this remote copy function, since data is retained in duplicate in both the primary storage apparatus and secondary storage apparatus, the protection of data from natural disasters such as earthquakes, fire and flood, and terrorism can be reinforced.

Furthermore, another function installed in a computer system is an external connection function which enables a certain storage apparatus to virtualize a logical volume provided by another storage apparatus (hereinafter called an external storage apparatus) (see PTL2).

In the storage apparatus in which the external connection function is installed, a virtual logical volume (hereinafter called a virtual volume) which is provided to the host apparatus is created and this virtual volume is mapped to (associated with) a virtual target logical volume in an external storage apparatus.

Furthermore, if a first access command (read command or write command) targeting the virtual volume is supplied from the host apparatus, the storage apparatus converts the first access command to a second access command targeting the logical volume to which the virtual volume is mapped and issues a second access command to the external storage apparatus, causing the external storage apparatus to execute access processing corresponding to the first access command.

With the external connection function, logical volumes each provided by a plurality of external storage apparatuses can be centrally managed, thereby facilitating the addition of storage apparatuses.

CITATION LIST

Patent Literature

PTL 1: Japanese Published Unexamined Application No. 2005-018506
PTL 2: Japanese Published Unexamined Application No. 2006-065709

SUMMARY OF INVENTION

Technical Problem

Further, in a computer system to which this remote copy function is applied, if an existing primary storage apparatus and secondary storage apparatus are substituted for a new primary storage apparatus and secondary storage apparatus, this substitution is performed by means of the following procedure.

(1) First, access by the host apparatus to the primary volume in the existing primary storage apparatus is halted.

(2) After deleting a copy pair between the existing primary volume and secondary volume, the migration of data from the existing primary storage apparatus and secondary storage apparatus to a new primary storage apparatus and secondary storage apparatus is performed.

(3) A copy pair is reconfigured between the new primary storage apparatus and secondary storage apparatus after data migration has ended.

Further, according to a conventional method of this kind, before and after switching the path form the host apparatus from the existing primary storage apparatus to the new primary storage apparatus, the timing with which both existing primary storage apparatus and the new primary storage apparatus receive access from the host apparatus is generated. Hence, with this conventional method, in order to prevent a data mismatch, there is the problem that access to the primary storage apparatus by the host apparatus must be temporarily stopped when data migration takes place.

The present invention was conceived in view of the above and proposes a management server and data migration method enabling a storage apparatus to be replaced while retaining data consistency and without halting access by a host apparatus.

Solution to Problem

In order to achieve the foregoing object, the present invention provides a computer system comprising a first primary storage apparatus which provides a first primary volume to a first host apparatus; a first secondary storage apparatus which provides a first secondary volume to a second host apparatus; a second primary storage apparatus which comprises a first cache memory for temporarily storing data, which provides a second primary volume to the first host apparatus, and in which a first virtual volume which is a virtual logical volume is defined; a second secondary storage apparatus which provides a second secondary volume to the second host apparatus; and a management server which manages the first and second host apparatuses, the first and second primary storage apparatuses, and the first and second secondary storage apparatuses, wherein the first and second primary storage apparatuses comprise a built-in remote-copy function which, if their own first logical volume is configured to form a copy pair with a second logical volume in another storage apparatus, remote-copies data written in the first logical volume to the second logical volume, wherein the second primary storage apparatus comprises a built-in first external connection function which, if the first virtual volume is mapped to a third logical volume in another storage apparatus and when a read command or write command targeting the first virtual volume is supplied by the first host apparatus, converts the read command or write command to a read command or write command targeting the third logical volume and transfers the converted command to the other storage apparatus; wherein the second primary storage apparatus comprises, as cache modes in a case where a read command is supplied by the first host apparatus, a first read cache mode which, when the read-target data exists in the first cache memory, reads the data from the first cache memory and transfers the data to the first host apparatus, and a second read cache mode which transfers the read command to the other storage apparatus by means of the first external connection function irrespective of whether the read-target data exists in the first cache memory and comprises, as cache modes in a case where a write command and write-target data are supplied by the first host apparatus, a first write cache mode which, at the stage where the write-target data is written to the first cache memory, transmits a write completion notice to the first host apparatus, and a second write cache mode which transfers the write command to the other storage apparatus by means of the first external connection function irrespective of whether corresponding data exists in the first cache memory, wherein a first path interconnecting the first host apparatus and the first primary storage apparatus is initially configured as a path from the first host apparatus to the first primary volume, and the first primary volume of the first primary storage apparatus and the first secondary volume of the first secondary storage apparatus are configured as the copy pair, wherein the management server issues a first instruction to the second primary storage apparatus to map the first virtual volume to the first primary volume of the first primary storage apparatus, to configure the second read cache mode as a cache mode in a case where the read command is supplied by the first host apparatus and to configure the second write cache mode as the cache mode in a case where the write command is supplied by the first host apparatus, issues a second instruction to the second primary storage apparatus to configure, as unique information for the first virtual volume, predetermined unique information which the first primary storage apparatus sends back to the first host apparatus as information relating to the first primary volume when an inquiry command is supplied by the first host apparatus, issues a third instruction to the first host apparatus to configure a second path via the first virtual volume of the second primary storage apparatus as a path to the first primary volume from the first host apparatus, issues a fourth instruction to the first host apparatus to disconnect the first path, and issues a fifth instruction to the second primary storage apparatus and the second secondary storage apparatus to configure the second primary volume and the second secondary volume as the copy pair.

The present invention further provides a data migration method for a computer system, the computer system comprising a first primary storage apparatus which provides a first primary volume to a first host apparatus; a first secondary storage apparatus which provides a first secondary volume to a second host apparatus; a second primary storage apparatus which comprises a first cache memory for temporarily storing data, which provides a second primary volume to the first host apparatus, and in which a first virtual volume which is a virtual logical volume is defined; a second secondary storage apparatus which provides a second secondary volume to the second host apparatus; and a management server which manages the first and second host apparatuses, the first and second primary storage apparatuses, and the first and second secondary storage apparatuses, wherein the first and second primary storage apparatuses comprise a built-in remote-copy function which, if their own first logical volume is configured to form a copy pair with a second logical volume in another storage apparatus, remote-copies data written in the first logical volume to the second logical volume, wherein the second primary storage apparatus comprises a built-in first external connection function which, if the first virtual volume is mapped to a third logical volume in another storage apparatus and when a read command or write command targeting the first virtual volume is supplied by the first host apparatus, converts the read command or write command to a read command or write command targeting the third logical volume and transfers the converted command to the other storage apparatus; wherein the second primary storage apparatus comprises, as cache modes in a case where a read command is supplied by the first host apparatus, a first read cache mode which, when the read-target data exists in the first cache memory, reads the data from the first cache memory and transfers the data to the first host apparatus, and a second read cache mode which transfers the read command to the other storage apparatus by means of the first external connection function irrespective of whether the read-target data exists in the first cache memory and comprises, as cache modes in a case where a write command and write-target data are supplied by the first host apparatus, a first write cache mode which, at the stage where the write-target data is written to the first cache memory, transmits a write completion notice to the first host apparatus, and a second write cache mode which transfers the write command to the other storage apparatus by means of the first external connection function irrespective of whether corresponding data exists in the first cache memory, wherein a first path interconnecting the first host apparatus and the first primary storage apparatus is initially configured as a path from the first host apparatus to the first primary volume, and the first primary volume of the first primary storage apparatus and the first secondary volume of the first secondary storage apparatus are configured as the copy pair, the data migration method comprising a first step in which the management server issues an instruction to the second primary storage apparatus to map the first virtual volume to the first primary volume of the first primary storage apparatus, to configure the second read cache mode as a cache mode in a case where the read command is supplied by the first host apparatus and to configure the second write cache mode as the cache mode in a case where the write command is supplied by the first host apparatus, a second step in which the management server issues an instruction to the second primary storage apparatus to configure, as unique information for the first virtual volume, predetermined unique information which the first primary storage apparatus sends back to the first host apparatus as information relating to the first primary volume when an inquiry command is supplied by the first host apparatus, a third step in which the management server issues an instruction to the first host apparatus to configure a second path via the first virtual volume of the second primary storage apparatus as a path to the first primary volume from the first host apparatus, a fourth step in which the management server issues an instruction to the first host apparatus to disconnect the first path, and a fifth step in which the management server issues an instruction to the second primary storage apparatus and the second secondary storage apparatus to configure the second primary volume and the second secondary volume as the copy pair.

With this computer system and data migration method, data migration from the first primary volume in the first primary storage apparatus to the second primary volume in the second primary storage apparatus and data migration from the first secondary volume in the first secondary storage apparatus to the secondary volume in the second secondary storage apparatus are performed while controlling the cache mode in the second primary storage apparatus in the first primary storage apparatus and the cache mode in the second secondary storage apparatus, thereby enabling data migration from the first primary storage apparatus and the first secondary storage apparatus to the second primary storage apparatus and second secondary storage apparatus to be carried out while preserving data consistency in the first primary storage apparatus and first secondary storage apparatus and while continuing read processing and write processing which correspond to an access command from the first host apparatus.

Advantageous Effects of Invention

The present invention enables realization of a management server and data migration method with which a storage apparatus can be replaced while retaining data consistency and without halting access by a host apparatus.

BRIEF DESCRIPTION OF DRAWINGS

FIG. 6 is a conceptual view of the configuration of a pair management table.

FIG. 7 is a conceptual view of the configuration of a mapping table.

FIG. 8 is a conceptual view of the configuration of a volume RAID group management table.

FIG. 9 is a conceptual view of the configuration of the RAID group management table.

FIG. 12 is a table which serves to illustrate apparatus information and device information.

FIG. 14 is a table serving to illustrate the operation of the computer system in a case where a fault occurs in the stage of FIG. 13.

FIG. 20 is a table serving to illustrate the operation of the computer system in a case where a fault occurs in the stage of FIG. 15.

FIG. 25 is a table serving to illustrate the operation of the computer system in a case where a fault occurs in the stage of FIG. 21.

FIG. 28 is a table serving to illustrate the operation of the computer system in a case where a fault occurs in the stage of FIG. 26.

FIG. 30 is a table serving to illustrate the operation of the computer system in a case where a fault occurs in the stage of FIG. 29.

FIG. 35 is a table serving to illustrate the operation of the computer system in a case where a fault has occurred in the stage of configuring an alternate path in the computer system according to the second embodiment.

FIG. 36 is a conceptual view serving to provide an overview of read/write processing at a stage after configuring a copy pair in a migration-destination storage apparatus group in the computer system according to the second embodiment.

FIG. 37 is a conceptual view serving to illustrate the flow of write processing at the stage of FIG. 36.

FIG. 38 is a table serving to illustrate the operation of the computer system in a case where a fault occurs in the stage of FIG. 36.

FIG. 40 is a table serving to illustrate the operation of the computer system in a case where a fault occurs in the stage of FIG. 39.

DESCRIPTION OF EMBODIMENTS

An embodiment of the present invention will be described in detail hereinbelow with reference to the drawings.

Figure 1:
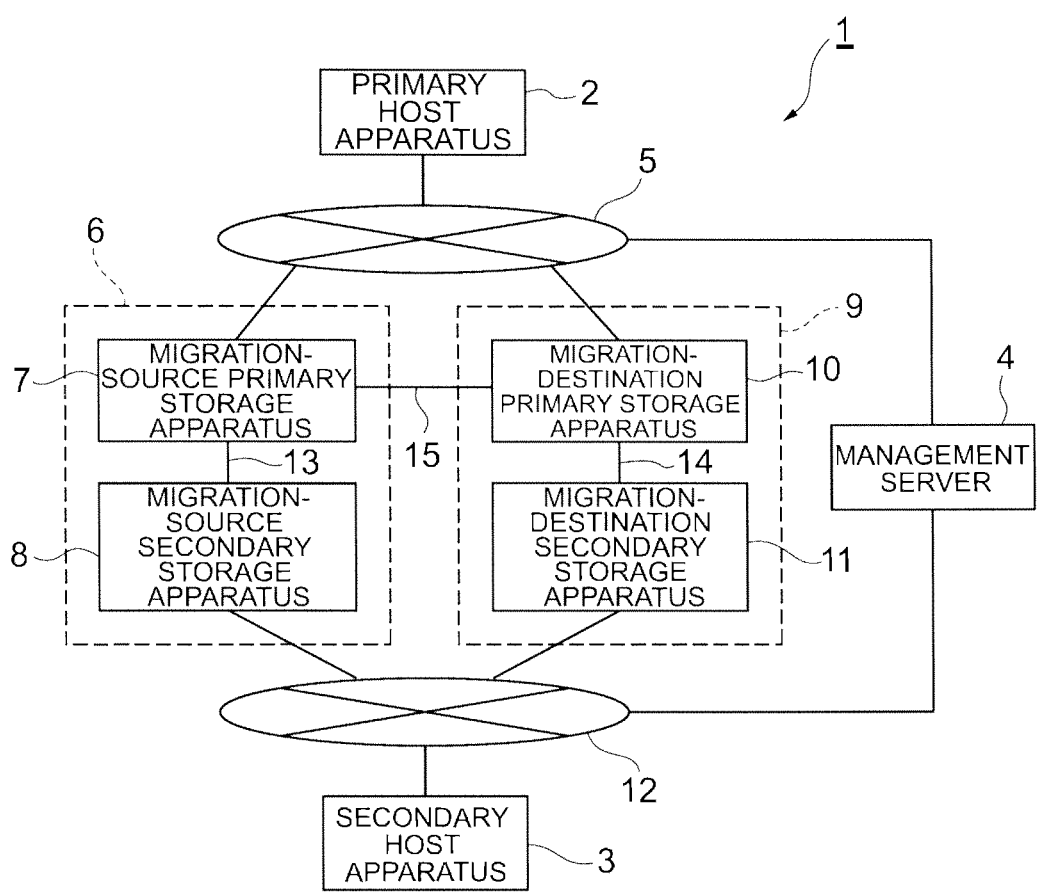
FIG. 1 is a block diagram showing the overall configuration of a computer system according to a first embodiment.

(1) First Embodiment (1-1) Hardware Configuration of a Computer System According to this Embodiment In FIG. 1, 1 indicates the overall computer system according to this embodiment. This computer system 1 is configured comprising a primary host apparatus 2, a secondary host apparatus 3, and a management server 4. Further, the primary host apparatus 2 is connected to a first primary storage apparatus 7 of a first storage apparatus group 6 and a second migration-destination primary storage apparatus 10 of a second storage apparatus group 9 via a first network 5. The secondary host apparatus 3 is connected to a first secondary storage apparatus 8 of the first storage apparatus group 6 and a second secondary storage apparatus 11 of the second storage apparatus group 9 via a second network 12. Further, the management server 4 is connected to both the first and second networks 5 and 12 respectively. Note that the first and second networks 5 and 12 are connected via a third network (not shown).

In addition, the first primary storage apparatus 7 and first secondary storage apparatus 8 of the first storage apparatus group 6 are mutually connected via a first communication path 13 configured from a cable or network or the like, and the second migration-destination primary storage apparatus 10 and second migration-destination secondary storage apparatus 11 of the second storage apparatus group 9 are mutually connected via a second communication path 14 configured from a cable or network or the like. The first and second primary storage apparatuses 7 and 10 are interconnected via a third communication path 15 configured from a cable or network or the like.

Note that, in the case of this embodiment, the first primary storage apparatus 7 and first secondary storage apparatus 8 of the first storage apparatus group 6 are existing storage apparatuses which are in the computer system 1 and that the second migration-destination primary storage apparatus 10 and second migration-destination secondary storage apparatus 11 of the second storage apparatus group 9 are new storage apparatuses which are introduced to the computer system 1 in place of the first primary storage apparatus 7 and first secondary storage apparatus 8 respectively. In the following, the first storage apparatus group 6, first primary storage apparatus 7 and first secondary storage apparatus 8 are referred to as the migration-source storage apparatus group 6, migration-source primary storage apparatus 7, and the migration-source secondary storage apparatus 8 respectively, and the second storage apparatus group 9, second migration-destination primary storage apparatus 10, and second migration-destination secondary storage apparatus 11 are called the migration-destination storage apparatus group 9, migration-destination primary storage apparatus 10, and migration-destination secondary storage apparatus 11 respectively.

Figure 2:
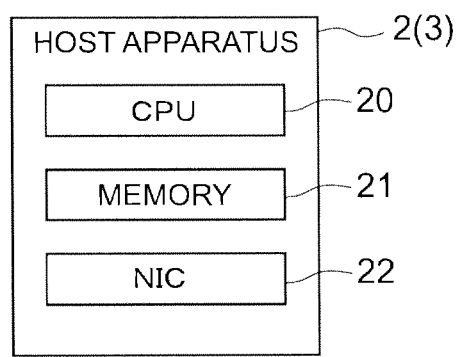
FIG. 2 is a block diagram showing the overall configuration of a primary host apparatus and a second host apparatus.

The primary host apparatus 2 and secondary host apparatus 3 are computer devices for executing processing corresponding to user tasks and are configured from a personal computer or mainframe or similar. As shown in FIG. 2, the primary host apparatus 2 and secondary host apparatus 3 both comprise information processing resources such as a CPU (Central Processing Unit) 20, memory 21, and NIC (Network Interface Card) 22, and are connected to the first or second network 5, 12 via the NIC 22. Further, the memory 21 of the primary host apparatus 2 and secondary host apparatus 3 respectively store application software corresponding to user tasks and, as a result of executing this application software, for the primary host apparatus 2 or secondary host apparatus 3, the CPU 20 reads/writes data to the migration-source primary storage apparatus 7 or migration-destination primary storage apparatus 10 via the first network 5 or reads/writes data to the migration-source secondary storage apparatus 8 or migration-destination secondary storage apparatus 11 via the second network 12.

Figure 3:
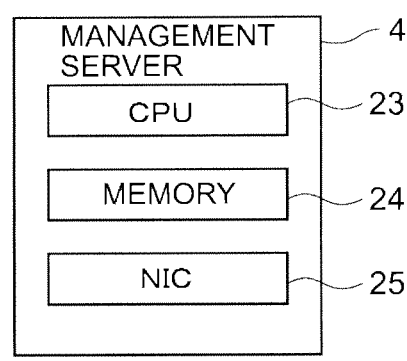
FIG. 3 is a block diagram showing the overall configuration of a management server.

The management server 4 is a server apparatus which is used by the system administrator to manage the computer system 1 and is configured from a personal computer or mainframe or similar. As shown in FIG. 3, the management server 4 comprises information processing resources such as a CPU 23, memory 24, and NIC 25 and is connected to the first and second networks 5 and 12 respectively via the NIC 25. Furthermore, the memory 24 of the management server 4 stores various control programs and, as a result of executing these control programs, the CPU 23 executes various processing, described subsequently, for the whole management server 4.

Figure 4:
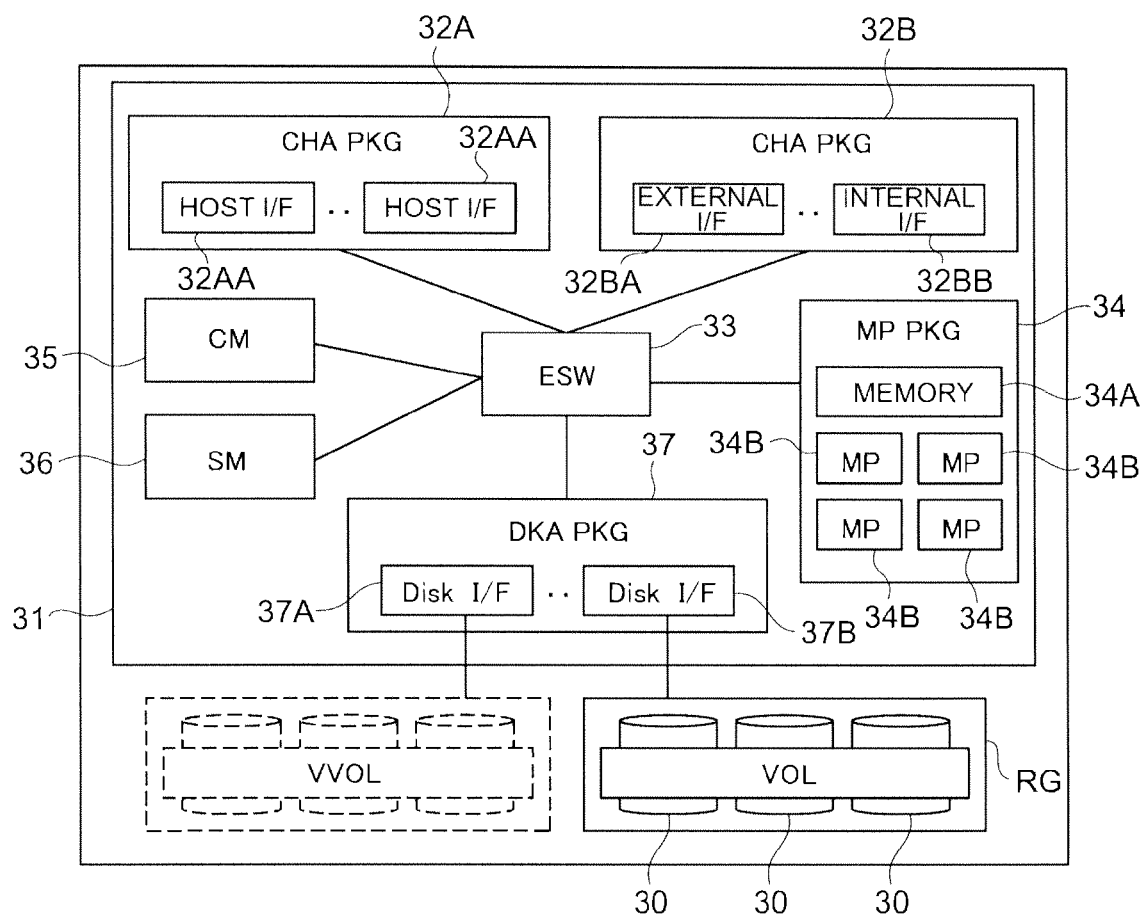
FIG. 4 is a block diagram showing the overall configuration of a migration-source primary storage apparatus, a migration-source secondary storage apparatus, a migration-destination primary storage apparatus, and a migration-destination secondary storage apparatus.

As shown in FIG. 4, the migration-source primary storage apparatus 7, migration-source secondary storage apparatus 8, the migration-destination primary storage apparatus 10, and migration-destination secondary storage apparatus 11 comprise a plurality of storage devices 30 and a controller 31 for controlling data I/Os to/from the storage devices 30.

As storage devices 30, high-cost disks such as SCSI (Small Computer System Interface) disks or SAS (Serial Attached SCSI) disks or low-cost disks such as SATA (Serial AT Attachment) disks or optical disks are adopted, for example. Note that, as storage devices 30, semiconductor memories such as SSD (Solid State Drive), for example, can also be adopted.

One RAID (Redundant Array of Inexpensive Disks) group RG is configured by one or more storage devices 30 and one or more logical volumes VOL are configured in a physical storage area provided by each storage device 30 which forms part of one RAID group RG. Furthermore, data from primary host apparatus 2 or secondary host apparatus 3 is stored in units of blocks (hereinafter called logical blocks) of a predetermined size in the logical volume VOL.

Unique identifiers (hereinafter called volume numbers) are each assigned to each of the logical volumes VOL. The data I/Os to/from each of the logical volumes VOL are executed by designating addresses which are obtained by combining the volume numbers with numbers (LBA: Logical Block Address) pertaining to the logical blocks assigned to each of the logical blocks.

Here, attributes of the logical volumes VOL which are configured in the storage apparatus (migration-source primary storage apparatus 7, migration-source secondary storage apparatus 8, migration-destination primary storage apparatus 10, and migration-destination secondary storage apparatus 11) include command device, primary volume, secondary volume, virtual volume, and virtual command device and so on.

A command device is a virtual volume which is provided to the primary host apparatus 2 and secondary host apparatus 3 as the transmission destination when the primary host apparatus 2 or secondary host apparatus 3 transmits a command to the desired storage apparatus. The controller 31 executes read processing or write processing which corresponds to the read command or write command of a read command or write command, which takes the command device as the write destination, is supplied.

Furthermore, a primary volume is a primary logical volume VOL in a case where a remote-copy copy pair is configured between two storage apparatuses and a secondary volume is a secondary logical volume VOL for this copy pair. As described earlier, the data from the primary host apparatus 2 or secondary host apparatus 3 is read/written to the primary volume and the data written to the primary volume is remote-copied to the secondary volume synchronously or asynchronously.

In addition, the virtual volume is a virtual logical volume VOL which is a non-entity and the virtual command device is a virtual command device which is a non-entity.

Figure 5:
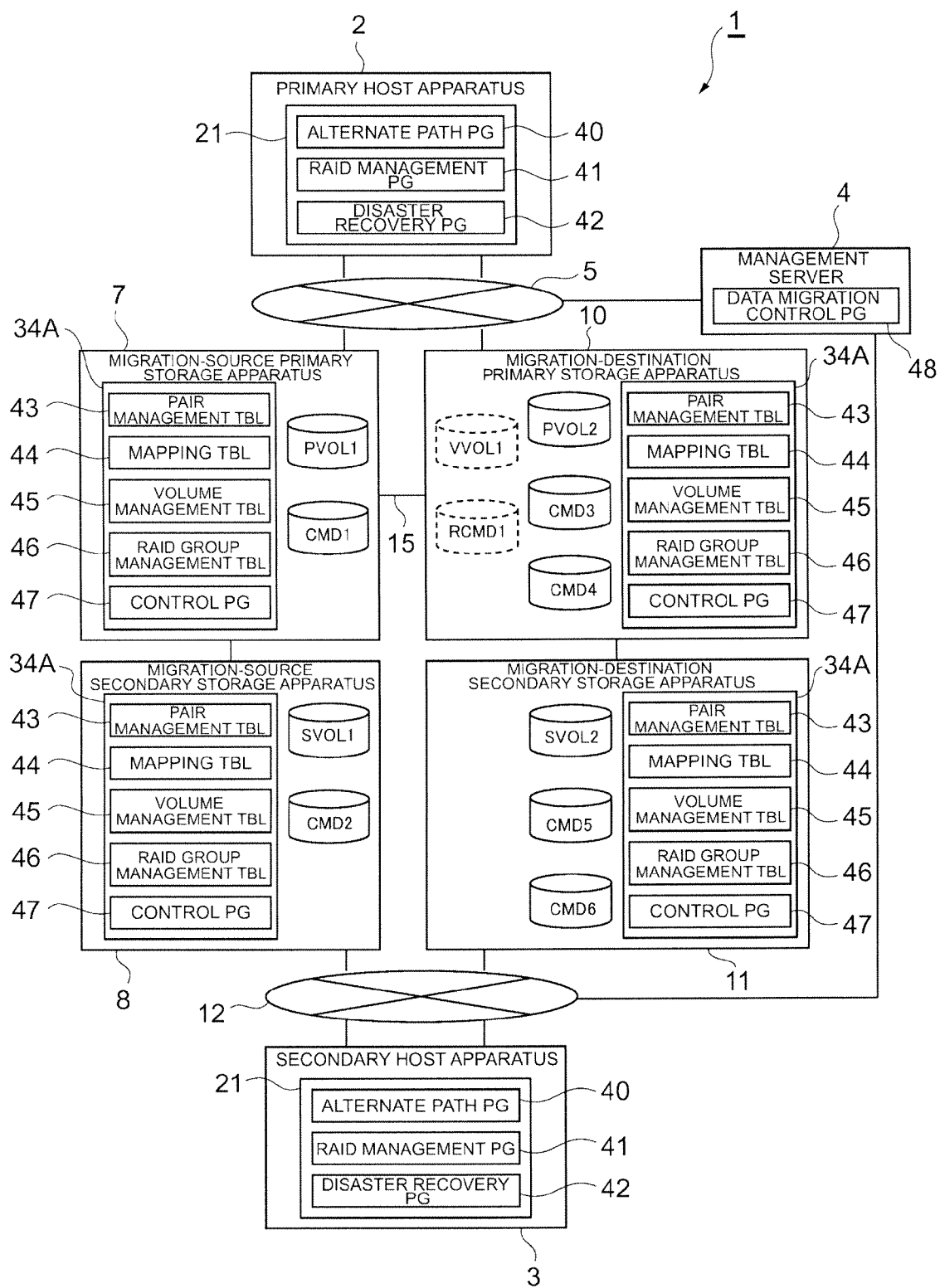
FIG. 5 is a block diagram showing the logical configuration of the computer system according to the first embodiment.

Note that, in the case of this computer system, as shown in FIG. 5, defined in the migration-source primary storage apparatus 7 are a primary volume PVOL1 which is provided to the primary host apparatus 2 as a logical volume VOL for reading/writing data and a command device CMD1 which is provided to the primary host apparatus 2 as a command write destination, and defined in the migration-source secondary storage apparatus 8 are a secondary volume SVOL1 which forms a remote-copy copy pair with a primary volume PVOL1 and a command device CMD2 which is provided as a command write destination to the migration-source primary storage apparatus 7 and secondary storage apparatus 3.

Further, defined in the migration-destination primary storage apparatus 10 are a primary volume PVOL2 in place of the primary volume PVOL1 of the migration-source primary storage apparatus 7, a plurality of command devices CMD3, CMD4 in place of the command device CMD1 of the migration-source primary storage apparatus 7, a first virtual volume VVOL1 obtained by virtualizing the primary volume PVOL1 of the migration-source primary storage apparatus 7, and a first virtual command device RCMD1 obtained by virtualizing the command device CMD1 of the migration-source primary storage apparatus 7. In addition, defined in the migration-destination secondary storage apparatus 11 are a secondary volume in place of the secondary volume SVOL1 of the migration-source secondary storage apparatus 8 and a plurality of command devices CMD5, CMD6 in place of the command device CMD2 of the migration-source secondary storage apparatus 8.

Meanwhile, the controller 31 is configured comprising first and second channel adapter packages 32A and 32B, a connector 33, a microprocessor package 34, a cache memory 35, and a shared memory 36, and one or more disk adapter packages 37.

The first channel adapter package 32A is configured comprising one or more host interfaces 32AA. Each of the host interfaces 32AA is an interface which performs protocol control during communication with the primary host apparatus 2 or secondary host apparatus 3 and comprises a port for connecting to the first or second network 5, 12. The ports has a unique WWN (World Wide Name) for identifying the ports in the first or second network 5, 12.

Upon receiving write commands which designate, as write destinations, command devices CMD 1 to 6 and write target data from the primary host apparatus 2 or secondary host apparatus 3, the host interface 32AA stores the write commands in the internal memory 34A of the microprocessor package 34, described subsequently, and stores the write target data in the cache memory 35. In addition, upon receiving a read command which designates command devices CMD1 to 6 as write destinations from the primary host apparatus 2 or secondary host apparatus 3, the host interface 32AA stores the read command in the internal memory 34A of the microprocessor package 34 and, as a result, reads data from the cache memory 35 that has been read from the shared memory 36 and written to the cache memory 35, and transmits this data to the transmission-source primary host apparatus 2 or secondary host apparatus 3 of the read command.

Furthermore, the second channel adapter package 32B is configured comprising one or more external interfaces 32BA and one or more internal interfaces 32BB. The internal interface 32BB is an interface for performing protocol control during communication with another storage apparatus which forms part of the same migration-source storage apparatus group 6 or migration-destination storage apparatus group 9, and the external interface 32BA is an interface which performs protocol control during communication with another storage apparatus which is logically connected by an external connection function.

The connector 33 is connected to the first and second channel adapter packages 32A, 32B, the microprocessor package 34, the cache memory 35, the shared memory 36, and the disk adapter package 37. The exchange of data and commands between the first and second channel adapter packages 32A and 32B, the cache memory 35, the shared memory 36, and the disk adapter package 37 is performed via this connector 33. The connector 33 is configured by a switch such as an ultrahigh-speed crossbar switch, or a bus, which performs data transfers by means of high-speed switching, for example.

The microprocessor package 34 comprises an internal memory 34A and one or more microprocessors 34B. In addition to storing various control programs and control information, the internal memory 34A stores write commands and read commands from the primary host apparatus 2 or secondary host apparatus 3, as mentioned earlier. The microprocessor 34B is a processor which governs control of the operation of the whole storage apparatus and which executes corresponding processing in response to the commands and the like from the primary host apparatus 2 or secondary host apparatus 3 which are stored in the internal memory 34A based on the control program stored in the internal memory 34A.

The cache memory 35 and shared memory 36 are memories which are shared by the disk adapter package 37 together with the first and second channel adapter packages 32A and 32B. The cache memory 35 is mainly used to temporarily store data which is input/output to and from the storage apparatuses. Furthermore, the shared memory 36 is mainly used to store various control information and so forth such as system configuration information relating to the overall configuration of the storage apparatuses.

The disk adapter packages 37 are each configured comprising one or more disk interfaces 37A. The disk interfaces 37A are interfaces which perform protocol control during communication with the storage devices 30, and which each comprise ports for connecting to the storage devices 30. The disk interfaces 37A control the corresponding storage devices 30 in response to read/write commands from the primary host apparatus 2 or secondary storage apparatus 3 and read/write the required data from/to these storage devices 30.

Note that, in the case of this embodiment, a remote-copy function is installed in at least the migration-source primary storage apparatus 7 and migration-destination primary storage apparatus 10 and an external connection function is installed in the migration-destination primary storage apparatus 10. Furthermore, in addition to this remote-copy function and external connection function, the migration-destination primary storage apparatus 10 is equipped with a volume migration function, which migrates management information such as data stored in the primary volume PVOL1 of the migration-source migration destination primary storage apparatus 10 and the volume number or the like of the primary volume PVOL1 to the logical volume VOL (primary volume PVOL2) in its own storage apparatus which is associated with the primary volume PVOL1.

(1-2) Logical Configuration of the Computer System

FIG. 5 shows the logical configuration of the computer system 1. As can also be seen from FIG. 5, each memory 21 of the primary host apparatus 2 and secondary host apparatus 3 stores an alternate path program 40, a RAID management program 41, and a disaster recovery program 42.

Among these programs, the alternate path program 40 is a program which configures a path via the migration-destination primary storage apparatus 10 as an alternate path for the path from the primary host apparatus 2 to the command device CD1 or primary volume PVOL1 in the migration-source primary storage apparatus 7, or configures a path via the migration-destination secondary storage apparatus 11 as an alternate path for the path from the secondary host apparatus 3 to the secondary volume SVOL1 or command device CMD2 in the migration-source secondary storage apparatus 8.

Furthermore, the RAID management program 41 is a program for managing the RAID group RG created in each storage apparatus (migration-source primary storage apparatus 7, migration-source secondary storage apparatus 8, migration-destination primary storage apparatus 10, and migration-destination secondary storage apparatus 11), and the disaster recovery program 42 is a program which, when a fault arises in the primary host apparatus 2 or any of the storage apparatuses (migration-source primary storage apparatus 7, migration-source secondary storage apparatus 8, migration-destination primary storage apparatus 10, or migration-destination secondary storage apparatus 11), executes predetermined disaster recovery processing such as handing over the processing to the secondary host apparatus 3 via a third network (not shown) described earlier with reference to FIG. 1.

Meanwhile, the internal memory 34A of each microprocessor package 34 in the migration-source primary storage apparatus 7, migration-source secondary storage apparatus 8, migration-destination primary storage apparatus 10, and migration-destination secondary storage apparatus 11 stores, respectively, a pair management table 43, a mapping table 44, a volume RAID group management table 45, a RAID group storage device management table 46, and a control program 47.

The pair management table 43 is a table for managing a copy pair for the remote copy processing which is executed according to the control program 47 and, as shown in FIG. 6, is configured comprising a copy pair number field 43A, a primary volume number field 43B, a secondary volume number field 43C, a state field 43D, a primary host identification volume number field 43E, and a secondary host identification volume number field 43F.

Further, the copy pair number field 43A stores identification numbers (hereinafter called copy pair numbers) which are assigned to the corresponding copy pairs. In addition, the primary volume number field 43B stores the volume number of the primary logical volume VOL (primary volume PVOL1, PVOL2) among the two logical volumes VOL which form the corresponding copy pairs, and the secondary volume number field 43C stores the volume number of the secondary logical volume VOL (secondary volume SVOL1, SVOL2) among these two logical volumes VOL.

Furthermore, the state field 43D stores the state of the corresponding copy pair. Note that copy pair states include "copy," "pair," and "suspend." Of these, "copy" represents a state during copy formation in which data of the primary volumes PVOL1, PVOL2 is copied to the secondary volumes SVOL1, SVOL2, and "pair" indicates a state where a remote copy is made from the primary volume PVOL1, PVOL2 to the secondary volumes SVOL1, SVOL2. Further, "suspend" represents a state where the primary volumes PVOL1, PVOL2 and secondary volumes SVOL1, SVOL2 are logically separate and the data written to the primary volumes PVOL1, PVOL2 is not copied to the secondary volumes SVOL1, SVOL2.

The primary host identification volume number field 43E stores the volume numbers of the primary volumes PVOL1, PVOL2 identified by the primary host apparatus 2 and secondary host apparatus 3. In addition, the secondary host identification volume number field 43F stores the volume numbers of the secondary volumes SVOL1, SVOL2 identified by the primary host apparatus 2 and secondary host apparatus 3.

The mapping table 44 is a table which is used to manage the mapping relationships between the first virtual volume VVOL1 in the migration-destination primary storage apparatus 10 and the real volume (primary volume PVOL1) in the migration-source primary storage apparatus 7 which are mapped by the external connection function of the migration-destination primary storage apparatus 10 and, as shown in FIG. 7, [the mapping table 44] is configured comprising a mapping pair number field 44A, a virtual volume number field 44B, a real volume number field 44C, an access path field 44D, and a cache mode field 44E.

Further, the mapping pair number field 44A stores identification numbers (hereinafter called mapping pair numbers) which are assigned to pairs (hereinafter called mapping pairs) which are configured from a first virtual volume VVOL1 and a real volume in a mapping relationship. In addition, the virtual volume number field 44B stores volume number of the first virtual volume VVOL1 which is the mapping source in the mapping pair, and the real volume number field 44C stores the volume numbers of real volumes to which the virtual volume VVOL1 is mapped.

Furthermore, the access path field 44D stores information such as port numbers of routing ports and volume numbers of the routing logical volumes VOL and in mapping from the corresponding first virtual volume VVOL1 to a real volume. In addition, the cache mode field 44E stores codes indicating the cache modes configured for the corresponding mapping pair. Note that details of the "cache mode" will be subsequently provided.

The volume RAID group management table 45 is a table which is used to manage correspondence relationships between logical volumes VOL provided in the storage apparatuses and RAID groups RG providing storage areas to the logical volumes VOL and, as shown in FIG. 8, is configured comprising a management number field 45A, a volume number field 45B, a RAID group number field 45C, and a RAID level field 45D.

Further, the management number field 45A stores management numbers assigned to the corresponding logical volumes VOL and the volume number field 45B stores volume numbers assigned to the logical volumes VOL. In addition, the RAID group number field 45C stores identifiers (RAID group numbers) of the RAID groups RG (FIG. 4) which provide the storage area where the logical volumes VOL are defined, and the RAID level field 45D stores the RAID levels of these RAID groups RG.

In addition, the RAID group storage device management table 46 is a table which is used for managing correspondence relationships between the RAID groups RG defined in these storage apparatuses and storage devices 30 (FIG. 4) which the RAID groups RG comprise and, as shown in FIG. 9, are configured comprising a management number field 46A, a RAID group number field 46B, a RAID level field 46C, a drive number field 46D, a drive type field 46E, and a capacity field 46F.

Furthermore, the management number field 46A stores management numbers which are assigned to the corresponding RAID groups RG and the RAID group number field 46B stores RAID group numbers which are assigned to the RAID groups RG. In addition, the RAID level field 46C stores the RAID levels of the RAID groups RG and the capacity field 46F stores the capacity of the total storage area provided by the RAID groups RG.

Moreover, the drive field 46D stores all the identifiers (drive numbers) assigned to each of the storage devices 30 (FIG. 4) which the RAID groups RG comprise, and the drive type field 46F stores the types of storage devices 30 (SAS, SATA, or SSD, or the like).

In addition, the control program 47 is a program which causes the storage apparatuses (the migration-source primary storage apparatus 7, migration-source secondary storage apparatus 8, migration-destination primary storage apparatus 10, or migration-destination secondary storage apparatus 11) to execute read processing or write processing which corresponds to read commands or write commands from the primary host apparatus 2 or secondary host apparatus 3, various processing based on the foregoing remote-copy function, various processing based on the external connection function, and various processing based on the volume migration function, and the like. As a result of executing the control program 47, each of the microprocessors 34B (FIG. 4) of the microprocessor package 34 (FIG. 4) executes various processing, described subsequently, for the storage apparatuses overall.

Meanwhile, as shown in FIG. 5, the memory 24 (FIG. 3) of the management server 4 stores a data migration control program 48. The data migration control program 48 is a program which performs control processing (hereinafter called data migration control processing) to cause the migration-source primary storage apparatus 7, migration-source secondary storage apparatus 8, migration-destination primary storage apparatus 10 and migration-destination secondary storage apparatus 11 and the like to execute data migration processing for migrating data in the migration source storage apparatus group 6 (FIG. 1) to the migration-destination storage apparatus group 9. Details of the data migration control processing will be provided subsequently.

(1-2) Data Migration Routine According to this Embodiment

The processing routine, in the computer system 1, for data migration processing for migrating data from the migration-source storage apparatus group 6 to the migration-destination storage apparatus group 9 which is executed when the migration-source storage apparatus group 6 is replaced with the migration-destination storage apparatus group 9, will be described next.

Figure 10:
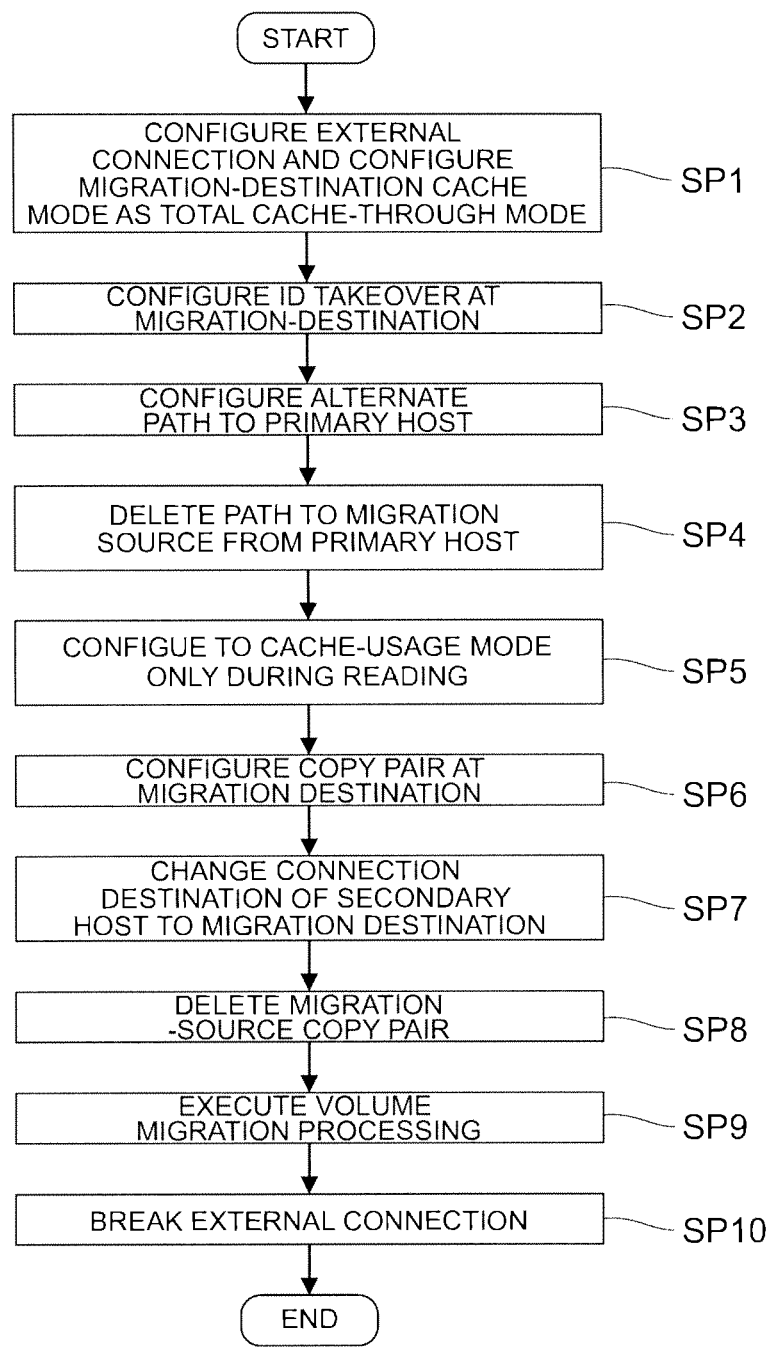
FIG. 10 is a flowchart showing a processing procedure of first data migration control processing.

FIG. 10 shows, in connection with this data migration processing, the processing routine for first data migration control processing which is executed by the CPU 23 (FIG. 3) of the management server 4 based on the data migration control program 48 (FIG. 5). As a result of controlling the primary host apparatus 2, secondary host apparatus 3, migration-source primary storage apparatus 7, or migration-destination primary storage apparatus 10 or the like in accordance with the processing routine for the first data migration control processing shown in FIG. 10, the CPU 23 of the management server 4 causes the migration-destination primary storage apparatus 10 to migrate data stored in the migration-source primary storage apparatus 7 and causes the migration-destination secondary storage apparatus 11 to migrate data stored in the migration-source secondary storage apparatus 8.

In reality, when a command to execute data migration processing is supplied by the system administrator after the migration-source primary storage apparatus 7 and migration-destination primary storage apparatus 10 have been connected via the third communication path 15 (FIG. 1), the CPU 23 of the management server 4 starts the first data migration control processing shown in FIG. 10 and first externally connects the migration-destination primary storage apparatus 10 to the migration-source primary storage apparatus 7 (SP1).

More specifically, the CPU 23 supplies an instruction to the migration-destination primary storage apparatus 10 to create one or more first virtual volumes VVOL1 in the migration-destination primary storage apparatus 10 in association with each of the primary volumes PVOL1 defined in the migration-source primary storage apparatus 7 and issues an instruction to the migration-destination primary storage apparatus 10 to create a first virtual command device RCMD1 in the migration-destination primary storage apparatus 10 in association with the command device CMD1 defined in the migration-source primary storage apparatus 7.

Furthermore, the CPU 23 supplies an instruction to the migration-destination primary storage apparatus 10 to map the first virtual volume VVOL1 created in the migration-destination primary storage apparatus 10 to the corresponding primary volume PVOL1 in the migration-source primary storage apparatus 7, according to this instruction, and to map the first virtual command device RCMD1 created in the migration-destination primary storage apparatus 10 to the corresponding command device CMD1 in the migration-source primary storage apparatus 7, according to this instruction.

Figure 11:
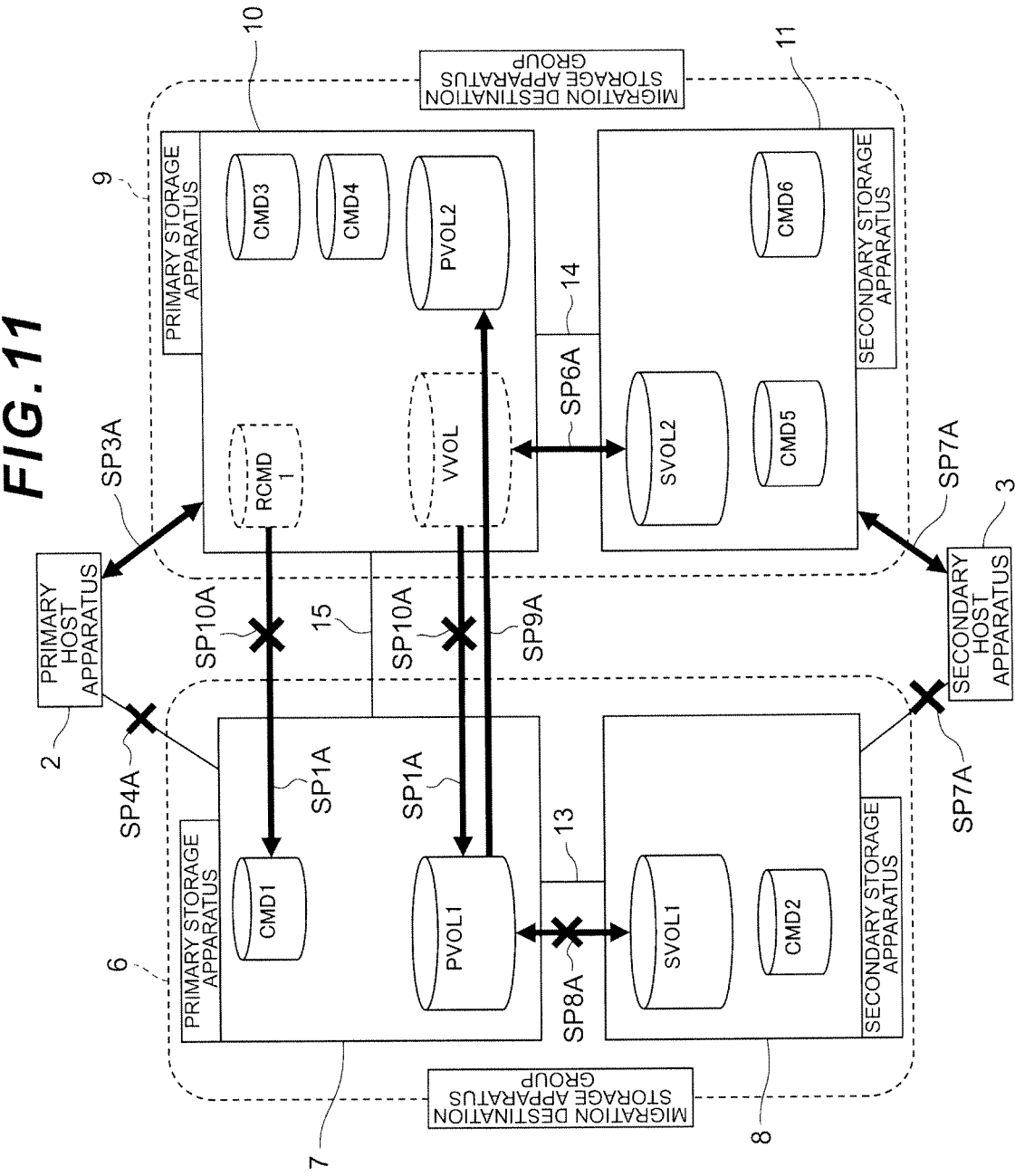
FIG. 11 is a conceptual view showing the flow of first data migration processing.

Thus, by registering the required information in the mapping table 44 (FIG. 7) according to this instruction, the migration-destination primary storage apparatus 10 maps, as shown in FIG. 11, the first virtual volume VVOL1 in the migration-destination primary storage apparatus 10 to the corresponding primary volume PVOL1 in the migration-destination primary storage apparatus 10, and maps each of the first virtual command devices RCMD1 in the migration-destination primary storage apparatus 10 to the corresponding command device CMD1 in the migration-source primary storage apparatus 7 (SP1A in FIG. 11).

In addition, at this time, the CPU 23 issues an instruction to the migration-destination primary storage apparatus 10 to configure the cache mode of the migration-destination primary storage apparatus 10 as total cache-through mode if a write command or read command targeting the first virtual volume VVOL1 is supplied to the migration-destination primary storage apparatus 10 from the primary host apparatus 2 (SP1).

Here, the cache modes of the migration-destination primary storage apparatus 10 will be described for a case where a write command or read command targeting the first virtual volume VVOL1 is supplied to the migration-destination primary storage apparatus 10 from the primary host apparatus 2. In the case of this embodiment, such cache modes include a cache usage mode and a cache-through mode.

The cache usage mode is a cache mode in which, if a write command targeting the first virtual volume VVOL1 and write-target data are supplied from the primary host apparatus 2, the write-target data is written to the cache memory 35 (FIG. 4) of the migration-destination primary storage apparatus 10, whereupon a write processing completion notice is transmitted to the primary host apparatus 2, or in which cache mode, if a read command targeting the first virtual volume VVOL1 is supplied from the primary host apparatus 2 and when the read-target data exists in the cache memory 35 of the migration-destination primary storage apparatus 10, the data is read from the cache memory 35 and transferred to the primary host apparatus 2, thus ending the read processing.

Further, cache-through mode indicates a cache mode in which, if a write command targeting the first virtual volume VVOL1 and write-target data are supplied from the primary host apparatus 2, irrespective of whether the pre-update write-target data exists in the cache memory 35, the write-target data is transferred to the migration-source primary storage apparatus 7 by the external connection function of the migration-destination primary storage apparatus 10 and written to the corresponding primary volume PVOL1 in the migration-source primary storage apparatus 7, whereupon a write processing completion notice is transmitted to the primary host apparatus 2, or in which cache mode, if a read command targeting the first virtual volume VVOL1 is supplied from the primary host apparatus 2, irrespective of whether the read-target data exists in the cache memory 35 of the migration-destination primary storage apparatus 10, the read-target data is read from the corresponding primary volume PVOL1 of the migration-source primary storage apparatus 7 by the external connection function of the migration-destination primary storage apparatus 10 and transferred to the primary host apparatus 2.

Furthermore, in this specification, a cache mode, in which read processing or write processing is executed in the foregoing cache-through mode if both a write command and also a read command targeting the first virtual volume VVOL1 are supplied from the primary host apparatus 2, is called a total cache-through mode.

The CPU 23 subsequently executes first ID takeover configuration processing in which management information, relating to each of the primary volumes PVOL1 and command device CMD1 in the migration-source primary storage apparatus 7, is configured for the corresponding first virtual volume VVOL1 or first virtual command device RCMD1 in the migration-destination primary storage apparatus 10 (SP2).

More specifically, the CPU 23 acquires apparatus information on the migration-source primary storage apparatus 7 and device information on the primary volume PVOL1 and command device CMD1 from the migration-source primary storage apparatus 7. In this case, as shown in FIG. 12, this apparatus information includes the apparatus name of the migration-source primary storage apparatus 7, the WWN of each port to which the primary volume PVOL1 and command device CMD1 in the migration-source primary storage apparatus 7 are connected, the logical disk controller number, the S/N (Serial Number), and the port name and port number/adapter number, and the device information includes the SSID (Storage Subsystem ID) of the primary volume PVOL1 and command device CMD1, the emulation type, the HDEV number and the logical volume number. The logical disk controller number is an identification number which is given to a logical disk controller defined in the storage apparatus and the SSID is a number which is assigned to each address of the logic devices in the storage apparatus.

Furthermore, the CPU 23 configures the then acquired apparatus and device information for the migration-destination primary storage apparatus 10 as virtual information pertaining to the migration-destination primary storage apparatus 10, first virtual volume VVOL1 and first virtual command device RCMD1 which is to be transmitted to the primary host apparatus 2 upon receipt of an inquiry command from the primary host apparatus 2.

Hence, if the inquiry command from the primary host apparatus 2 is received, the migration-destination primary storage apparatus 10 subsequently transmits apparatus information of the migration-source primary storage apparatus 7 configured as above to the primary host apparatus 2 as apparatus information for its own storage apparatus, and transmits device information on the corresponding primary volume PVOL1 or command device CMD1 in the migration-source primary storage apparatus 7 to the primary host apparatus 2 as device information of the first virtual command device RCMD1 and first virtual volume VVOL1.

The CPU 23 then supplies an instruction to the primary host apparatus 2 to configure the path to the migration-destination primary storage apparatus 10 as an alternate path to the migration-source primary storage apparatus 7 (SP3). The alternate path program 40 (FIG. 5) of the primary host apparatus 2 which receives the instruction configures a path to the migration-destination primary storage apparatus 10 as an alternate path for the path to the migration-source primary storage apparatus 7 (SP3A of FIG. 11).

In addition, the CPU 23 subsequently issues an instruction to the primary host apparatus 2 to delete the path to the migration-source primary storage apparatus 7 (SP4). The alternate path program 40 of the primary host apparatus 2 which receives the instruction thus deletes the path to the migration-source primary storage apparatus 7 (SP4A in FIG. 11).

The CPU 23 subsequently configures the cache mode of the migration-destination primary storage apparatus 10 to correspond to cache mode only when a write command is received targeting the primary volume PVOL1 or command device CMD1 in the migration-source primary storage apparatus 7 and to correspond to cache usage mode when a read command is received targeting the primary volume PVOL1 or command device CMD1 (SP5).

Hence, when a write command is supplied by the primary host apparatus 2, the migration-destination primary storage apparatus 10 subsequently transmits a write processing completion notice to the primary host apparatus 2 after storing the write-target data in the primary volume PVOL1 in the migration-source primary storage apparatus 7, and when a read command is supplied from the primary host apparatus 2, determines whether or not the read-target data exists in the cache memory 35 (FIG. 4) and if this data does exist therein, transfers the data to the primary host apparatus 2 and if non-existent, reads the data from the migration-source primary storage apparatus 7 and transfers same to the primary host apparatus 2.

Subsequently, the CPU 23 supplies an instruction to the migration-destination primary storage apparatus 10 and migration-destination secondary storage apparatus 11 to configure the first virtual volume VVOL1 in the migration-destination primary storage apparatus 10 and the secondary volume SVOL2 in the migration-destination secondary storage apparatus 11 as a remote-copy copy pair (SP6). By registering the required information in the pair management table 43 (FIG. 6), the migration-destination primary storage apparatus 10 and migration-destination secondary storage apparatus 11 configure the first virtual volume VVOL1 and secondary volume SVOL2 as a copy pair (SP6A in FIG. 11).

In addition, the CPU 23 supplies an instruction to the secondary host apparatus 3 to switch the connection destination from the migration-source secondary storage apparatus 8 to the migration-destination secondary storage apparatus 11 (SP7). The alternate path program 40 (FIG. 5) of the secondary host apparatus 3 which receives the instruction configures a new path to the migration-destination secondary storage apparatus 11 and deletes the path to the migration-source secondary storage apparatus 8 (SP8A in FIG. 11).

The CPU 23 subsequently supplies an instruction to the migration-source primary storage apparatus 7 and migration-source secondary storage apparatus 8 to delete the copy pair formed by the primary volume PVOL1 in the migration-source primary storage apparatus 7 and the secondary volume SVOL1 in the migration-source secondary storage apparatus 8 (SP8). The migration-source primary storage apparatus 7 and migration-source secondary storage apparatus 8, having received these instructions, delete information relating to the copy pair from their respective pair management tables 43 which they contain and manage (FIG. 6) (SP8A in FIG. 11).

The CPU 23 subsequently supplies an instruction to the migration-source primary storage apparatus 7 and migration-destination primary storage apparatus 10 to migrate the primary volume PVOL1 of the migration-source primary storage apparatus 7 to the primary volume PVOL2 in the migration-destination primary storage apparatus 10 which is associated with the primary volume PVOL1 by means of the volume migration function of the migration-destination primary storage apparatus 10 (SP9). Thus, the migration-source primary storage apparatus 7 and migration-destination primary storage apparatus 10, having received this instruction, migrate the data stored in the primary volume PVOL1 in the migration-source primary storage apparatus 7 to the corresponding primary volume PVOL2 in the migration-destination primary storage apparatus 10, and configures all the management information including the volume numbers of the primary volume PVOL1 in the migration-source primary storage apparatus 7 as management information of the primary volume PVOL2 in the migration-destination primary storage apparatus 10. (SP9A in FIG. 11).

The CPU 23 subsequently supplies an instruction to the migration-destination primary storage apparatus 10 to delete the external connection state of the migration-source primary storage apparatus 7 to the migration-destination primary storage apparatus 10 (SP10). The migration-destination primary storage apparatus 10 thus deletes the entry (row) showing the mapping relationship between its own first virtual volume VVOL1 and the primary volume PVOL1 in the migration-destination primary storage apparatus 10 from the mapping table 44 (FIG. 7) (SP10A in FIG. 11).

As a result of the foregoing processing, the migration from the migration-source storage apparatus group 6 to the migration-destination storage apparatus group 9 ends. The system administrator is thus subsequently able to remove the migration-source storage apparatus group 6 from the computer system 1.

(1-3) Write Processing and Read Processing

The flow of write processing and read processing which are executed in the migration-source storage apparatus group 6 and/or migration-destination storage apparatus group 9 if, before, during, or after the foregoing data migration processing, an access command (read command or write command) targeting the primary volume PVOL1 in the migration-source primary storage apparatus 7 or the first virtual volume VVOL1 in the migration-destination primary storage apparatus 10 is issued by the primary host apparatus 2, will be described next.

(1-3-1) Before Data Migration

Figure 13:
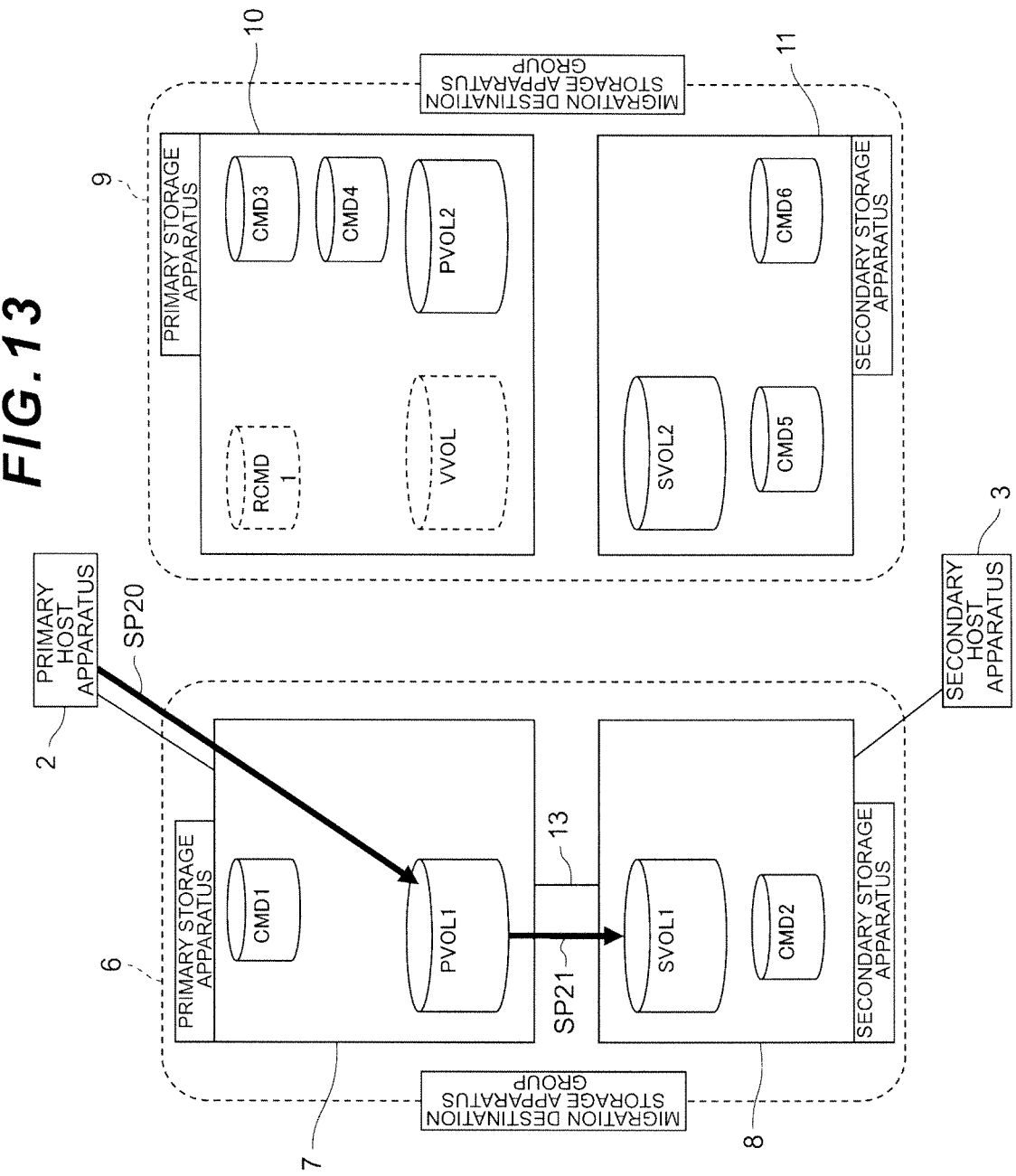
FIG. 13 is a conceptual view serving to provide an overview of read/write processing before the start of data migration processing of the computer system according to the first embodiment.

Since, before this data migration processing starts, only the migration-source primary storage apparatus 7 of the migration-source storage apparatus group 6 is in a state of being connected to the primary host apparatus 2 as shown in FIG. 13, read commands and write commands and the like from the primary host apparatus 2 are all transmitted to the migration-source primary storage apparatus 7.

In this case, upon receiving a write command and write-target data from the primary host apparatus 2 (SP20), the migration-source primary storage apparatus 7 transfers the write-target data to the migration-source secondary storage apparatus 8 and writes this data to the secondary volume SVOL1 in the migration-source secondary storage apparatus 8 which is associated with the primary volume PVOL1 (configured as a remote-copy copy pair) (SP21).

(1-3-1-1) Flow of Write Processing

The specific flow of write processing before data migration processing of the computer system 1 is the same as "the flow of write processing excluding the migration-destination primary storage apparatus" after configuring an alternate path, described subsequently with reference to FIG. 16.

(1-3-1-2) Flow of Read Processing

The specific flow of write processing before data migration processing of the computer system 1 is the same as "the flow of read processing excluding the migration-destination primary storage apparatus" after configuring an alternate path, described subsequently with reference to FIG. 18.

(1-3-1-3) Operation of Computer System when a Fault Occurs at this Stage

The operation of the computer system 1 in a case where a fault occurs in the migration-source primary storage apparatus 7 or the like before the data migration processing starts is shown in FIG. 14.

If a fault occurs in the migration-source primary storage apparatus 7 at this stage, the processing executed by the primary host apparatus 2 is handed over to the secondary host apparatus 3 by the disaster recovery program 42 of the primary host apparatus 2 and secondary host apparatus 3 and the processing is executed continuously by the secondary host apparatus 3. In this case, the remote-copy processing to the secondary volume SVOL1 from the primary volume PVOL1 between the migration-source primary storage apparatus 7 and migration-source secondary storage apparatus 8 and the remote-copy processing from the secondary volume SVOL1 to the primary volume PVOL1 in the reverse direction is suspended. Note that, hereinafter, the suspension of disaster recovery processing including the suspension of remote-copy processing as described hereinabove will be referred to as "the disaster recovery configuration is canceled."

Furthermore, processing by the primary host apparatus 2 is continued as is if a fault occurs in the migration-source secondary storage apparatus 8 at this stage or if a fault arises in the path interconnecting the migration-source primary storage apparatus 7 and migration-source secondary storage apparatus 8. However, the disaster recovery configuration in the migration-source storage apparatus group 6 is also canceled in this case.

In addition, if a fault arises in the migration-destination primary storage apparatus 10 or migration-destination secondary storage apparatus 11 at this stage, the processing by the primary host apparatus 2 is continued as is. In this case, the disaster recovery configuration in the migration-source storage apparatus group 6 is also canceled in this case.

(1-3-2) After Configuring Alternate Path

Figure 15:
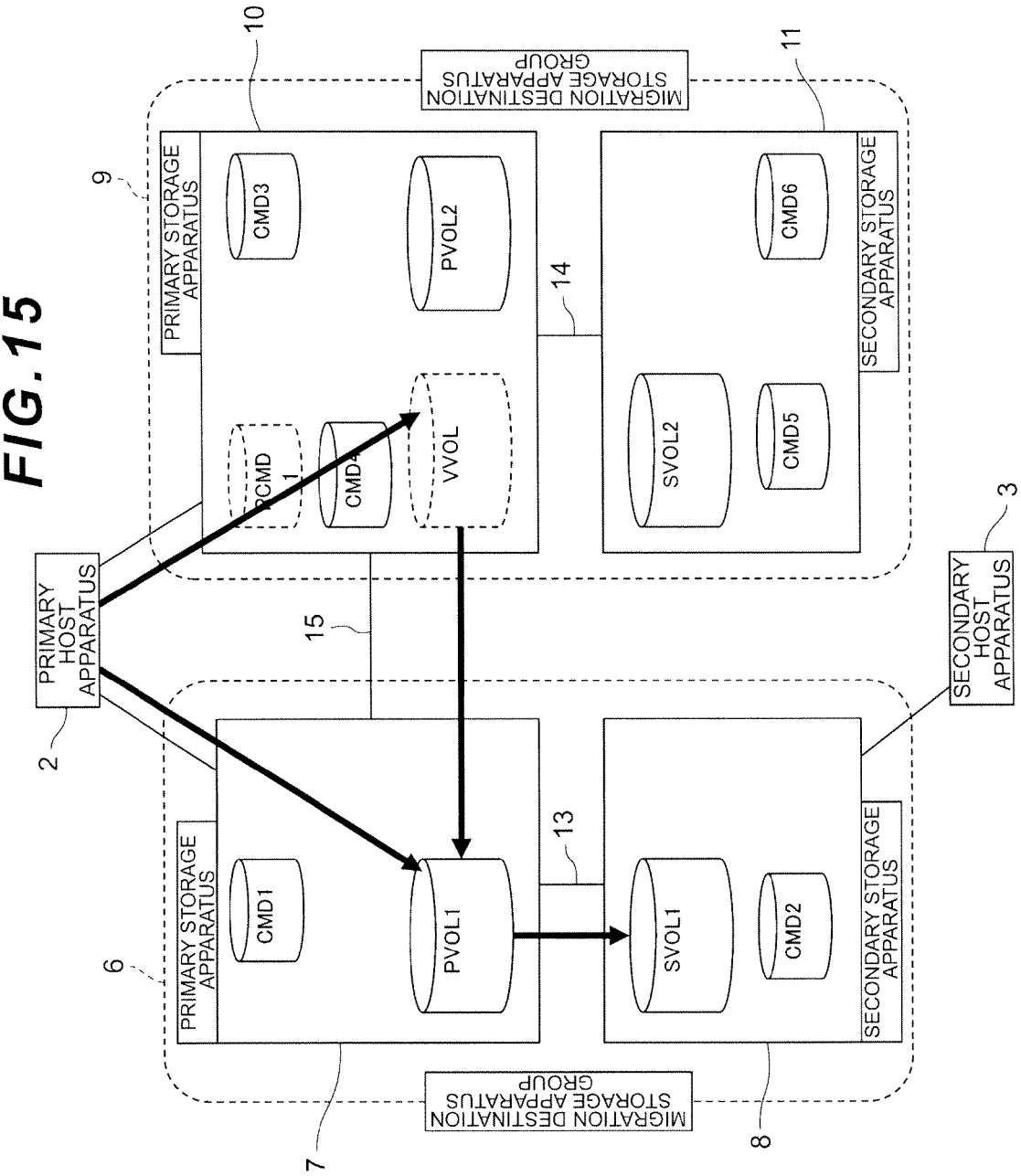
FIG. 15 is a conceptual view serving to provide an overview of read/write processing at a stage after configuring an alternate path in the computer system according to the first embodiment.

If a path via the first virtual volume VVOL1 of the migration-destination primary storage apparatus 10 is configured as an alternate path from the primary host apparatus 2 to the primary volume PVOL1 in the migration-source primary storage apparatus 7 (that is, if the processing of step SP3 in FIG. 10 is executed), as shown in FIG. 15, routes via which the primary host apparatus 2 reads/writes data to the primary volume PVOL1 in the migration-source primary storage apparatus 7 include a first route for reading/writing data to the primary volume PVOL1 by directly transmitting commands to the migration-source primary storage apparatus 7 and a second route for reading/writing data to the primary volume PVOL1 via the migration-destination primary storage apparatus 10.

In this case, since the cache mode of the cache memory 35 is configured as total cache-throughput in the migration-destination primary storage apparatus 10, no mismatch occurs between the data sent back from the migration-source primary storage apparatus 7 when the primary host apparatus 2 transmits a read command to the migration-source primary storage apparatus 7 and the data sent back from the migration-destination primary storage apparatus 10 when a read command is transmitted from the primary host apparatus 2 to the migration-destination primary storage apparatus 10.

Figure 16:
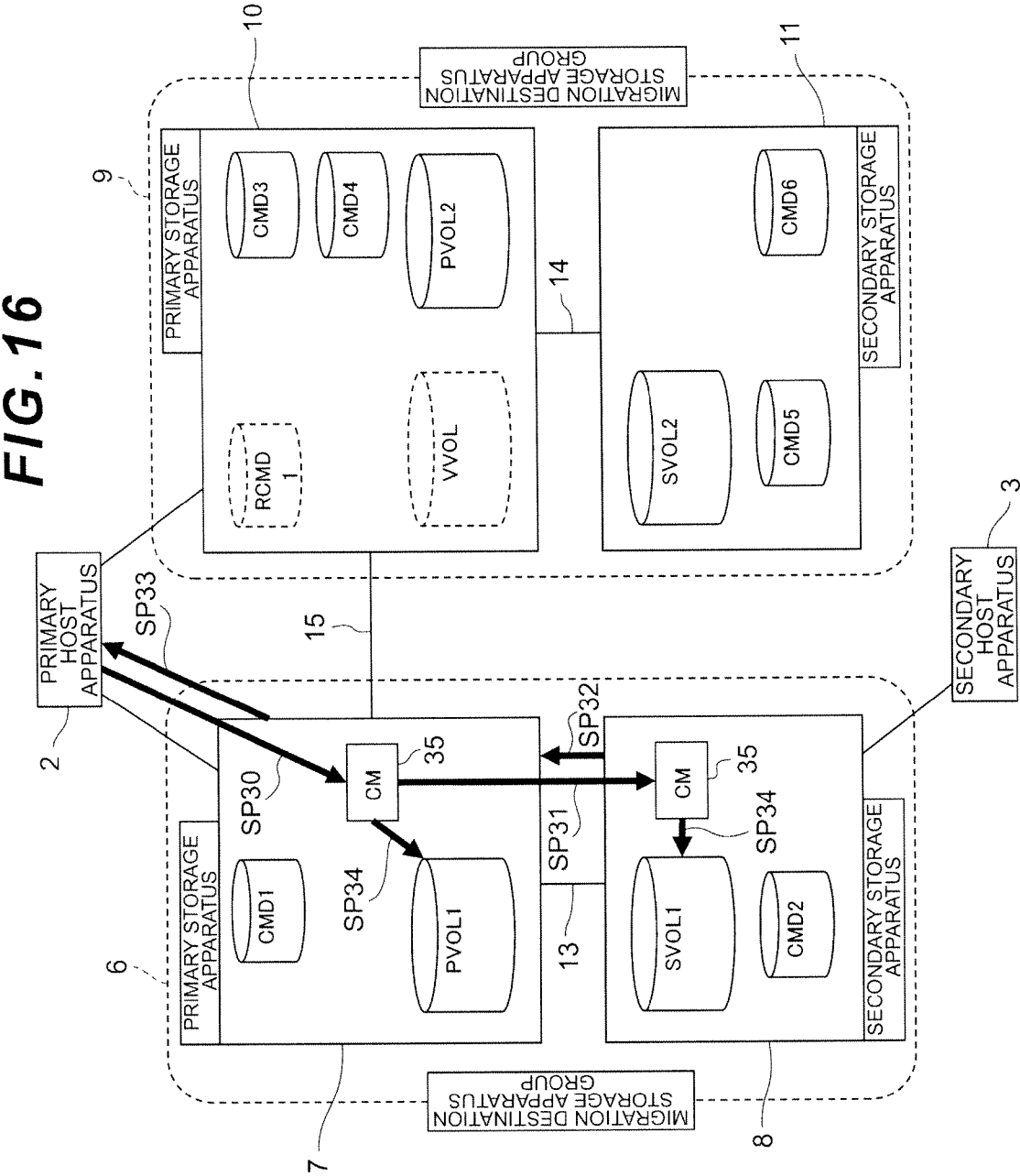
FIG. 16 is a conceptual view serving to illustrate the flow of write processing not via the migration-destination primary storage apparatus in the stage of FIG. 15.

(1-3-2-1) Flow of Write Processing Excluding Migration-Destination Primary Storage Apparatus FIG. 16 shows the flow of processing in a case where, after the processing of step SP3 in FIG. 10 is complete, a write command targeting the primary volume PVOL1 in the migration-source primary storage apparatus 7 is issued to the migration-source primary storage apparatus 7 from the primary host apparatus 2.

If a write command is directly issued by the primary host apparatus 2 to the migration-source primary storage apparatus 7, the write command is stored in the internal memory 34A (FIG. 4) of the microprocessor package 34 (FIG. 4) of the migration-source primary storage apparatus 7, and the write-target data transmitted from the primary host apparatus 2 to the migration-source primary storage apparatus 7 is stored together with the write command in the cache memory 35 of the migration-source primary storage apparatus 7 (SP30). Furthermore, the write target data is subsequently transferred to the migration-source secondary storage apparatus 8 by the remote-copy function of the migration-source primary storage apparatus 7 and written to the cache memory 35 in the migration-source secondary storage apparatus 8 (SP31).

When the write-target data is stored in the cache memory 35, the migration-source secondary storage apparatus 8 transmits a first write completion notice to the effect that write processing is complete to the migration-source primary storage apparatus 7 (SP32). Further, upon receiving the first write completion notice, the migration-source primary storage apparatus 7 transmits a second write completion notice to the effect that write processing based on the foregoing write command is complete to the primary host apparatus 2 (SP33).

Further, the migration-source primary storage apparatus 7 and migration-source secondary storage apparatus 8 subsequently write the write-target data stored in their own cache memory 35 to the corresponding primary volume PVOL1 or secondary volume SVOL1 with optional timing (SP34).

Figure 17:
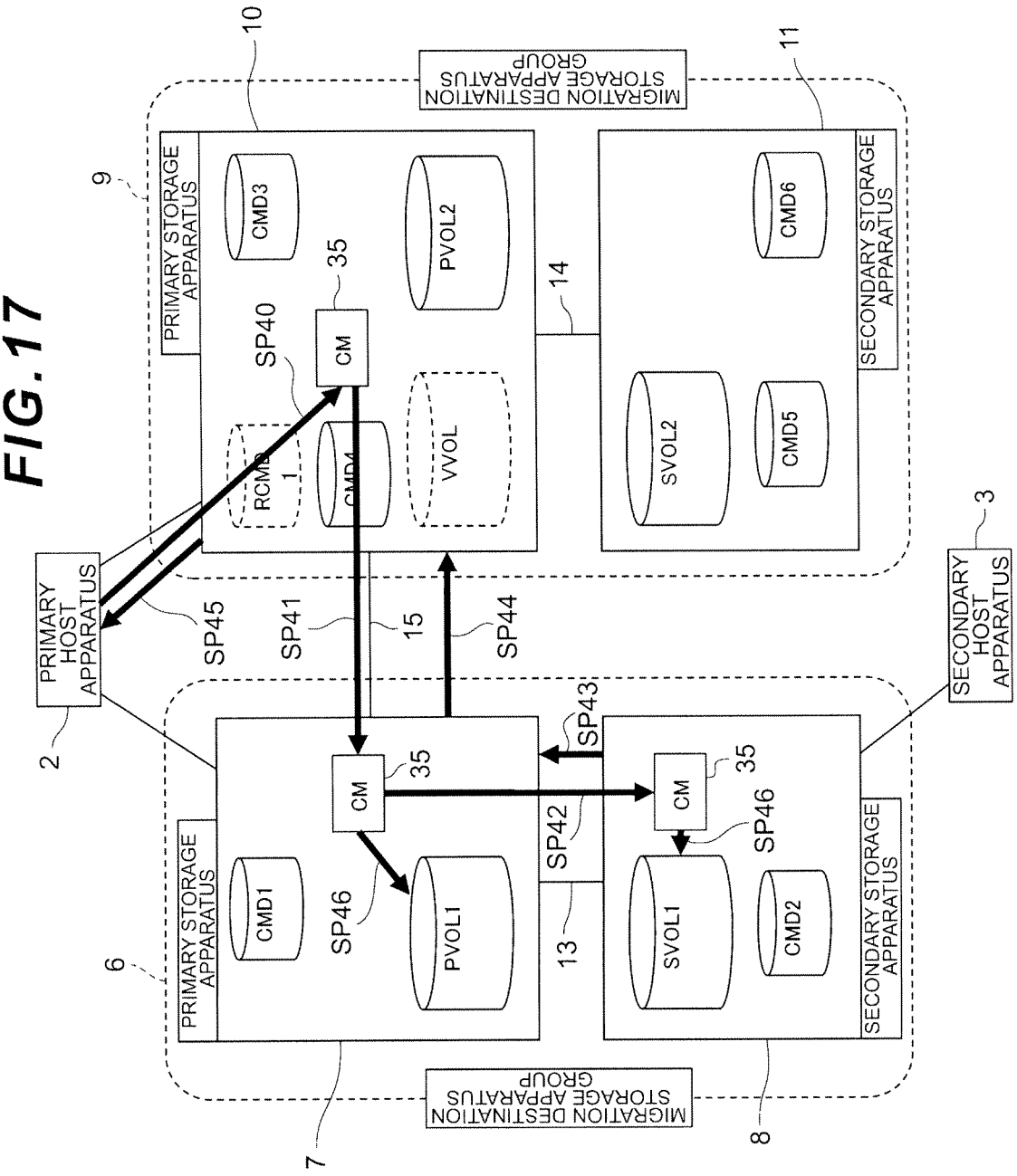
FIG. 17 is a conceptual view serving to illustrate the flow of write processing via the migration-destination primary storage apparatus in the stage of FIG. 15.

(1-3-2-2) Flow of Write Processing Via Migration-Destination Primary Storage Apparatus FIG. 17 shows the flow of processing in a case where a write command targeting the first virtual volume VVOL1 in the migration-destination primary storage apparatus 10 is issued from the primary host apparatus 2 to the migration-destination primary storage apparatus 10 after the processing of step SP3 in FIG. 10 is complete.

If a write command is issued to the migration-destination primary storage apparatus 10 by the primary host apparatus 2, the write command is stored in the internal memory 34A (FIG. 4) of the microprocessor package 34 (FIG. 4) of the migration-destination primary storage apparatus 10 and the write-target data which is transmitted to the migration-destination primary storage apparatus 10 from the primary host apparatus 2 is stored together with the write command in the cache memory 35 of the migration-destination primary storage apparatus 10 (SP40). Furthermore, the write target data is subsequently transferred to the migration-source primary storage apparatus 7 with the write command by means of the external connection function of the migration-destination primary storage apparatus 10 (SP41).

In addition, upon receiving the write command and write-target data, the migration-source primary storage apparatus 7 stores the write-target data in the cache memory 35. Furthermore, the write-target data is subsequently transferred to the migration-source secondary storage apparatus 8 by means of the remote-copy function of the migration-source primary storage apparatus 7 (SP42).

When the write-target data is transferred, the migration-source secondary storage apparatus 8 stores the data in the cache memory 35 and then transmits the first write completion notice to the effect that write processing is complete to the migration-source primary storage apparatus 7 (SP43).

Upon receipt of the first write completion notice, the migration-source primary storage apparatus 7 transmits a third write completion notice to the effect that write processing is complete to the migration-destination primary storage apparatus 10 in response to the first write completion notice (SP44). Upon receiving this third write completion notice, the migration-destination primary storage apparatus 10 transmits a fourth write completion notice to the effect that write processing corresponding to the write command to the primary host apparatus 2 (SP45).

Further, the migration-source primary storage apparatus 7 and migration-source secondary storage apparatus 8 subsequently writes write-target data stored in their own cache memory 35 to their own primary volume PVOL 1 or secondary volume SVOL1 with optional timing (SP46).

Figure 18:
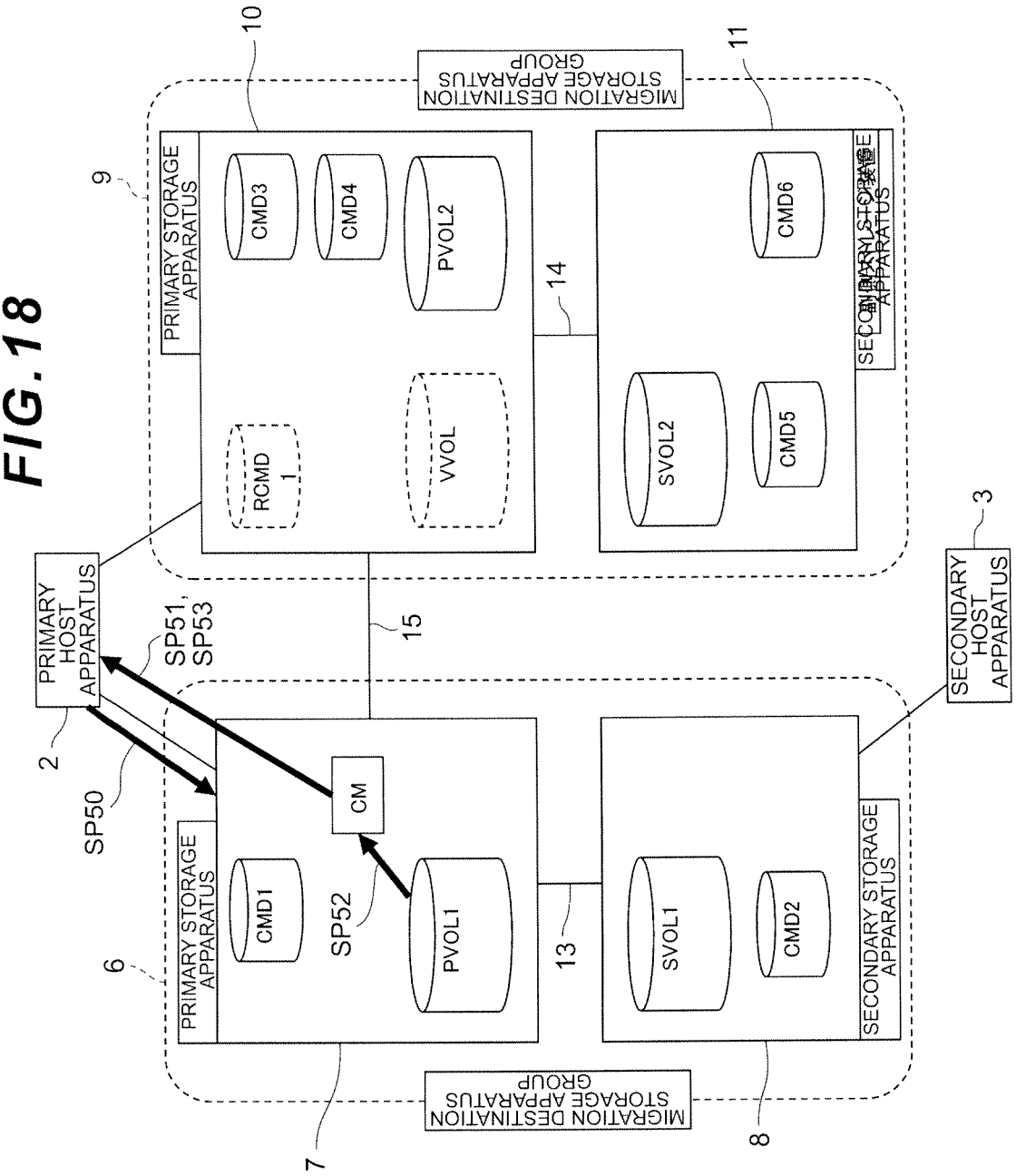
FIG. 18 is a conceptual view serving to illustrate the flow of read processing not via the migration-destination primary storage apparatus in the stage of FIG. 15.

(1-3-2-3) Flow of Read Processing Excluding Migration-Destination Primary Storage Apparatus Meanwhile, FIG. 18 shows the flow of processing in a case where a read command targeting the primary volume PVOL1 in the migration-source primary storage apparatus 7 is issued to the migration-source primary storage apparatus 7 by the primary host apparatus 2 after the processing of step SP3 in FIG. 10 is complete.

If a read command is issued directly to the migration-source primary storage apparatus 7 by the primary host apparatus 2 (SP50), in cases where the read-target data designated in the read command is stored in the cache memory 35 of the migration-source primary storage apparatus 7, this data is transmitted to the primary host apparatus 2 as is (SP51).

If, however, the read-target data is not stored in the cache memory 35 of the migration-source primary storage apparatus 7, the data is read from the primary volume PVOL1 and stored in the cache memory 35 (SP52) and subsequently the data is read from the cache memory 35 and transmitted to the primary host apparatus 2 (SP53).

Figure 19:
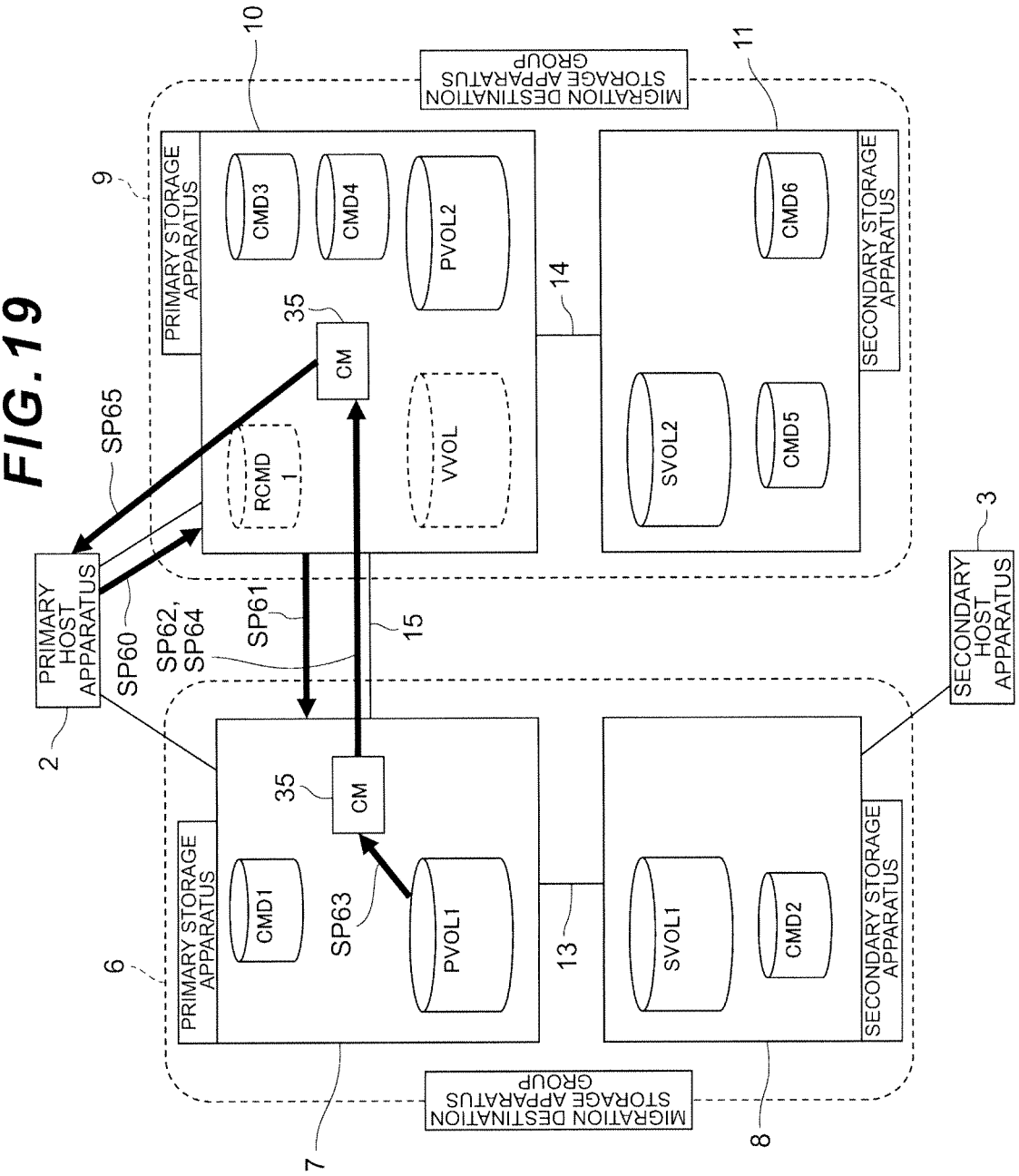
FIG. 19 is a conceptual view serving to illustrate the flow of read processing via the migration-destination primary storage apparatus in the stage of FIG. 15.

(1-3-2-4) Flow of Read Processing Via Migration-Destination Primary Storage Apparatus FIG. 19 shows the flow of processing in a case where, after the processing of step SP3 in FIG. 10 is complete, a read command targeting the first virtual volume VVOL1 in the migration-destination primary storage apparatus 10 is issued to the migration-destination primary storage apparatus 10 from the primary host apparatus 2.

If the read command is issued to the migration-destination primary storage apparatus 10 by the primary host apparatus 2 (SP60), the read command is transmitted to the migration-source primary storage apparatus 7 by means of the external connection function of the migration-destination primary storage apparatus 10 (SP61). Note that, even if read-target data is stored in the cache memory 35 of the migration-destination primary storage apparatus 10 at this time, the cache mode is configured as the total cache-through mode, and hence the data is read from the cache memory 35 and not transferred to the primary host apparatus 2.

Upon receipt of the read command, the migration-source primary storage apparatus 7 determines whether or not the read-target data is stored in its own cache memory 35 and, if an affirmative result is obtained, the migration-source primary storage apparatus 7 reads this data from the cache memory 35 and transfers same to the migration-destination primary storage apparatus 10 (SP62).

If, however, a negative result is obtained in this determination, the migration-source primary storage apparatus 7 reads the data from the primary volume PVOL1 and stores the data in the cache memory 35 (SP63) and then reads the read-target data from the cache memory 35 and transfers the data to the migration-destination primary storage apparatus 10 (SP64).

Further, upon receiving this data which is transmitted from the migration-source primary storage apparatus, the migration-source primary storage apparatus 7 stores the data in its own cache memory 35 and then reads the data from the cache memory 35 and transmits the data to the primary host apparatus 2 (SP65).

(1-3-2-5) Operation of the Computer System 1 when Fault Occurs at this Stage

FIG. 20 shows the operation of a computer system 1 in a case where a fault occurs in the migration-source primary storage apparatus 7 or the like after configuring the path via the first virtual volume VVOL1 of the migration-destination primary storage apparatus 10 as an alternate path to the primary volume PVOL1 in the migration-source primary storage apparatus 7 from the primary host apparatus 2.

If a fault occurs in the migration-source primary storage apparatus 7 at this stage, the processing executed by the primary host apparatus 2 is handed over to the secondary host apparatus 3 and the processing is continuously executed using the migration-source secondary storage apparatus 8 by the secondary host apparatus 3. In this case, the disaster recovery configuration of the migration-source storage apparatus group 6 is canceled.

Furthermore, in a case where a fault occurs in the migration-source secondary storage apparatus 8 at this stage or where a fault arises in the path interconnecting the migration-source primary storage apparatus 7 and the migration-source secondary storage apparatus 8, the processing by the primary host apparatus 2 is continued as is. However, the disaster recovery configuration of the migration-source storage apparatus group 6 is also canceled in this case.

Moreover, if a fault occurs in the migration-destination primary storage apparatus 10 at this stage or in the path interconnecting the migration-source primary storage apparatus 7 and the migration-destination primary storage apparatus 10, the processing in the migration-destination primary storage apparatus 10 is subject to timeout and the processing by the migration-source primary storage apparatus 7 is subsequently handed over for execution.

Note that if a fault occurs in the migration-destination secondary storage apparatus 11 at this stage, there is no adverse effect on the processing based on the access command issued by the primary host apparatus 2 to the migration-source primary storage apparatus 7 or migration-destination primary storage apparatus 10 and hence the processing is continued as is.

Figure 21:
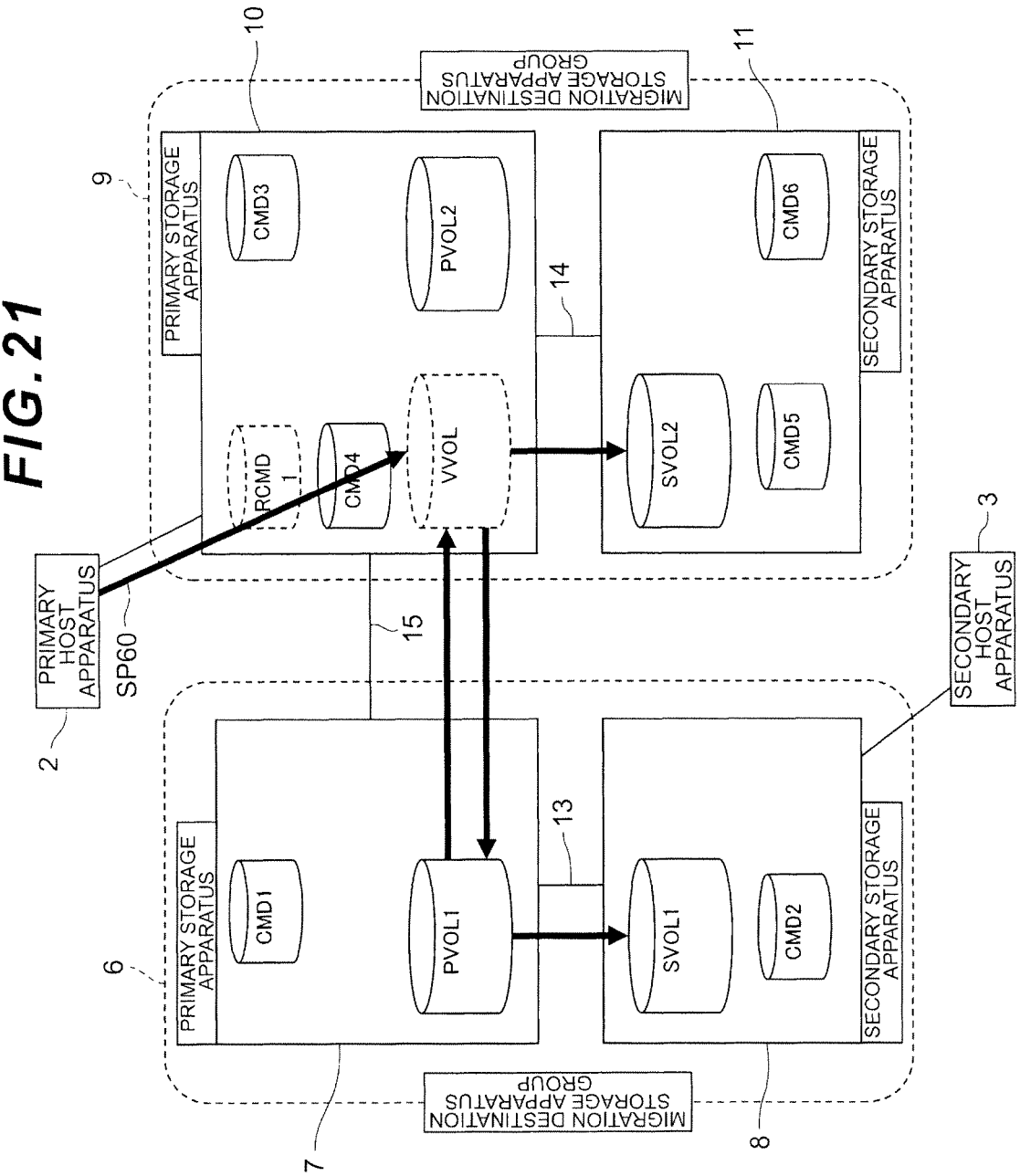
FIG. 21 is a conceptual view serving to provide an overview of read/write processing at a stage after configuring a copy pair in a migration-destination storage apparatus group in the computer system according to the first embodiment.

(1-3-3) After Configuring Copy Pair in Migration-Destination Storage Apparatus Group In a case where a copy pair is configured which is formed by the first virtual volume VVOL1 in the migration-source primary storage apparatus 7 associated with the primary volume PVOL1 in the migration-source primary storage apparatus 10, and the secondary volume SVOL2 in the migration-destination secondary storage apparatus 11 associated with the secondary volume SVOL1 in the migration-source secondary storage apparatus 8 (that is, if the processing of step SP6 in FIG. 10 is executed), as shown in FIG. 21, a read command or write command from the primary host apparatus 2 is always supplied to the migration-source primary storage apparatus 7 via the migration-destination primary storage apparatus 10. Thereupon, in the migration-destination primary storage apparatus 10, the cache mode of the cache memory 35 is configured in the cache-through mode only during write processing and configured as cache usage mode at the time of read processing.

Furthermore, the data written to the primary volume PVOL1 in the migration-source primary storage apparatus 7 is remote-copied to the corresponding secondary volume SVOL1 in the migration-source secondary storage apparatus 8 by means of the remote copy function of the migration-source primary storage apparatus 7.

Note that the initial copy (copy formation) of the secondary volume SVOL2 in the migration-destination secondary storage apparatus 11, which is configured as a copy pair with the first virtual volume VVOL1 of the migration-destination primary storage apparatus 10, is carried out so as to match the data content of the corresponding secondary volume SVOL1 in the migration-source secondary storage apparatus 8 under the control of the migration-source primary storage apparatus 7. However, if the data which is to be copied to the secondary volume SVOL2 in the migration-destination secondary storage apparatus 11 during the initial copy exists in the cache memory 35 of the migration-destination primary storage apparatus 10, the data is copied to the secondary volume SVOL2 from the cache memory 35.

(1-3-3-1) Flow of Write Processing

Figure 22:
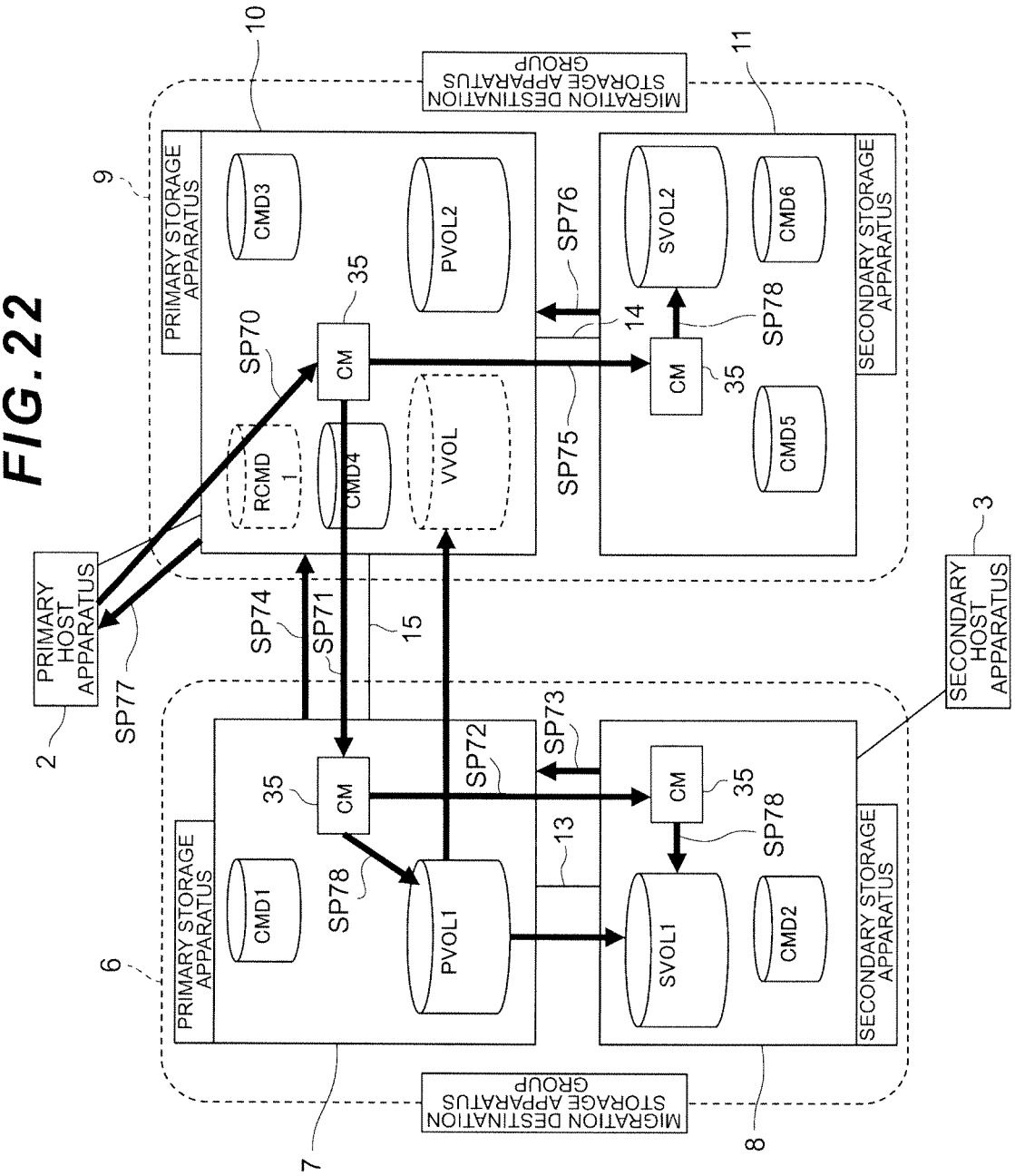
FIG. 22 is a conceptual view serving to illustrate the flow of write processing at the stage of FIG. 21.

FIG. 22 shows the flow of processing in a case where, after the processing of step SP6 in FIG. 10 is complete, a write command targeting the first virtual volume VVOL1 is issued by the primary host apparatus 2 to the migration-destination primary storage apparatus 10.

If the write command is issued to the migration-destination primary storage apparatus 10 by the primary host apparatus 2, the migration-destination primary storage apparatus 10 stores the write-target data which is supplied by the primary host apparatus 2 to its own cache memory 35 together with the write command (SP70). Furthermore, the migration-destination primary storage apparatus 10 subsequently transfers the write-target data stored in the cache memory 35 to the migration-source primary storage apparatus 7 by means of the external connection function (SP71).

Upon receiving the write target data, the migration-source primary storage apparatus 7 stores the data in its own cache memory 35 while transferring the data to the migration-source secondary storage apparatus 8 (SP72). The write target data is thus subsequently stored in the cache memory 35 of the migration-source secondary storage apparatus 8. In addition, the migration-source secondary storage apparatus 8 subsequently transmits a first write completion notice to the effect that write processing is complete to the migration-source primary storage apparatus 7 (SP73).

Upon receiving this first write completion notice, the migration-source primary storage apparatus 7 transmits the third write completion notice to the migration-destination primary storage apparatus 10 in response to the first write completion notice (SP74). Further, upon receipt of this third write completion notice, the migration-destination primary storage apparatus 10 transfers write-target data stored in the cache memory 35 to the migration-destination secondary storage apparatus 11 (SP75).

In addition, upon receiving this write target data, the migration-destination secondary storage apparatus 11 stores this data in its own cache memory 35 and then transmits a fifth write completion notice to the effect that write processing is complete to the migration-destination primary storage apparatus 10 (SP76). The migration-destination primary storage apparatus 10 which receives the fifth write completion notice thus transmits the fourth write completion notice to the effect that write processing is complete to the primary host apparatus 2 (SP77).

Note that the migration-source primary storage apparatus 7, migration-source secondary storage apparatus 8 and migration-destination secondary storage apparatus 11 subsequently write write-target data stored in its own cache memory 35 to their own primary volume PVOL1 or secondary volume SVOL1, SVOL2 with optional timing (SP78).

(1-3-3-2) Flow of Read Processing

Figure 23:
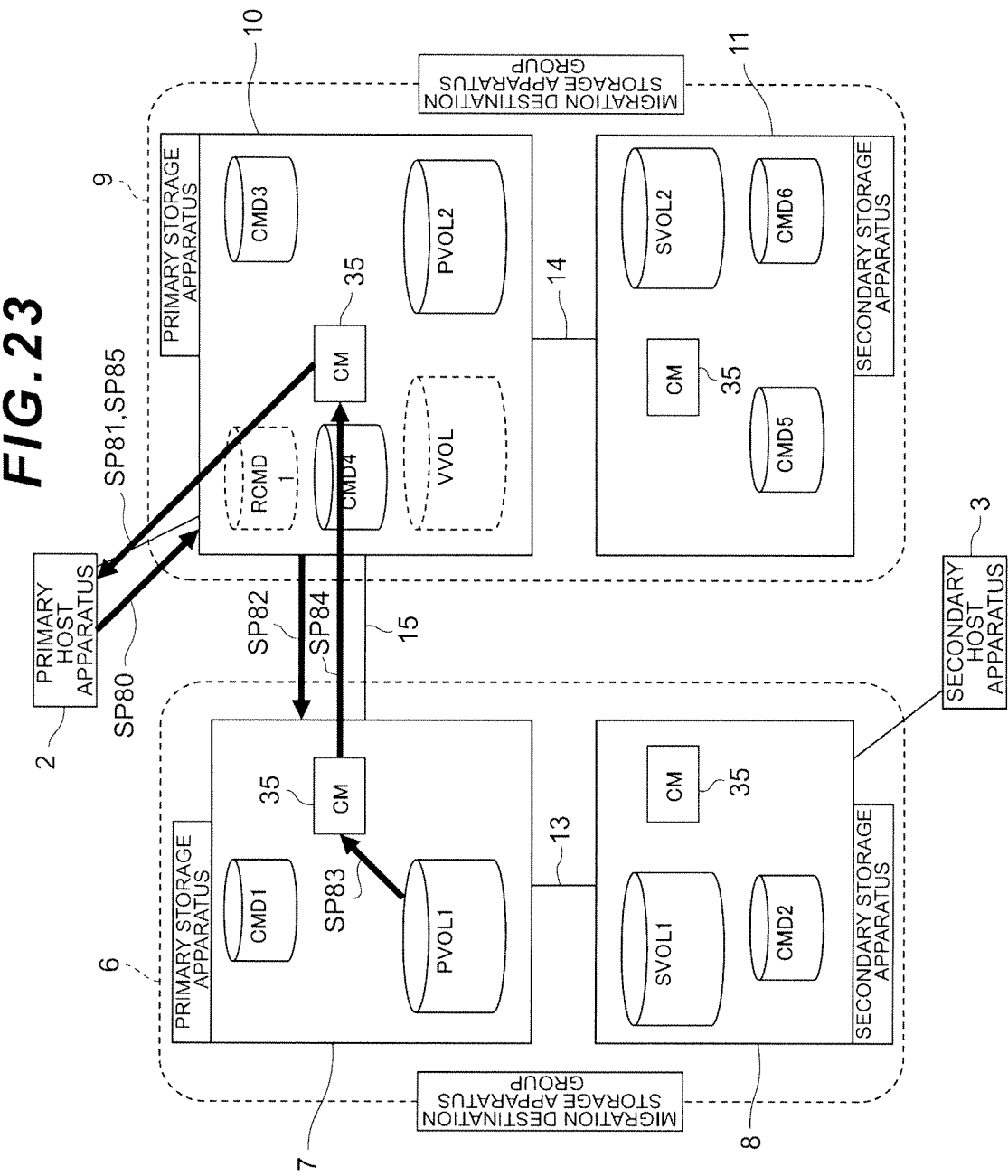
FIG. 23 is a conceptual view serving to illustrate the flow of read processing at the stage of FIG. 21.

FIG. 23 shows the flow of processing in a case where a read command targeting a first virtual volume VVOL1 in the migration-destination primary storage apparatus 10 is issued to the migration-destination primary storage apparatus 10 by the primary host apparatus 2 after the processing of step SP6 in FIG. 10 is complete.

If this read command is issued to the migration-destination primary storage apparatus 10 by the primary host apparatus 2 (SP80), the migration-destination primary storage apparatus 10 determines whether or not the read-target data is stored in its own cache memory 35 and, if an affirmative result is obtained, transfers the data to the primary host apparatus 2 (SP81). The migration-destination primary storage apparatus 10 transfers the read command to the migration-source primary storage apparatus 7 when a negative result is obtained in this determination (SP82).

If this read command is transmitted from the migration-destination primary storage apparatus 10, the migration-source primary storage apparatus 7 determines whether or not the read-target data is stored in the cache memory 35 of the migration-source primary storage apparatus 7. Furthermore, if an affirmative result is obtained in this determination, the migration-source primary storage apparatus 7 reads the data from the cache memory 35 and transmits the data to the migration-destination primary storage apparatus 10. If a negative result is obtained in this determination, the migration-source primary storage apparatus 7 reads the data from the primary volume PVOL1 and stores the data in the cache memory 35 (SP83) and subsequently reads the data from the cache memory 35 and transmits the data to the migration-destination primary storage apparatus 10 (SP84).

When this data is transmitted from the migration-source primary storage apparatus 7, the migration-destination primary storage apparatus 10 stores the data in its own cache memory 35 and subsequently reads the data from the cache memory 35 and transfers the data to the primary host apparatus 2 (SP85).

(1-3-3-3) Flow of Initial Copy Processing

Figure 24:
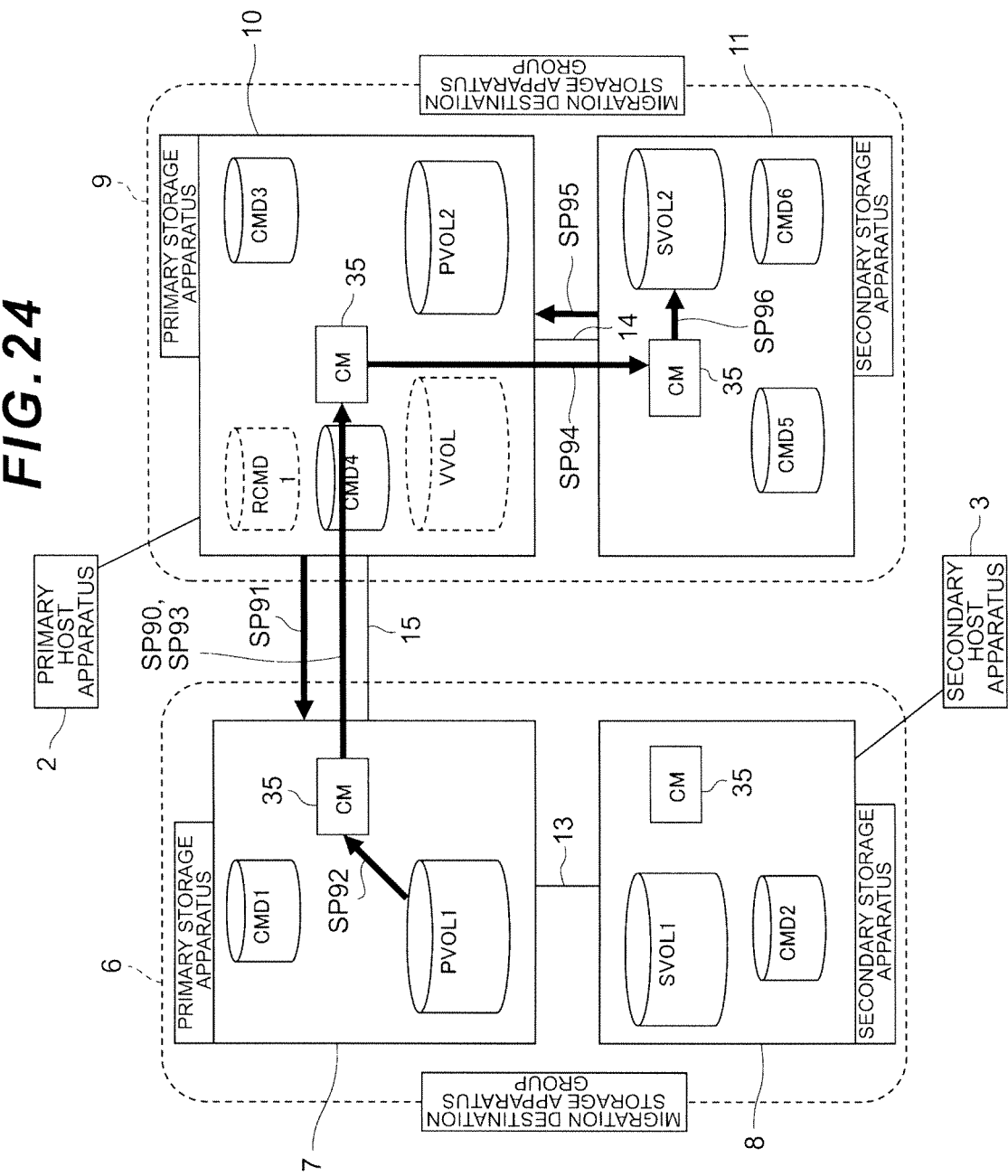
FIG. 24 is a conceptual view serving to illustrate the flow of initial copy processing which is executed at the stage of FIG. 21.

Meanwhile, FIG. 24 shows the flow of initial copy processing which is executed when, after the processing of step SP6 in FIG. 10 is complete, the first virtual volume VVOL1 in the migration-destination primary storage apparatus 10 and the secondary volume SVOL2 in the migration-destination secondary storage apparatus 11 are configured as a copy pair.

In a case where the first virtual volume VVOL1 in the migration-destination primary storage apparatus 10 and the secondary volume SVOL2 in the migration-destination secondary storage apparatus 11 are configured as a copy pair, the migration-destination primary storage apparatus 10 determines whether or not data exists in its own cache memory 35. Further, if data exists in its own cache memory 35, the migration-destination primary storage apparatus 10 transmits the data to the migration-destination secondary storage apparatus 11 together with the write command (SP90).

If, however, no data exists in its own cache memory 35, the migration-destination primary storage apparatus 10 transmits a read command, to the migration-source primary storage apparatus 7, for data which is stored in the secondary volume SVOL1 in the migration-source secondary storage apparatus 8 but which has not been copied to the secondary volume SVOL2 in the migration-destination secondary storage apparatus 11 (SP91).

The migration-source primary storage apparatus 7, having received the read command, determines whether or not the read target data exists in its own cache memory 35. If an affirmative result is obtained in this determination, the migration-source primary storage apparatus 7 reads the data from the cache memory 35 to the migration-destination primary storage apparatus 10 and transmits the data to the migration-destination primary storage apparatus 10. In addition, if a negative result is obtained in this determination, the migration-source primary storage apparatus 7 reads the data from the primary volume PVOL1 and stores the data in the cache memory 35 (SP92), and subsequently reads the data from the cache memory 35 and transmits the data to the migration-destination primary storage apparatus 10 (SP93).

If the data is transmitted from the migration-source primary storage apparatus 7, the migration-destination primary storage apparatus 10 stores the data in the cache memory 35 and subsequently reads the data from the cache memory 35 and transmits the data to the migration-destination secondary storage apparatus 11 together with the write command (SP94).

Upon receiving the write command and the data, the migration-destination secondary storage apparatus 11 stores the data in its own cache memory 35 and then transmits the fifth write completion notice to the effect that write command-based write processing is complete to the migration-destination primary storage apparatus 10 (SP95).

Furthermore, the migration-destination secondary storage apparatus 11 subsequently reads the data written to its own cache memory 35 and writes the data to the secondary volume SVOL2 with optional timing (SP96).

The migration-source primary storage apparatus 7, migration-source secondary storage apparatus 8, migration-destination primary storage apparatus 10, and migration-destination secondary storage apparatus 11 execute the foregoing processing for all the data which is stored in the secondary volume SVOL1 of the migration-source secondary storage apparatus 8 and which is not stored in the secondary volume SVOL2 of the migration-source secondary storage apparatus 8. As a result, all the data stored in the secondary volume SVOL1 of the migration-source secondary storage apparatus 8 is copied to the secondary volume SVOL2 of the migration-destination secondary storage apparatus 11.

(1-3-3-4) Operation of the Computer System when a Fault Occurs at this Stage

FIG. 25 shows the operation of the computer system 1 in a case where a fault occurs in the migration-source primary storage apparatus 7 after the processing up until step SP6 in FIG. 10 is complete.

In cases where a fault occurs in the migration-source primary storage apparatus 7 at this stage or where a fault arises in the path interconnecting the migration-source primary storage apparatus 7 and migration-source secondary storage apparatus 8, the processing executed by the primary host apparatus 2 is handed over to the secondary host apparatus 3, and the processing is continuously executed by using the migration-source secondary storage apparatus 8 by means of the secondary host apparatus 3. In this case, the disaster recovery configuration of the migration-source storage apparatus group 6 is canceled.

Further, if a fault occurs in the migration-source secondary storage apparatus 8 at this stage or a fault arises in the path interconnecting the migration-source primary storage apparatus 7 and migration-source secondary storage apparatus 8, the processing by the primary host apparatus 2 is continued as is. However, in this case, the disaster recovery configuration of the migration-source storage apparatus group 6 is canceled.

In addition, if a fault arises in the migration-destination primary storage apparatus 10 at this stage, the processing being executed in the primary host apparatus 2 is handed over to the secondary host apparatus 3 and the processing is continued by using the migration-source secondary storage apparatus 8 by means of the secondary host apparatus 3.

Furthermore, in a case where a fault occurs in the migration-destination secondary storage apparatus 11 at this stage or where a fault arises in the path interconnecting the migration-destination primary storage apparatus 10 and migration-destination secondary storage apparatus 11, with the copy pair during initial copying simply configured as "suspend," there is no other effect on the computer system 1.

(1-3-4) During Data Migration Using Volume Migration Function

Figure 26:
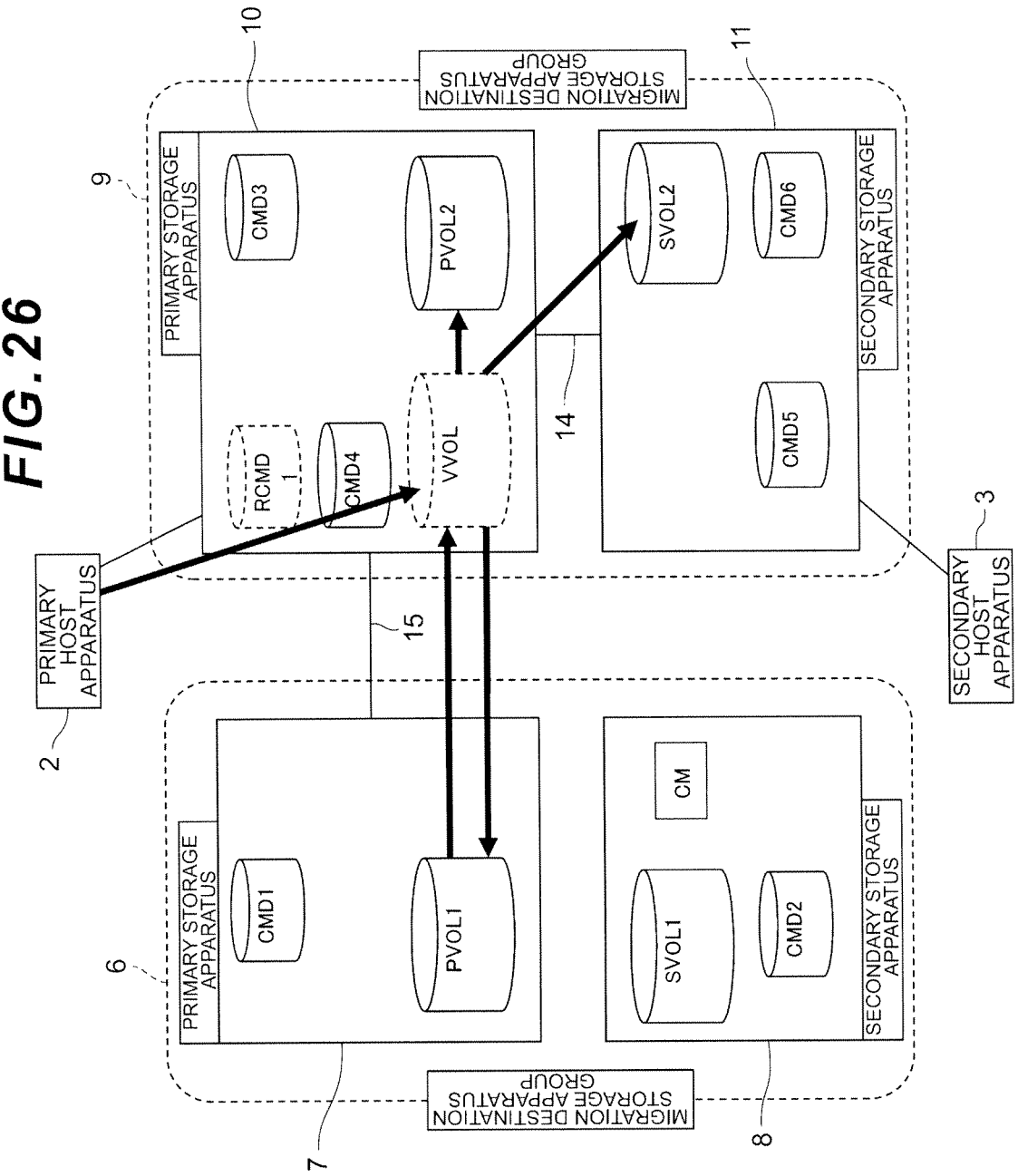
FIG. 26 is a conceptual view serving to provide an overview of read/write processing at a stage during execution of volume migration processing in the computer system according to the first embodiment.

At the stage where the processing of step SP9 in FIG. 10 is executed, as shown in FIG. 26, if a write command is issued to the migration-destination primary storage apparatus 10 by primary host apparatus 2, the write target data is transferred to the migration-source primary storage apparatus 7 by the external connection function of the migration-destination primary storage apparatus 10 and transferred to the migration-destination secondary storage apparatus 11 by the remote-copy function of the migration-destination primary storage apparatus 10.

The data stored in the primary volume PVOL1 of the migration-source primary storage apparatus 7 at this stage is migrated to the primary volume PVOL2 of the migration-destination primary storage apparatus 10 from the primary volume PVOL1 of the migration-source primary storage apparatus 7 by means of the volume migration function of the migration-destination primary storage apparatus 10.

(1-3-4-1) Write Processing

If, at the stage where the processing of step SP9 of FIG. 10 is executed, a write command is issued to the migration-destination primary storage apparatus 10 from the primary host apparatus 2, the processing excluding steps SP72 and step SP73 in the write processing described earlier with reference to FIG. 22 is executed.

(1-3-4-2) Read Processing

If, at the stage where the processing of step SP9 of FIG. 10 is executed, a read command is issued to the migration-destination primary storage apparatus 10 from the primary host apparatus 2, the read processing described earlier with reference to FIG. 23 is executed.

(1-3-4-3) Data Migration Processing

Figure 27:
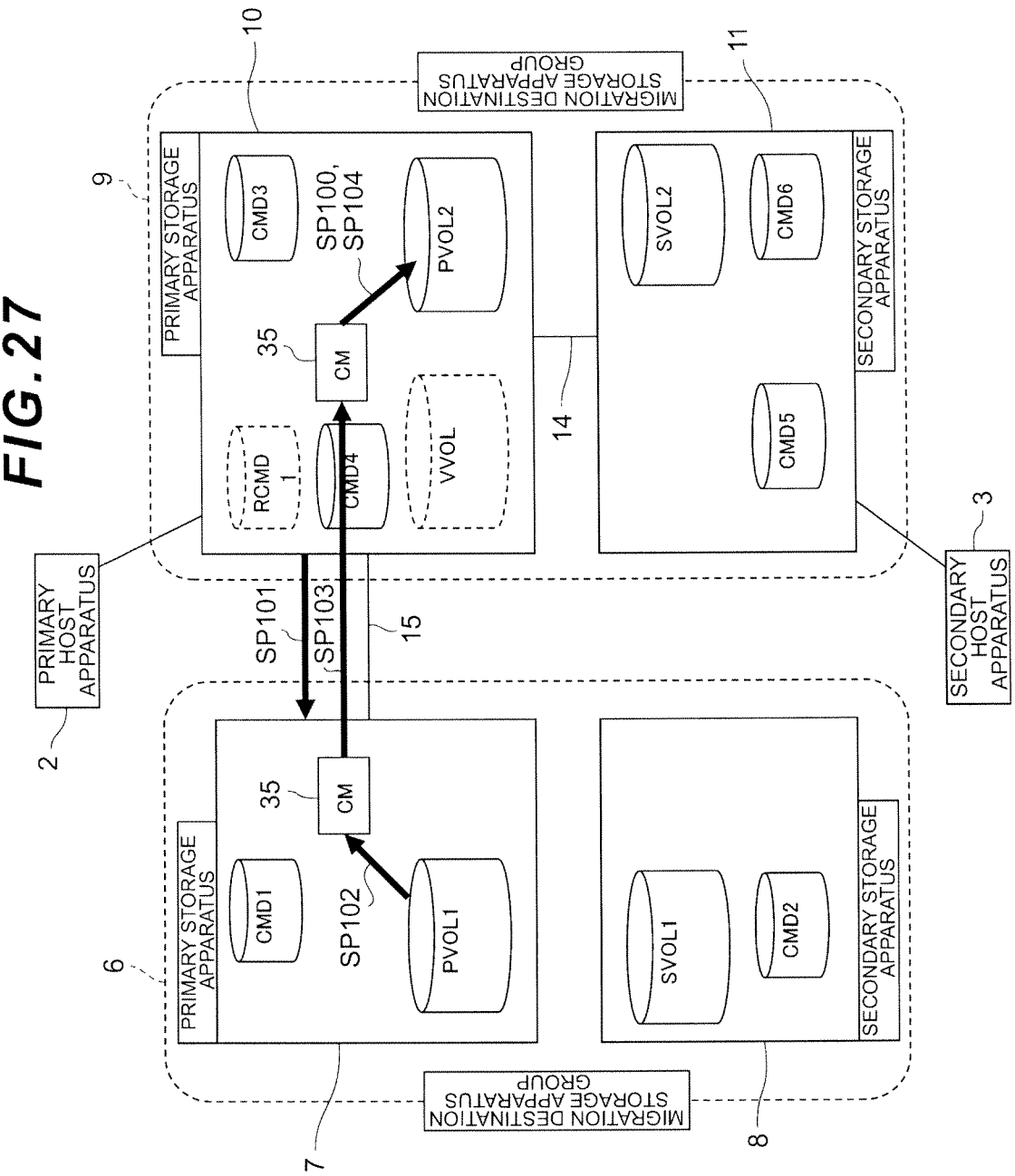
FIG. 27 is a conceptual view serving to illustrate data migration processing which is executed in the stage of FIG. 26.

FIG. 27 shows the flow of data migration processing in which data stored in the primary volume PVOL1 of the migration-source primary storage apparatus 7 is migrated to the primary volume PVOL2 in the migration-destination primary storage apparatus 10 associated with the primary volume PVOL1 by means of the volume migration function of the migration-destination primary storage apparatus 10.

In this case, the migration-destination primary storage apparatus 10 determines whether or not there is data stored in its own cache memory 35 among the migration target data stored in the primary volume PVOL1 of the migration-source primary storage apparatus 7. Further, if an affirmative result is obtained in this determination, the migration-destination primary storage apparatus 10 reads the data from the cache memory 35 and stores the data in its own primary volume PVOL2 (SP100).

If, on the other hand, a negative result is obtained in this determination, the migration-destination primary storage apparatus 10 issues a read command to the effect that data, which has not yet been migrated to its own primary volume PVOL2 among the data stored in the primary volume PVOL1 of the migration-source primary storage apparatus 7, is to be read to the migration-source primary storage apparatus 7 (SP101).

Upon receiving this read command, the migration-source primary storage apparatus 7 determines whether or not the requested data is stored in its own cache memory 35. Upon obtaining an affirmative result in this determination, the migration-source primary storage apparatus 7 reads the data from the cache memory 35 and transmits the data to the migration-destination primary storage apparatus 10. Upon obtaining a negative result in this determination, the migration-source primary storage apparatus 7 reads the data from the primary volume PVOL1 to the cache memory 35 (SP102) and subsequently transmits the data to the migration-destination primary storage apparatus 10 (SP103).

Upon receipt of this data, the migration-destination primary storage apparatus 10 stores the data in its own cache memory 35 and subsequently reads the data with optional timing and writes the data to the primary volume PVOL2 (SP104).

(1-3-4-4) Operation of Computer System when Fault Occurs at this Stage

FIG. 28 shows the operation of the computer system 1 in a case where a fault arises in the migration-source primary storage apparatus 7 and the like at the stage where the processing of step SP9 of FIG. 10 is executed.

In a case where a fault occurs in the migration-source primary storage apparatus 7 at this stage, where a fault arises in the migration-destination primary storage apparatus 10, or where a fault arises in the path between the migration-source primary storage apparatus 7 and migration-destination primary storage apparatus 10, the processing executed by the primary host apparatus 2 is handed over to the secondary host apparatus 3, and the processing is executed continuously by the secondary host apparatus 3 using the migration-source secondary storage apparatus 8 and migration-destination secondary storage apparatus 11. In this case, the disaster recovery configuration in the migration-source storage apparatus group 6 and the migration-destination storage apparatus group 9 is also canceled in this case.

Furthermore, if a fault occurs in the migration-source secondary storage apparatus 8 at this stage, there is no adverse effect on the read processing and write processing based on the read command and write command issued by the primary host apparatus 2 to the migration-destination primary storage apparatus 10 and similarly no effect on the data migration processing to the corresponding primary volume PVOL2 in the migration-destination primary storage apparatus 10 from the primary volume PVOL1 in the migration-source primary storage apparatus 7 that is then being executed.

In addition, in a case where a fault occurs in the migration-destination secondary storage apparatus 11 at the stage and where a fault arises in the path interconnecting the migration-destination primary storage apparatus 10 and migration-destination secondary storage apparatus 11, the state of the remote-copy copy pair between the first virtual volume VVOL1 in the migration-destination primary storage apparatus 10 and the corresponding secondary volume SVOL2 in the migration-destination secondary storage apparatus 11 is shifted to "suspend" and the disaster recovery configuration in the migration-destination storage apparatus group 9 is canceled. However, in this case, read processing and write processing which corresponds to a read command or write command that is issued by the primary host apparatus 2 to the migration-destination primary storage apparatus 10, and data migration processing from the primary volume PVOL1 in the migration-source primary storage apparatus 7 to the corresponding primary volume PVOL2 in the migration-destination primary storage apparatus 10 are continued.

(1-3-5) After Data Migration (1-3-5-1) Write Processing

Figure 29:
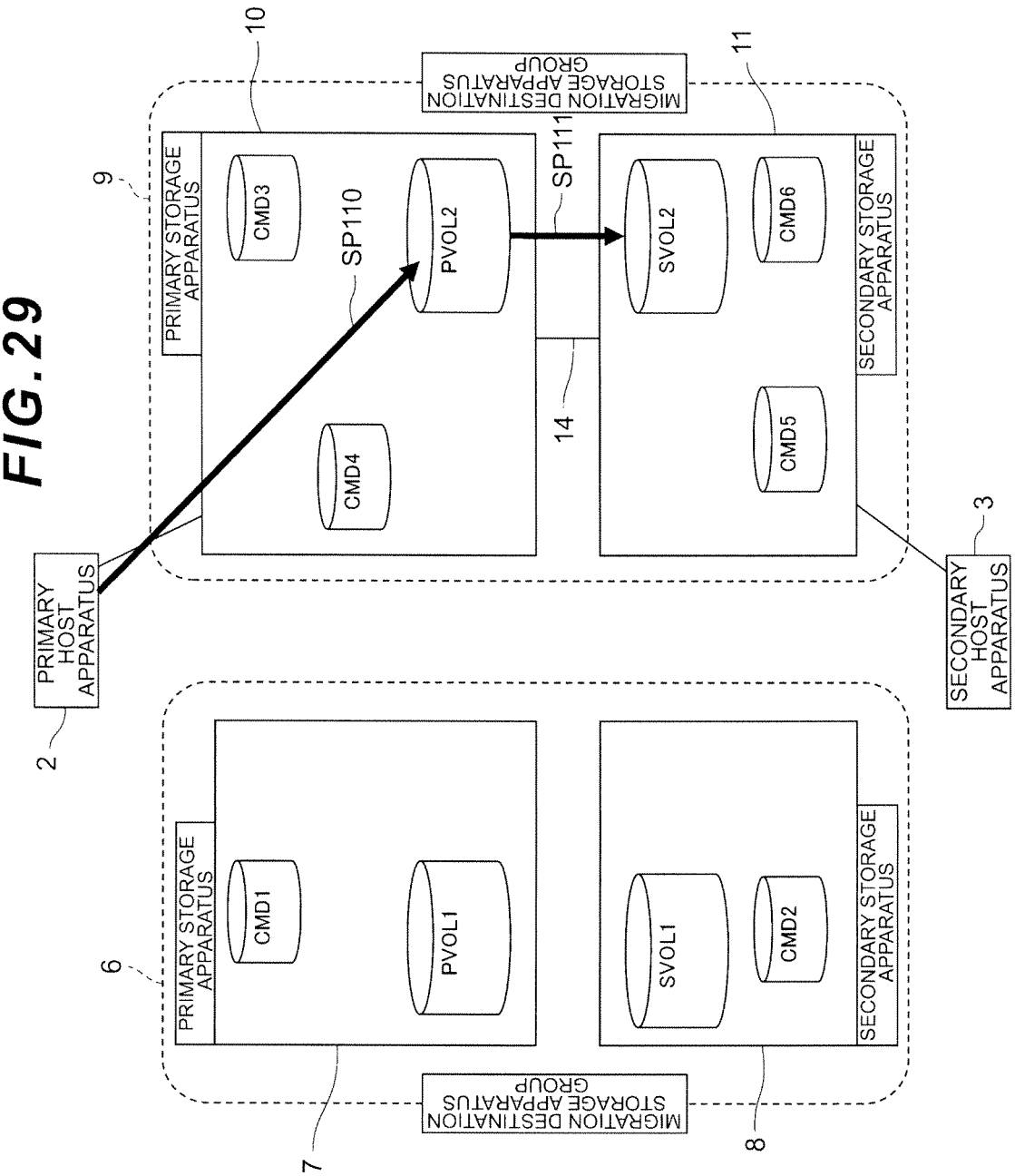
FIG. 29 is a conceptual view serving to provide an overview of read/write processing after data migration in the computer system according to the first embodiment.

FIG. 29 shows the flow of write processing which is executed in the computer system 1 in a case where a write command is supplied to the migration-destination primary storage apparatus 10 by the primary host apparatus 2 after volume migration processing is complete (that is, step SP10 in FIG. 10 is complete), which includes data migration to the corresponding primary volume PVOL2 in the migration-destination primary storage apparatus 10 from the primary volume PVOL1 in the migration-source primary storage apparatus 7.

In this case, the migration-destination primary storage apparatus 10, having received the write command from the primary host apparatus 2, writes write-target data to the address position which is designated by the write command in the primary volume PVOL2 which is designated in the write command. The migration-destination primary storage apparatus 10 subsequently transfers the data written to the primary volume PVOL2 to the migration-destination secondary storage apparatus 11 and the data is written to the corresponding secondary volume SVOL2 in the migration-destination secondary storage apparatus 11.

(1-3-5-2) Read Processing

However, if a read command is supplied by the primary host apparatus 2 to the migration-destination primary storage apparatus 10 after the processing of step SP10 in FIG. 10 is complete, the read target data designated in the read command is read from the cache memory 35 or corresponding primary volume PVOL2 and transferred to the primary host apparatus 2.

(1-3-5-3) Operation of the Computer System when a Fault Occurs at this Stage

FIG. 30 shows the operation of the computer system 1 in a case where a fault occurs in the migration-source primary storage apparatus 7 and the like after the processing of step SP10 in FIG. 10 is complete.

At this stage, the migration-source primary storage apparatus 7 and migration-source secondary storage apparatus 8 are not used in the processing corresponding to the access command (read command or write command) from the primary host apparatus 2, and hence there is no effect on the processing corresponding to the access command issued by the primary host apparatus 2 to the migration-destination primary storage apparatus 10 even when a fault arises in the migration-source primary storage apparatus 7 and migration-source secondary storage apparatus 8.

Furthermore, in a case where a fault occurs in the migration-destination primary storage apparatus 10 at this stage, the processing executed by the primary host apparatus 2 is handed over to the secondary host apparatus 3 and the processing is continuously executed by the secondary host apparatus 3 using the migration-destination secondary storage apparatus 11. In this case, the disaster recovery configuration in the migration-destination storage apparatus group 9 is cancelled.

In addition, in a case where a fault occurs in the migration-destination secondary storage apparatus 11 and where a fault arises in the path interconnecting the migration-destination primary storage apparatus 10 and migration-destination secondary storage apparatus 11, the processing by the primary host apparatus 2 is continued as is. However, in this case also disaster recovery configuration in the migration-destination storage apparatus group 6 is cancelled.

(1-4) Effect of the Embodiment

As described earlier, in the computer system 1 according to this embodiment, data migration from the primary volume PVOL1 in the migration-source primary storage apparatus 7 to the primary volume PVOL2 in the migration-destination primary storage apparatus 10 is performed while controlling the cache mode in the migration-destination primary storage apparatus 10, thereby enabling data migration from the migration-source storage apparatus group 6 to the migration-destination storage apparatus group 9 to be carried out while preserving data consistency in the migration-source primary storage apparatus 7 and while continuing read processing and write processing which correspond to an access command from the primary host apparatus 2. Thus, a computer system with which a storage apparatus can be replaced while retaining data consistency and without halting access by a host apparatus.

Figure 31:
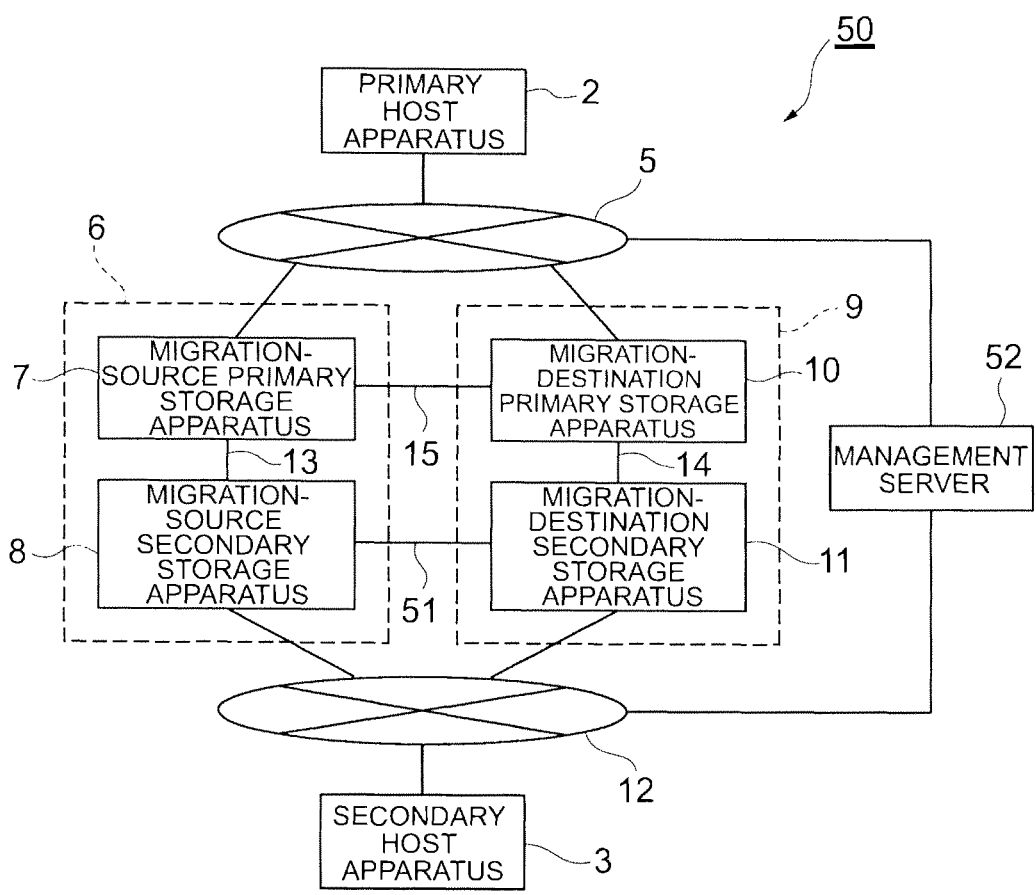
FIG. 31 is a block diagram showing the overall configuration of a computer system according to a second embodiment.

(2) Second Embodiment (2-1) Configuration of Computer System According to this Embodiment FIG. 31, which shows the same reference signs assigned to parts corresponding to those in FIG. 1, shows a computer system 50 according to the second embodiment. The computer system 50 largely differs from the computer system 1 (FIG. 1) according to the first embodiment in that the migration-source secondary storage apparatus 8 and migration-destination secondary storage apparatus 11 are mutually connected via a fourth communication path 51 such as a cable, and in that the migration-source secondary storage apparatus 8 is externally connected to the migration-destination secondary storage apparatus 11 via the fourth communication path 51.

Figure 32:
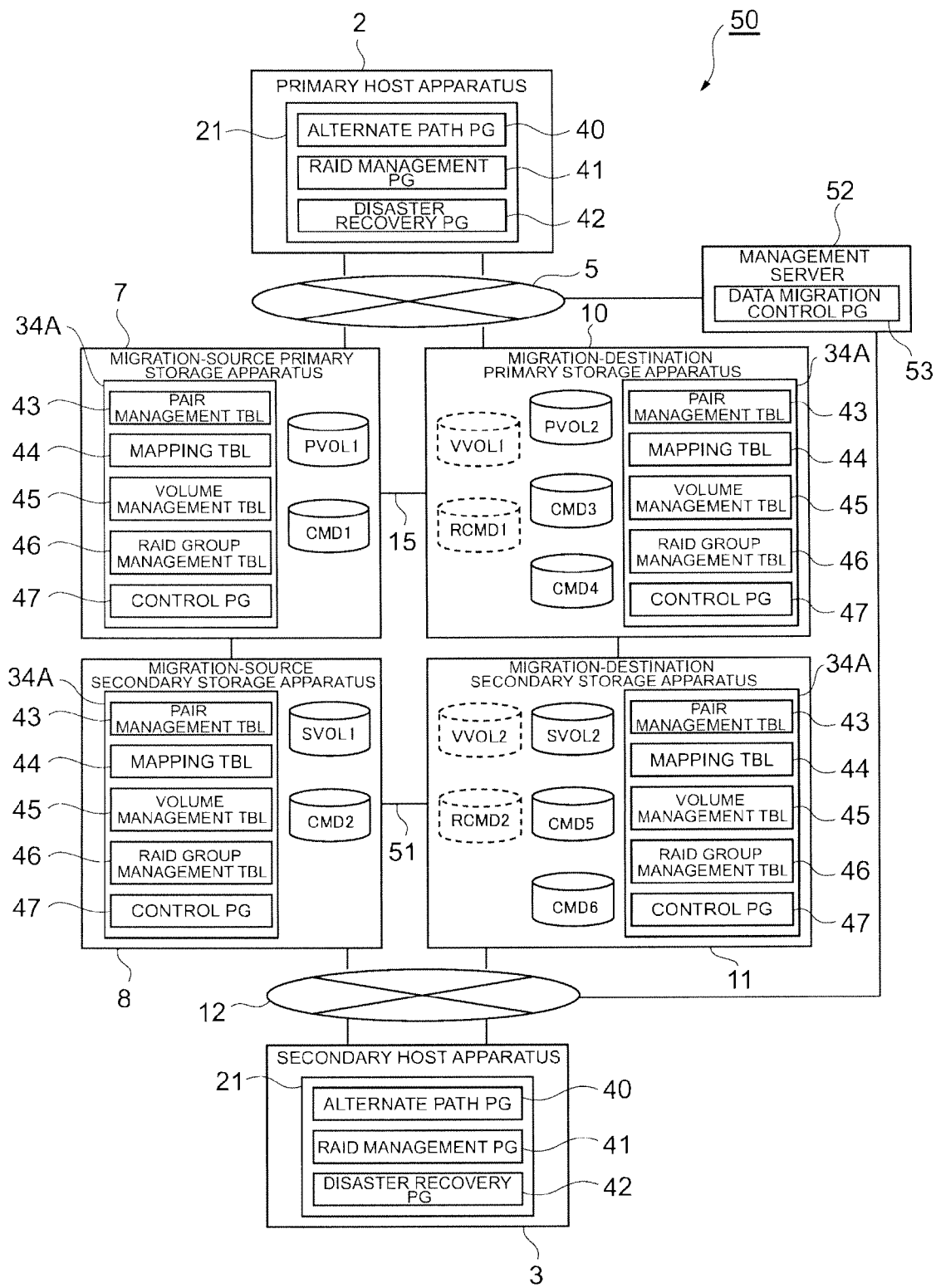
FIG. 32 is a block diagram showing the logical configuration of the computer system according to a second embodiment.

FIG. 32, in which the same reference signs are assigned to parts corresponding to those in FIG. 5, shows the logical configuration of the computer system 50 according to this embodiment. As is also clear from FIG. 32, the computer system 50 according to this embodiment is configured in the same way as the computer system 1 according to the first embodiment except for the fact that the function of the data migration control program 53 installed on the management server 52 is different, that a second virtual volume VVOL2 and second virtual command device RCMD2 are defined in the migration-destination secondary storage apparatus 11 in correspondence with the secondary volume SVOL1 and command device CMD2 of the migration-source secondary storage apparatus 8, and in that a remote copy function, external connection function, and volume migration function are installed in the migration-destination secondary storage apparatus 11.

Figure 33:
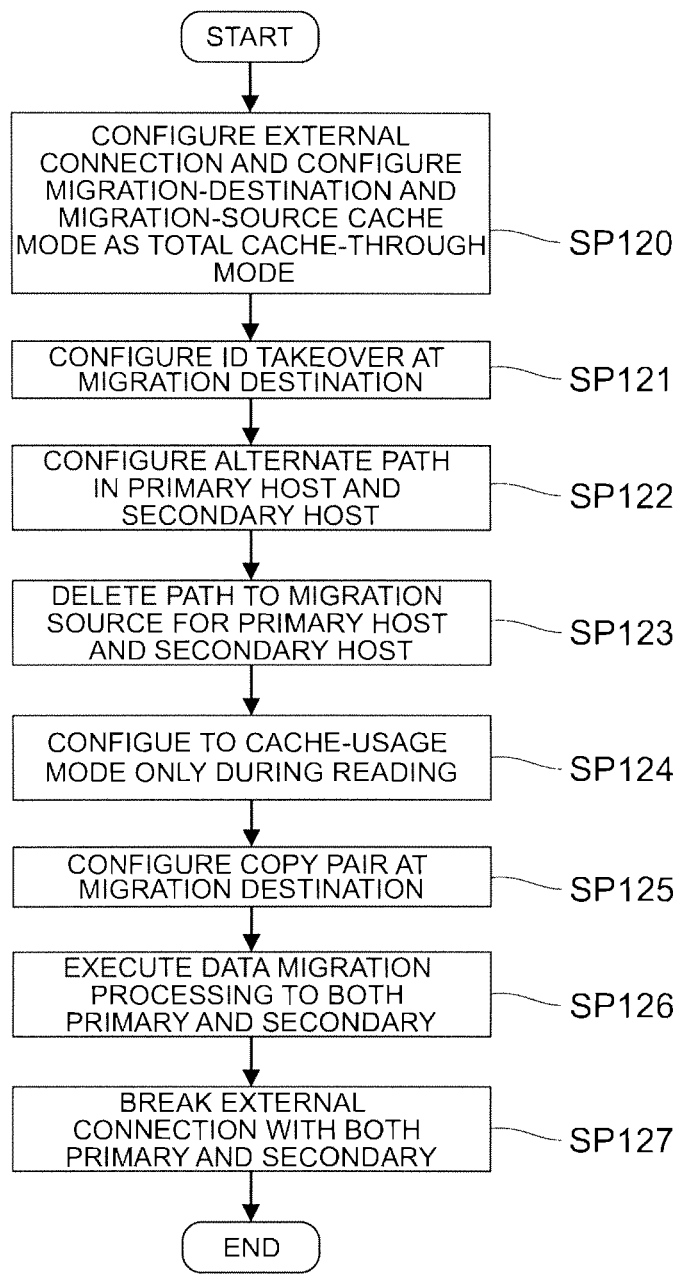
FIG. 33 is a flowchart showing a processing routine for second data migration control processing.

FIG. 33 shows a specific processing routine for second data migration control processing which is executed by the data migration control program 53 installed on the management server 52 when the migration-source storage apparatus group 6 is replaced with the migration-destination storage apparatus group 9. By controlling the primary host apparatus 2, migration-source primary storage apparatus 7, or migration-destination primary storage apparatus 10 or the like according to the processing routine of the second data migration control processing shown in FIG. 33, the CPU 23 (FIG. 3) of the management server 52 migrates the data stored in the primary volume PVOL1 in the migration-source primary storage apparatus 7 to the primary volume PVOL2 in the migration-destination primary storage apparatus 10 and migrates the data stored in the secondary volume SVOL1 in the migration-source secondary storage apparatus 8 to the secondary volume SVOL2 in the migration-destination secondary storage apparatus 11.

In reality, the CPU 23 of the management server 52 starts the second data migration control processing shown in FIG. 33 when a command to execute data migration control processing is supplied from the system administrator after the migration-source primary storage apparatus 7 and migration-destination primary storage apparatus 10 are connected by the third communication path 15 (FIG. 1) and the migration-source secondary storage apparatus 8 and migration-destination secondary storage apparatus 11 are connected by the fourth communication path 51, and first externally connects the migration-source primary storage apparatus 7 to the migration-destination primary storage apparatus 10 and externally connects the migration-source secondary storage apparatus 8 to the migration-destination secondary storage apparatus 11 (SP120).

More specifically, the CPU 23 supplies an instruction to the migration-destination primary storage apparatus 10 to create one or more first virtual volumes VVOL1 in the migration-destination primary storage apparatus 10 in association with each of the primary volumes PVOL1 defined in the migration-source primary storage apparatus 7 and supplies an instruction to the migration-destination primary storage apparatus 10 to create a first virtual command device RCMD1 in the migration-destination primary storage apparatus 10 in association with the command device CMD1 defined in the migration-source primary storage apparatus 7.

In addition, the CPU 23 supplies an instruction to the migration-destination secondary storage apparatus 11 to create one or more second virtual volumes VVOL2 in the migration-destination secondary storage apparatus 11 in association with each of the secondary volumes SVOL1 defined in the migration-source secondary storage apparatus 8, and supplies an instruction to the migration-destination secondary storage apparatus 11 to create a second virtual command device RCMD2 in the migration-destination secondary storage apparatus 11 in association with the command device CMD2 defined in the migration-source secondary storage apparatus 8.

Further, the CPU 23 issues an instruction to the migration-destination primary storage apparatus 10 to map the first virtual volume VVOL 1, which is created in the migration-destination primary storage apparatus 10, to the corresponding primary volume PVOL1 in the migration-source primary storage apparatus 7 in accordance with this instruction, and maps the first virtual command device RCMD1 created in the migration-destination primary storage apparatus 10 to the command device CMD1 in the migration-source primary storage apparatus 7 in accordance with this instruction.

In addition, the CPU 23 issues an instruction to the migration-destination secondary storage apparatus 11 to map the second virtual volume VVOL2 created in the migration-destination secondary storage apparatus 11 according to this instruction to the corresponding secondary volume SVOL1 in the migration-source secondary storage apparatus 8 and to map the second virtual command device RCMD2 created in the migration-destination secondary storage apparatus 11 to the command device CMD2 in the migration-source secondary storage apparatus 8 in accordance with the instruction.

Figure 34:
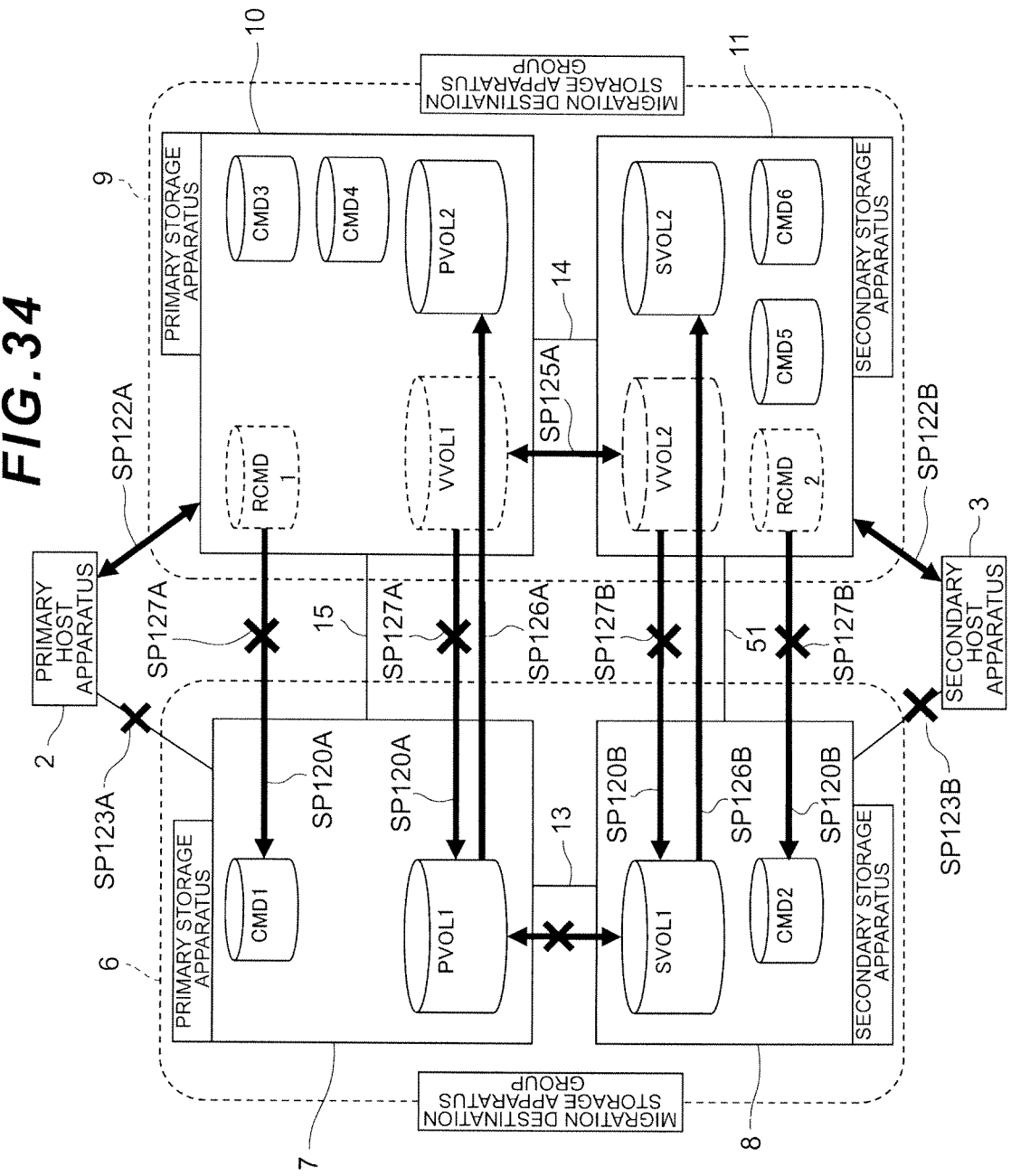
FIG. 34 is a conceptual view of the flow of the second data migration processing.

Thus, by registering the required information in the mapping table 44 (FIG. 7) in accordance with the instruction, as shown in FIG. 34, the migration-destination primary storage apparatus 10 maps each of the first virtual volumes VVOL1 in the migration-destination primary storage apparatus 10 to the corresponding primary volume PVOL1 in the migration-destination primary storage apparatus 10, and maps the first virtual command device RCMD1 in the migration-destination primary storage apparatus 10 to the command device CMD1 in the migration-source primary storage apparatus 7 (SP120A in FIG. 34).

Likewise, by registering the required information in the mapping table 44 in accordance with the instruction, the migration-destination secondary storage apparatus 11 maps each of the second virtual volumes VVOL2 in the migration-destination secondary storage apparatus 11 to the corresponding secondary volume SVOL1 in the migration-source secondary storage apparatus 8 and maps the second virtual command device RCMD2 in the migration-destination secondary storage apparatus 11 to the command device CMD2 in the migration-source secondary storage apparatus 8 (SP120B in FIG. 34).

In addition, the CPU 23 then issues an instruction to the migration-destination primary storage apparatus 10 to configure the cache mode of the migration-destination primary storage apparatus 10 to total cache-through mode in a case where a write command or read command targeting the first virtual volume VVOL1 from the primary host apparatus 2 to the migration-destination primary storage apparatus 10, and issues an instruction to the migration-destination secondary storage apparatus 11 to configure the cache mode of the migration-destination secondary storage apparatus 11 as total cache-through mode in a case where a write command or read command targeting the second virtual volume VVOL2 is supplied from the secondary host apparatus 3 to the migration-destination secondary storage apparatus 11 (SP120).

Subsequently, the CPU 23 executes second ID takeover configuration processing to configure management information, relating to each of the primary volumes PVOL1 and the command device CMD1 in the migration-source primary storage apparatus 7, for the corresponding first virtual volume VVOL1 or the first virtual command device RCMD1 in the migration-destination primary storage apparatus 10, and to configure management information, relating to each of the secondary volumes SVOL1 in the migration-source secondary storage apparatus 8 and the command device CMD2, for the corresponding second virtual volume VVOL2 or second virtual command device RCMD2 in the migration-destination secondary storage apparatus 11 (SP121).

More specifically, the CPU 23 acquires, from the migration-source primary storage apparatus 7, apparatus information on the migration-source primary storage apparatus 7 and device information on the primary volume PVOL1 and command device CMD1, and acquires, from the migration-source secondary storage apparatus 8, apparatus information on the migration-source secondary storage apparatus 8 and device information on the secondary volume SVOL1 and command device CMD2. Note that details of the apparatus information and device information are the same as for the first embodiment.

Furthermore, the CPU 23 configures the then acquired apparatus information and device information relating to the migration-source primary storage apparatus 7 for the migration-destination primary storage apparatus 10 as virtual information relating to the first virtual volume VVOL1 and first virtual command device RCMD1 and the migration-destination primary storage apparatus 10 which is to be transmitted to the primary host apparatus 2 when an inquiry command from the primary host apparatus 2 is received. Likewise, the CPU 23 configures the then acquired apparatus information and device information relating to the migration-source secondary storage apparatus 8 for the migration-destination secondary storage apparatus 11 as virtual information relating to the second virtual volume VVOL2 and second virtual command device RCMD2 and the migration-destination secondary storage apparatus 11 which is to be transmitted to the secondary host apparatus 3 when an inquiry command from the secondary host apparatus 3 is received.

The CPU 23 subsequently supplies, to the primary host apparatus 2, an instruction to configure a path to the migration-destination primary storage apparatus 10 as an alternate path to the migration-source primary storage apparatus 7 and supplies, to the secondary host apparatus 3, an instruction to configure a path to the migration-destination secondary storage apparatus 11 as an alternate path to the migration-source secondary storage apparatus 8 (SP122). Thus, the alternate path program 40 (FIG. 32) of the primary host apparatus 2 which receives this instruction configures a path to the migration-destination primary storage apparatus 10 as an alternate path to the migration-source primary storage apparatus 7 (SP122A in FIG. 34). Furthermore, the alternate path program 40 (FIG. 32) of the secondary host apparatus 3, having received this instruction, configures a path to the migration-destination secondary storage apparatus 11 as an alternate path to the migration-source secondary storage apparatus 8 (SP122B in FIG. 34).

In addition, the CPU 23 subsequently issues an instruction to the primary host apparatus 2 to cancel the path to the migration-source primary storage apparatus 7 and issues an instruction to the secondary host apparatus 3 to cancel the path to the migration-source secondary storage apparatus 8 (SP123). Thus, the alternate path program 40 of the primary host apparatus which receives the instruction cancels the path to the migration-source primary storage apparatus 7 (SP123A in FIG. 34), and the alternate path program 40 of the secondary host apparatus 3 which receives the instruction cancels the path to the migration-source secondary storage apparatus 8 (SP123B of FIG. 34).

The CPU 23 subsequently configures the migration-destination primary storage apparatus 10 to correspond to cache-through mode only when a write command is received targeting the primary volume PVOL1 or command device CMD1 in the migration-source primary storage apparatus 7 and to correspond to cache usage mode when a read command is received targeting the primary volume PVOL1 or command device CMD1. Similarly, the CPU 23 configures the migration-destination secondary storage apparatus 11 to correspond to cache-through mode only when a write command is received targeting the secondary volume SVOL1 or command device CMD2 in the migration-source secondary storage apparatus 8 and to correspond to cache usage mode when a read command is received targeting the secondary volume SVOL1 or command device CMD2 (SP124).

In addition, the CPU 23 supplies an instruction to the migration-destination primary storage apparatus 10 and migration-destination secondary storage apparatus 11 to configure the first virtual volume VVOL1 in the migration-destination primary storage apparatus 10 and the secondary virtual volume VVOL2 in the migration-destination secondary storage apparatus 11 as a remote-copy copy pair (SP125). By registering the required information in the pair management table 43 (FIG. 6), the migration-destination primary storage apparatus 10 and migration-destination secondary storage apparatus 11 thus configure the first virtual volume VVOL1 and second virtual volume VVOL2 as a copy pair (SP125A in FIG. 34).

The CPU 23 subsequently supplies an instruction to the migration-destination primary storage apparatus 10 to migrate the primary volume PVOL1 of the migration-source primary storage apparatus 7 to the primary volume PVOL2 in the migration-destination primary storage apparatus 10 associated with the primary volume PVOL1 by means of the volume migration function of the migration-destination primary storage apparatus 10. In addition, the CPU 23 supplies an instruction to the migration-destination secondary storage apparatus 11 to migrate the secondary volume SVOL1 of the migration-source secondary storage apparatus 8 to the secondary volume SVOL2 in the migration-destination secondary storage apparatus 11 associated with the secondary volume SVOL1 by means of the volume migration function of the migration-destination secondary storage apparatus 11 (SP126).

The migration-destination primary storage apparatus 10 which receives the instruction migrates the data stored in the primary volume PVOL1 in the migration-source primary storage apparatus 7 to the corresponding primary volume PVOL2 in the migration-destination primary storage apparatus 10, and configures all the management information which includes the volume number of the primary volume PVOL in the migration-source primary storage apparatus 7 as management information of the primary volume PVOL2 in the migration-destination primary storage apparatus 10 (SP126A of FIG. 34). Likewise, the migration-destination secondary storage apparatus 11, having received this instruction, migrates the data stored in the secondary volume SVOL1 in the migration-source secondary storage apparatus 8 to the corresponding secondary volume SVOL2 in the migration-destination secondary storage apparatus 11, and configures all the management information which includes the volume number of the secondary volume SVOL1 in the migration-source secondary storage apparatus 8 as management information of the secondary volume SVOL2 in the migration-destination secondary storage apparatus 11 (SP126B in FIG. 34).

The CPU 23 subsequently supplies an instruction to the migration-destination primary storage apparatus 10 to cancel the external connection state of the migration-source primary storage apparatus 7 to the migration-destination primary storage apparatus 10, and supplies an instruction to the migration-destination secondary storage apparatus 11 to cancel the external connection state of the migration-source secondary storage apparatus 8 to the migration-destination secondary storage apparatus 11 (SP127).

The data migration from the migration-source storage apparatus group 6 to the migration-destination storage apparatus group 9 is completed as a result of this processing. The system administrator is thus subsequently able to remove the migration-source storage apparatus group 6 from the computer system 50.

(2-2) Write Processing and Read Processing

Next the flow of write processing and read processing which are executed in the migration-source storage apparatus group 6 and migration-destination storage apparatus group 9 if, before, during, or after the foregoing data migration processing, an access command (read command or write command) targeting the primary volume PVOL1 in the migration-source primary storage apparatus 7 is issued by the primary host apparatus 2, will be described next.

(2-2-1) Before Data Migration

The flow of write processing which is executed by the computer system 50 in a case where a write command is supplied to the migration-source primary storage apparatus 7 by the primary host apparatus 2 before the start of data migration processing is the same as that of the write processing in the computer system 1 according to the first embodiment described earlier with reference to FIG. 13.

In addition, the operation of the computer system 50 in a case where a fault occurs in the migration-source primary storage apparatus 7 or the like at this stage is the same as for the computer system 1 according to the first embodiment described earlier with reference to FIG. 14.

(2-2-2) After Configuring Alternate Path (2-2-2-1) Write Processing and Read Processing The flow of the write processing and read processing, which are executed by the computer system 50 if a write command or read command is issued to the migration-source primary storage apparatus 7 or migration-destination primary storage apparatus 10 by the primary host apparatus 2 after configuring a path via the first virtual volume of the migration-destination primary storage apparatus as an alternate path from the primary host apparatus 2 to the primary volume PVOL1 in the migration-source primary storage apparatus 7 and configuring a path via the second virtual volume VVOL2 of the migration-destination secondary storage apparatus 11 as an alternate path from the secondary host apparatus 3 to the secondary volume SVOL1 in the migration-source secondary storage apparatus 8 (that is, after the processing of step SP122 in FIG. 33 has been executed), is the same as the write processing and read processing of computer system 1 according to the first embodiment described earlier with reference to FIGS. 16 to 19.

(2-2-2-2) Operation of Computer System when a Fault Occurs at this Stage

FIG. 35 shows the operation of the computer system 50 in a case where, after the processing of step SP122 in FIG. 33 is complete, a fault arises in the migration-source primary storage apparatus 7 or the like.

The computer system 50 according to this embodiment differs from the first embodiment in that the secondary host apparatus 3 configures the path to the migration-destination secondary storage apparatus 11 as an alternate path for the path to the migration-source secondary storage apparatus 8 in cases where a fault occurs in the migration-source primary storage apparatus 7. Where other processing is concerned, the computer system 50 is the same as the computer system 1 according to the first embodiment.

(2-2-3) After Configuring Copy Pair in Migration Destination Storage Apparatus Group In a case where the first virtual volume VVOL1 of the migration-destination primary storage apparatus 10 and the corresponding second virtual volume VVOL2 in the migration-destination secondary storage apparatus 11 have been configured as a copy pair (that is, if the processing of step SP125 in FIG. 33 is executed), as shown in FIG. 36, remote copying, of the data written to the primary volume PVOL1 in the migration-source primary storage apparatus 7 to the secondary volume SVOL1 in the migration-source secondary storage apparatus 8, differs from the computer system 1 according to the first embodiment in that this copying is executed via the migration-destination secondary storage apparatus 11.

(2-2-3-1) Flow of Write Processing

FIG. 37 shows the flow of processing in a case where, after the processing of step SP122 in FIG. 33 is complete, a write command targeting the first virtual volume VVOL1 is issued by the primary host apparatus 2 to the migration-destination primary storage apparatus 10.

If the write command is issued by the primary host apparatus 2 to the migration-destination primary storage apparatus 10, the migration-destination primary storage apparatus 10 stores the write-target data supplied by the primary host apparatus 2 in its own cache memory 35 together with the write command (SP130). Further, the migration-destination primary storage apparatus 10 subsequently transfers the write-target data stored in the cache memory 35 to the migration-source primary storage apparatus 7 by means of the external connection function (SP131).

Upon receipt of the write target data, the migration-source primary storage apparatus 7 stores the data in its own cache memory 35 and subsequently transmits a third write completion notice to the effect that write processing is complete to the migration-destination primary storage apparatus 10 (SP132).

Upon receipt of the third write completion notice, the migration-destination primary storage apparatus 10 transfers the write-target data stored in the cache memory 35 to the migration-destination secondary storage apparatus 11 (SP133). Furthermore, upon receipt of this write-target data, the migration-destination secondary storage apparatus 11 stores the data in its own cache memory 35 and subsequently transfers the data to the migration-source secondary storage apparatus 8 by means of the external connection function (SP134).

Upon receiving the write-target data, the migration-source secondary storage apparatus 8 stores the data in its own cache memory 35 and subsequently transmits a sixth write completion notice to the effect that write processing is complete to the migration-destination secondary storage apparatus 11 (SP135). Furthermore, upon receipt of the sixth write completion notice, the migration-destination secondary storage apparatus 11 transmits the third write completion notice to the effect that write processing is complete to the migration-destination primary storage apparatus 10 (SP136). In addition, upon receipt of the third write completion notice, the migration-destination primary storage apparatus 10 transmits a fourth write completion notice to the effect that write processing is complete to the primary host apparatus 2 (SP137).

Note that the migration-source primary storage apparatus 7 and migration-source secondary storage apparatus 8 subsequently write write-target data which is stored in their own cache memory 35 to their own primary volumes PVOL1, PVOL2 with optional timing (SP137).

(2-2-3-2) Flow of Read Processing

The flow of read processing which is executed in the computer system 50 in a case where a read command is issued to the migration-destination primary storage apparatus 10 by the primary host apparatus 2 after the processing of step SP122 in FIG. 33 is complete is the same as the read processing of the computer system 1 according to the first embodiment described earlier in FIG. 23.

(2-2-3-3) Operation of the Computer System when a Fault Occurs at this Stage

FIG. 38 shows the operation of the computer system 50 in a case where a fault occurs in the migration-source primary storage apparatus 7 or the like after the processing up until step SP122 of FIG. 33 is complete.

The operation of the computer system 50 in a case where a fault occurs in the migration-source primary storage apparatus 7 at this stage or where a fault arises in the migration-source secondary storage apparatus 8 is the same as that of the first embodiment described earlier with reference to FIG. 25.

Further, if a fault occurs in the migration-destination primary storage apparatus 10 at this stage or a fault arises in the path interconnecting the migration-source primary storage apparatus 7 and migration-destination primary storage apparatus 10, the processing being executed by the primary host apparatus 2 is handed over to the secondary host apparatus 3 and the processing is subsequently continued by the secondary host apparatus 3 by using the migration-source secondary storage apparatus 8. In addition, in a state where each process in the migration-source primary storage apparatus 7 and migration-source secondary storage apparatus 8 is reversed, the disaster recovery configuration in the migration source storage apparatus group 6 is maintained by means of the remote-copy function which is installed in the migration-source secondary storage apparatus 8.

In addition, in a case where a fault occurs in the migration-source secondary storage apparatus 8 at this stage, where a fault arises in the path interconnecting the migration-destination primary storage apparatus 10 and migration-destination secondary storage apparatus 11, or where a fault arises in the path interconnecting the migration-source secondary storage apparatus 8 and migration-destination secondary storage apparatus 11, the write processing and read processing in the computer system 50 are continued as is. However, the disaster recovery configuration is maintained as a result of data migration from the migration-destination secondary storage apparatus 11 to the migration-source secondary storage apparatus 8 being suspended by the external connection function of the migration-destination secondary storage apparatus 11 and as a result of a remote copy from the primary volume PVOL1 of the migration-source primary storage apparatus 7 to the secondary volume SVOL1 of the migration-source secondary storage apparatus 8 being executed.

(2-2-4) During Data Migration Using the Volume Migration Function

Figure 39:
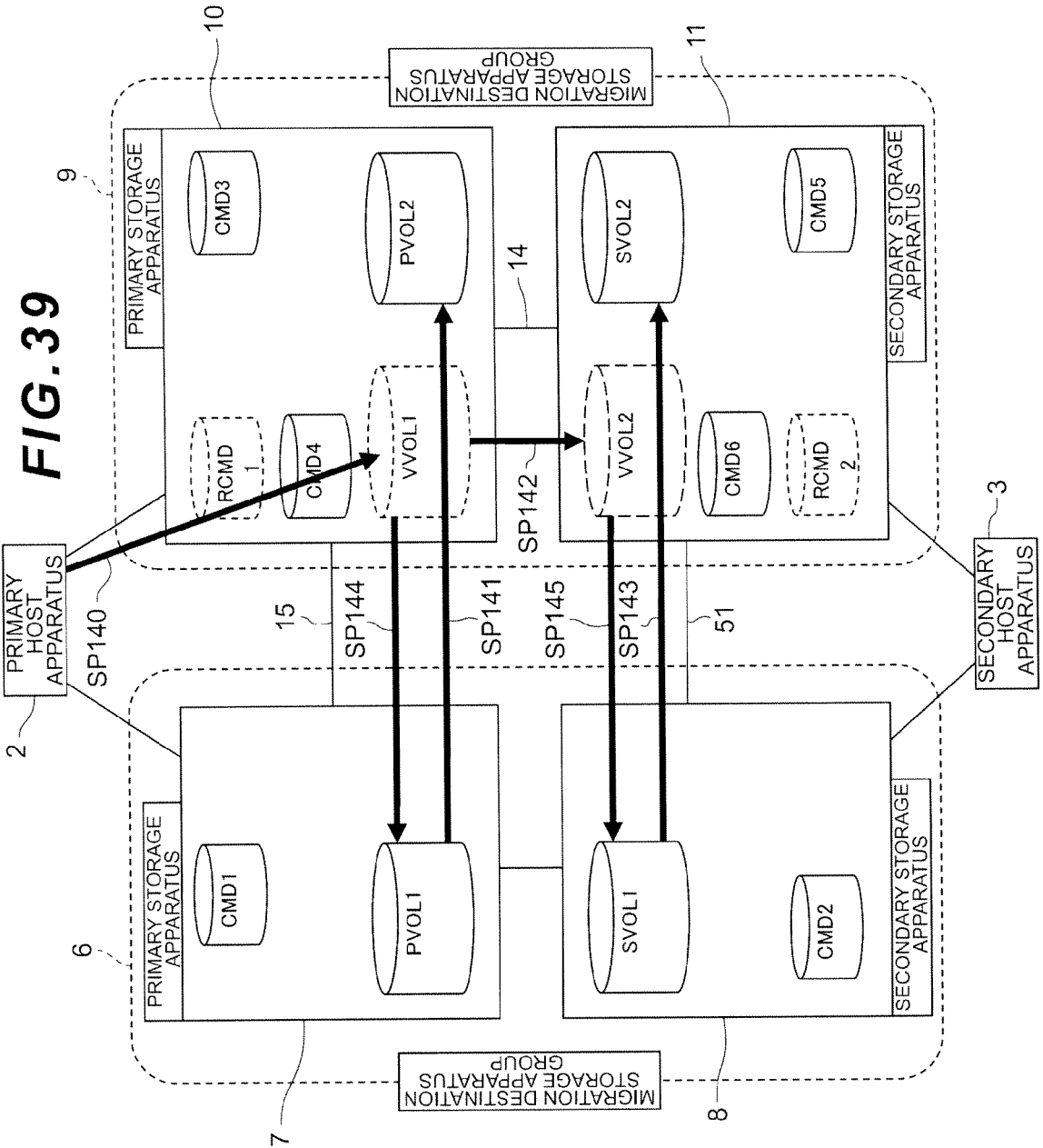
FIG. 39 is a conceptual view serving to provide an overview of read/write processing at a stage during execution of volume migration processing in the computer system according to the second embodiment.

If, at the stage where the processing of step SP126 in FIG. 33 is being executed, as shown in FIG. 39, a write command is issued by the primary host apparatus 2 to the migration-destination primary storage apparatus 10 (SP140), the write-target data is transferred to the migration-source primary storage apparatus 7 by the external connection function of the migration-destination primary storage apparatus 10 (SP141). Furthermore, the data is transferred to the migration-destination secondary storage apparatus 11 by means of the remote-copy function of the migration-destination primary storage apparatus 10 (SP142) and transferred to the migration-source secondary storage apparatus 8 by means of the external connection function of the migration-destination secondary storage apparatus 11 (SP143).

Furthermore, the data stored in the primary volume PVOL1 of the migration-source primary storage apparatus 7 at this stage is migrated to the primary volume PVOL2 of the migration-destination primary storage apparatus 10 by means of the volume migration function of the migration-destination primary storage apparatus 10 (SP144), and the data stored in the secondary volume SVOL1 of the migration-source secondary storage apparatus 8 is migrated to the secondary volume SVOL2 of the migration-destination secondary storage apparatus 11 by means of the volume migration function of the migration-destination secondary storage apparatus 11 (SP145).

(2-2-4-1) Write Processing and Read Processing

If a write command and read command is issued by the primary host apparatus 2 to the migration-destination primary storage apparatus 10 at the stage where the processing of step SP126 in FIG. 33 is being executed, the same processing as the first embodiment is executed.

More specifically, if a write command is issued by the primary host apparatus 2 to the migration-destination primary storage apparatus 10, processing excluding steps SP72 and SP73 in the write processing described earlier with reference to FIG. 22 is executed. Furthermore, in cases where a read command is issued by the primary host apparatus 2 to the migration-destination primary storage apparatus 10, the read processing described earlier with reference to FIG. 23 is executed.

(2-2-4-2) Data Migration Processing

In cases where the processing of step SP126 in FIG. 33 is being executed, in the computer system 50, data is migrated from the primary volume PVOL1 in the migration-source primary storage apparatus 7 to the primary volume PVOL2 of the migration-destination primary storage apparatus 10 with the same flow as the flow described earlier with reference to FIG. 27. Furthermore, in parallel with this migration, data is migrated from the secondary volume SVOL1 of the migration-source secondary storage apparatus 8 to the secondary volume SVOL2 of the migration-destination secondary storage apparatus 11 with the same flow as the flow described earlier with reference to FIG. 27.

(2-2-4-3) Operation of the Computer System when Fault Occurs at this Stage

FIG. 40 shows the operation of the computer system 50 in a case where a fault arises in the migration-source primary storage apparatus 7 or the like after the processing up until step SP127 of FIG. 33 has ended.

If a fault arises in the migration-source primary storage apparatus 7 at this stage, the processing being executed in the primary host apparatus 2 is handed over to the secondary host apparatus 3 and the processing is subsequently continued by the secondary host apparatus 3 by using the migration-source secondary storage apparatus 8. Further, in this case, the disaster recovery configuration in the migration-source storage apparatus group 6 is canceled.

Further, the write processing and read processing in computer system 50 is continued as is if a fault occurs in the migration-source secondary storage apparatus 8 at this stage. However, in this case, the disaster recovery configuration in the migration-source storage apparatus group 6 is canceled.

Moreover, in a case where a fault occurs in the migration-destination primary storage apparatus 10 at this stage or where a fault arises in the path interconnecting the migration-source primary storage apparatus 7 and migration-destination primary storage apparatus 10, the processing being executed in the primary host apparatus 2 is handed over to the secondary host apparatus 3 and the processing is subsequently continued by the secondary host apparatus 3 by using the migration-destination secondary storage apparatus 11. Furthermore, in this case, the disaster recovery configuration in the migration-source storage apparatus group 6 is maintained by using the remote-copy function of the migration-source secondary storage apparatus 8.

Meanwhile, in a case where a fault occurs in the migration-destination secondary storage apparatus 11 at this stage or where a fault arises in the path interconnecting the migration-destination primary storage apparatus 10 and migration-destination secondary storage apparatus 11 in the migration-destination storage apparatus group 9, the write processing and read processing in the computer system 50 is continued as is. In addition, in this case, the disaster recovery configuration in the migration-source storage apparatus group 6 is maintained by using the remote-copy function of the migration-source primary storage apparatus 7.

If, however, a fault arises in the path interconnecting the migration-source primary storage apparatus 7 and the migration-source secondary storage apparatus 8 at this stage, the write processing and read processing of the computer system 50 are continued as is. In addition, in this case, the disaster recovery configuration of the migration-source storage apparatus group 6 is maintained using the remote-copy function of the migration-source primary storage apparatus 7.

(2-2-5) After Data Migration

The flow of write processing after data migration, the flow of read processing, and the operation of the computer system when a fault occurs are the same as in the first embodiment described earlier with reference to FIGS. 29 and 30.

(2-3) Effect of the Embodiment

In the computer system 50 according to this embodiment as described earlier, data migration from the primary volume PVOL1 in the migration-source primary storage apparatus 7 to the primary volume PVOL2 in the migration-destination primary storage apparatus 10 and data migration from the secondary volume SVOL1 in the migration-source secondary storage apparatus 8 to the secondary volume SVOL2 in the migration-destination secondary storage apparatus 11 are performed while controlling the cache mode in the migration-destination primary storage apparatus 10 and the cache mode in the migration-destination secondary storage apparatus 11, thereby enabling data migration from the migration-source storage apparatus group 6 to the migration-destination storage apparatus group 9 to be carried out while preserving data consistency in the migration-source primary storage apparatus 7 and migration-source secondary storage apparatus 8 and while continuing read processing and write processing which correspond to an access command from the primary host apparatus 2. Accordingly, similarly to the first embodiment, the present invention enables realization of a computer system with which a storage apparatus can be replaced while retaining data consistency and without halting access by a host apparatus.

(3) Further Embodiments

Note that although a case was described in the foregoing first and second embodiments in which the present invention is applied to a computer system 1, 50 respectively, configured as per FIG. 1 or FIG. 31, the present invention is not limited to such as a case and may be widely applied to computer systems with other types of configurations.

In addition, although a case was described in the foregoing first and second embodiments in which, as shown in FIG. 4, the host interface 32AA, external interface 32BA, and internal interface 32BB are installed in different channel adapter packages (first or second channel adapter package 32A, 32B), the present invention is not limited to such a case, rather, the host interface 32AA, external interface 32BA, and internal interface 32BB may also be installed in the same single channel adapter package.

Furthermore, according to the above second embodiment, data migration from the primary volume PVOL1 in the migration-source primary storage apparatus 7 to the primary volume PVOL2 in the migration-destination primary storage apparatus 10 and data migration from the secondary volume SVOL1 in the migration-source secondary storage apparatus 8 to the secondary volume SVOL2 in the migration-destination secondary storage apparatus 11 are performed after executing the processing of step SP125 in FIG. 33 (that is, after configuring a copy pair in the migration-destination storage apparatus group 9), but the present invention is not limited to this arrangement, rather, the CPU 23 of the management server 4 may also end the second data migration control processing at the stage where execution of the processing of step SP125 of FIG. 33 ends, for example. Accordingly, since the migration-source primary storage apparatus 7 and migration-source secondary storage apparatus 8 can also subsequently be used as external storage apparatuses of the migration-destination primary storage apparatus 10 and migration-destination secondary storage apparatus 11 respectively, initial copying when a copy pair is configured from the primary volume PVOL1 of the migration-destination primary storage apparatus 10 and the secondary volume SVOL2 of the migration-destination secondary storage apparatus 11 can be omitted, thereby obviating the need for the time to perform this initial copying. The storage resources of the migration-source storage apparatus group 6 can thus be used effectively.

INDUSTRIAL APPLICABILITY

The present invention can be widely applied to computer systems with various configurations which comprise a primary storage apparatus and a secondary storage apparatus and which execute remote copying between the primary storage apparatus and secondary storage apparatus.

REFERENCE SIGNS LIST

1, 50 Computer system
2 Primary host apparatus
3 Secondary host apparatus
4 Management server
6 Migration-source storage apparatus group
7 Migration-source primary storage apparatus
8 Migration-source secondary storage apparatus
9 Migration-destination storage apparatus group
10 Migration-destination primary storage apparatus
11 Migration-destination secondary storage apparatus
13 to 15, 51 Communication path
23 CPU
PVOL1, PVOL2 Primary volume
SVOL1, SVOL2 Secondary volume
CMD1 to CMD6 Command device
RCMD Virtual command device
VVOL1, VVOL2 Virtual volume

The invention claimed is:

1. A computer system, comprising:
a first primary storage apparatus which provides a first primary volume to a first host apparatus;
a first secondary storage apparatus which provides a first secondary volume to a second host apparatus;
a second primary storage apparatus which comprises a first cache memory for temporarily storing data, which provides a second primary volume to the first host apparatus, and in which a first virtual volume which is a virtual logical volume is defined;
a second secondary storage apparatus which provides a second secondary volume to the second host apparatus; and
a management server which manages the first and second host apparatuses, the first and second primary storage apparatuses, and the first and second secondary storage apparatuses,
wherein the first and second primary storage apparatuses comprise a built-in remote-copy function which, if their own first logical volume is configured to form a copy pair with a second logical volume in another storage apparatus, remote-copies data written in the first logical volume to the second logical volume,
wherein the second primary storage apparatus comprises a built-in first external connection function which, if the first virtual volume is mapped to a third logical volume in another storage apparatus and when a read command or write command targeting the first virtual volume is supplied by the first host apparatus, converts the read command or write command to a read command or write command targeting the third logical volume and transfers the converted command to the storage apparatus containing the third logical volume,
wherein the second primary storage apparatus comprises, as cache modes in a case where a read command is supplied by the first host apparatus, a first read cache mode which, when the read-target data exists in the first cache memory, reads the data from the first cache memory and transfers the data to the first host apparatus, and a second read cache mode which transfers the read command to the storage apparatus containing the third logical volume by means of the first external connection function irrespective of whether the read-target data exists in the first cache memory and comprises, as cache modes in a case where a write command and write-target data are supplied by the first host apparatus, a first write cache mode which, at the stage where the write-target data is written to the first cache memory, transmits a write completion notice to the first host apparatus, and a second write cache mode which transfers the write command to the storage apparatus containing the third logical volume by means of the first external connection function irrespective of whether corresponding data exists in the first cache memory,
wherein a first path interconnecting the first host apparatus and the first primary storage apparatus is initially configured as a path from the first host apparatus to the first primary volume, and the first primary volume of the first primary storage apparatus and the first secondary volume of the first secondary storage apparatus are configured as the copy pair, wherein the management server, issues a first instruction to the second primary storage apparatus to map the first virtual volume to the first primary volume of the first primary storage apparatus, to configure the second read cache mode as a cache mode in a case where the read command is supplied by the first host apparatus and to configure the second write cache mode as the cache mode in a case where the write command is supplied by the first host apparatus, issues a second instruction to the second primary storage apparatus to configure, as unique information for the first virtual volume, predetermined unique information which the first primary storage apparatus sends back to the first host apparatus as information relating to the first primary volume when an inquiry command is supplied by the first host apparatus, issues a third instruction to the first host apparatus to configure a second path via the first virtual volume of the second primary storage apparatus as a path to the first primary volume from the first host apparatus, issues a fourth instruction to the first host apparatus to disconnect the first path, and issues a fifth instruction to the second primary storage apparatus and the second secondary storage apparatus to configure the second primary volume and the second secondary volume as the copy pair.

2. The computer system according to claim 1, wherein a third path interconnecting the second host apparatus and the first secondary storage apparatus is initially configured, and wherein the management server issues a sixth instruction to the second host apparatus to disconnect the third path and configure a fourth path interconnecting the second host apparatus and the second secondary storage apparatus, issues a seventh instruction to the first primary storage apparatus and the first secondary storage apparatus to delete the copy pair of the first primary volume and the first secondary volume, issues an eighth instruction to the second primary storage apparatus to migrate data stored in the first primary volume to the second primary volume after the second primary volume and the second secondary volume have been configured as the copy pair and configures unique information for the first primary volume as unique information for the second primary volume, and issues a ninth instruction to the second primary storage apparatus to delete mapping of the first virtual volume to the first primary volume.

3. The computer system according to claim 1, wherein the first primary storage apparatus and the first secondary storage apparatus are existing storage apparatuses, and wherein the second primary storage apparatus and the second secondary storage apparatus are new storage apparatuses which are introduced in place of the first primary storage apparatus and the first secondary storage apparatus.

4. The computer system according to claim 1, wherein the second secondary storage apparatus comprises a built-in remote-copy function which, if its own fourth logical volume is configured to form a copy pair with a fifth logical volume in another storage apparatus, remote-copies data written in the fourth logical volume to the fifth logical volume, wherein the second secondary storage apparatus comprises a second cache memory for temporarily storing data and a second virtual volume which is a virtual logical volume is defined in the second secondary storage apparatus, wherein the second secondary storage apparatus comprises a built-in second external connection function which, if the second virtual volume is mapped to a sixth logical volume in another storage apparatus and when a read command or write command targeting the first virtual volume is supplied by the second primary storage apparatus, converts the read command or write command to a read command or write command targeting the sixth logical volume and transfers the converted command to the storage apparatus containing the sixth logical volume, wherein the second secondary storage apparatus comprises, as cache modes in a case where a read command is supplied by the second primary storage apparatus, a third read cache mode which, when read-target data exists in the second cache memory, reads the data from the second cache memory and transfers the data to the second primary storage apparatus, and a fourth read cache mode which transfers the read command to the storage apparatus containing the sixth logical volume by means of the second external connection function irrespective of whether the read-target data exists in the second cache memory and comprises, as cache modes in a case where a write command and write-target data are supplied by the second primary storage apparatus, a third write cache mode which, at the stage where the write-target data is written to the second cache memory, transmits a write completion notice to the second primary storage apparatus, and a second write cache mode which transfers the write command to the storage apparatus containing the sixth logical volume by means of the second external connection function irrespective of whether corresponding data exists in the second cache memory, wherein a third path interconnecting the second host apparatus and the first secondary storage apparatus is initially configured, and wherein the management server, at the time the first instruction is supplied to the second primary storage apparatus, issues a tenth instruction to the second secondary storage apparatus to map the second virtual volume to the first secondary volume of the first secondary storage apparatus, to configure the fourth read cache mode as a cache mode in a case where the read command is supplied by the second primary storage apparatus and to configure a fourth write cache mode as the cache mode in a case where the write command is supplied by the second primary storage apparatus, at the time the second instruction is supplied to the second primary storage apparatus, issues an eleventh instruction to the second secondary storage apparatus to configure, as unique information for the second virtual volume, predetermined unique information which the first secondary storage apparatus sends back to the second host apparatus as information relating to the first secondary volume when an inquiry command is supplied by the second host apparatus, at the time the third instruction is supplied to the first host apparatus, issues a twelfth instruction to the second host apparatus to configure a fifth path via the second virtual volume of the second secondary storage apparatus as a path to the first secondary volume from the second host apparatus, and, at the time the fourth instruction is issued to the first host apparatus, issues a thirteenth instruction to the second host apparatus to disconnect the third path.

5. A data migration method for a computer system, the computer system comprising:

a first primary storage apparatus which provides a first primary volume to a first host apparatus;

a first secondary storage apparatus which provides a first secondary volume to a second host apparatus;

a second primary storage apparatus which comprises a first cache memory for temporarily storing data, which provides a second primary volume to the first host apparatus, and in which a first virtual volume which is a virtual logical volume is defined;

a second secondary storage apparatus which provides a second secondary volume to the second host apparatus; and a management server which manages the first and second host apparatuses, the first and second primary storage apparatuses, and the first and second secondary storage apparatuses, wherein the first and second primary storage apparatuses comprise a built-in remote-copy function Which, if their own first logical volume is configured to form a copy pair with a second logical volume in another storage apparatus, remote-copies data written in the first logical volume to the second logical volume, wherein the second primary storage apparatus comprises a built-in first external connection function which, if the first virtual volume is mapped to a third logical volume in another storage apparatus and when a read command or write command targeting the first virtual volume is supplied by the first host apparatus, converts the read command or write command to a read command or write command targeting the third logical volume and transfers the converted command to the storage apparatus containing the third logical volume, wherein the second primary storage apparatus comprises, as cache modes in a case where a read command is supplied by the first host apparatus, a first read cache mode which, when the read-target data exists in the first cache memory, reads the data from the first cache memory and transfers the data to the first host apparatus, and a second read cache mode which transfers the read command to the storage apparatus containing the third logical volume by means of the first external connection function irrespective of whether the read-target data exists in the first cache memory and comprises, as cache modes in a case where a write command and write-target data are supplied by the first host apparatus, a first write cache mode which, at the stage where the write-target data is written to the first cache memory, transmits a write completion notice to the first host apparatus, and a second write cache mode which transfers the write command to the storage apparatus containing the third logical volume by means of the first external connection function irrespective of whether corresponding data exists in the first cache memory, wherein a first path interconnecting the first host apparatus and the first primary storage apparatus is initially configured as a path from the first host apparatus to the first primary volume, and the first primary volume of the first primary storage apparatus and the first secondary volume of the first secondary storage apparatus are configured as the copy pair, the data migration method comprising:

a first step in which the management server issues an instruction to the second primary storage apparatus to map the first virtual volume to the first primary volume of the first primary storage apparatus, to configure the second read cache mode as a cache mode in a case where the read command is supplied by the first host apparatus and to configure the second write cache mode as the cache mode in a case where the write command is supplied by the first host apparatus;

a second step in which the management server issues an instruction to the second primary storage apparatus to configure, as unique information for the first virtual volume, predetermined unique information which the first primary storage apparatus sends hack to the first host apparatus as information relating to the first primary volume when an inquiry command is supplied by the first host apparatus;

a third step in which the management server issues an instruction to the first host apparatus to configure a second path via the first virtual volume of the second primary storage apparatus as a path to the first primary volume from the first host apparatus;

a fourth step in which the management server issues an instruction to the first host apparatus to disconnect the first path; and a fifth step in which the management server issues an instruction to the second primary storage apparatus and the second secondary storage apparatus to configure the second primary volume and the second secondary volume as the copy pair.

6. The data migration method according to claim 5, wherein a third path interconnecting the second host apparatus and the first secondary storage apparatus is initially configured, the data migration method comprising:

a sixth step in which the management server issues an instruction to the second host apparatus to disconnect the third path and configure a fourth path interconnecting the second host apparatus and the second secondary storage apparatus;

a seventh step in which the management server issues an instruction to the first primary storage apparatus and the first secondary storage apparatus to delete the copy pair of the first primary volume and the first secondary volume;

an eighth step in which the management server issues an instruction to the second primary storage apparatus to migrate data stored in the first primary volume to the second primary volume after the second primary volume and the second secondary volume have been configured as the copy pair and configures unique information for the first primary volume as unique information for the second primary volume; and a ninth step in which the management server issues an instruction to the second primary storage apparatus to delete mapping of the first virtual volume to the first primary volume.

7. The data migration method according to claim 5, wherein the first primary storage apparatus and the first secondary storage apparatus are existing storage apparatuses, and wherein the second primary storage apparatus and the second secondary storage apparatus are new storage apparatuses which are introduced in place of the first primary storage apparatus and the first secondary storage apparatus.

8. The data migration method according to claim 5, wherein the second secondary storage apparatus comprises a built-in remote-copy function which, if its own fourth logical volume is configured to form a copy pair with a fifth logical volume in another storage apparatus, remote-copies data written in the fourth logical volume to the fifth logical volume, wherein the second secondary storage apparatus comprises a second cache memory for temporarily storing data and a second virtual volume which is a virtual logical volume is defined in the second secondary storage apparatus, wherein the second secondary storage apparatus comprises a built-in second external connection function which, if the second virtual volume is mapped to a sixth logical volume in another storage apparatus and when a read command or write command targeting the first virtual volume is supplied by the second primary storage apparatus, converts the read command or write command to a read command or write command targeting the sixth logical volume and transfers the converted command to the storage apparatus containing the sixth logical volume, wherein the second secondary storage apparatus comprises, as cache modes in a case where a read command is supplied by the second primary storage apparatus, a third read cache mode which, when read-target data exists in the second cache memory, reads the data from the second cache memory and transfers the data to the second primary storage apparatus, and a fourth read cache mode which transfers the read command to the storage apparatus containing the sixth logical volume by means of the second external connection function irrespective of whether the read-target data exists in the second cache memory and comprises, as cache modes in a case Where a write command and write-target data are supplied by the second primary storage apparatus, a third write cache mode which, at the stage where the write-target data is written to the second cache memory, transmits a write completion notice to the second primary storage apparatus, and a second write cache mode which transfers the write command to the storage apparatus containing the sixth logical volume by means of the second external connection function irrespective of whether corresponding data exists in the second cache memory, wherein a third path interconnecting the second host apparatus and the first secondary storage apparatus is initially configured, and wherein, in the first step, the management server issues an instruction to the second secondary storage apparatus to map the second virtual volume to the first secondary volume of the first secondary storage apparatus, to configure the fourth read cache mode as a cache mode in a case where the read command is supplied by the second primary storage apparatus and to configure a fourth write cache mode as the cache mode in a case where the write command is supplied by the second primary storage apparatus, wherein, in the second step, the management server issues an instruction to the second secondary storage apparatus to configure, as unique information for the second virtual volume, predetermined unique information which the first secondary storage apparatus sends back to the second host apparatus as information relating to the first secondary volume when an inquiry command is supplied by the second host apparatus, wherein, in the third step, the management server issues an instruction to the second host apparatus to configure a fifth path via the second virtual volume of the second secondary storage apparatus as a path to the first secondary volume from the second host apparatus, and, wherein, in the fourth step, the management server issues an instruction to the second host apparatus to disconnect the third path.

\* \* \* \* \*